US012732297B2

(12) United States Patent
Muranaka et al.

(10) Patent No.: US 12,732,297 B2
(45) Date of Patent: Sep. 8, 2026

(54) WAVELENGTH CONVERSION DEVICE AND OPTICAL TRANSMISSION SYSTEM

(71) Applicant: Fujitsu Limited, Kawasaki (JP)

(72) Inventors: Hidenobu Muranaka, Kawasaki (JP); Tomoyuki Kato, Yokohama (JP); Tomoaki Takeyama, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 226 days.

(21) Appl. No.: 18/371,162

(22) Filed: Sep. 21, 2023

(65) Prior Publication Data

US 2024/0106560 A1 Mar. 28, 2024

(30) Foreign Application Priority Data

Sep. 22, 2022 (JP) ................................ 2022-151500
Sep. 20, 2023 (JP) ................................ 2023-152211

(51) Int. Cl.
*H04J 14/02* (2006.01)

(52) U.S. Cl.
CPC ................................ *H04J 14/0227* (2013.01)

(58) Field of Classification Search
CPC .................................................. H04J 14/0227
USPC ........................................................... 398/79
See application file for complete search history.

(56) References Cited

U.S. PATENT DOCUMENTS 8,565,613 B2 * 10/2013 Futami ................ H04J 14/0201 398/179
11,190,292 B2 * 11/2021 Kato .................. H04J 14/0256
11,211,707 B1 * 12/2021 Pourbeyram Kaleibar ................. G02F 1/3534
11,338,086 B2 * 5/2022 Roy .................... A61M 5/1723
11,385,521 B2 * 7/2022 Umeki .................... G02F 1/377
11,438,086 B2 * 9/2022 Akasaka .............. H04B 10/294
2010/0322633 A1 * 12/2010 Suzuki ................ H04B 10/672 398/160

(Continued)

FOREIGN PATENT DOCUMENTS

EP 1251712 A2 * 10/2002 ......... H04Q 11/0005
JP 2014-229913 12/2014

(Continued)

OTHER PUBLICATIONS

Pierluigi Poggiolini, "Analytical Modeling of Non-Linear Propagation in Coherent Systems," Optical Fiber Communication Conference 2013, Anaheim, California, U.S.A., Mar. 21, 2013.

(Continued)

*Primary Examiner* — Amritbir K Sandhu
(74) *Attorney, Agent, or Firm* — STAAS & HALSEY LLP

(57) ABSTRACT

A wavelength conversion device includes an optical medium that converts a first wavelength-multiplexed light including a plurality of first wavelengths belonging to a first wavelength band to a second wavelength-multiplexed light including a plurality of second wavelengths belonging to a second wavelength band, a first monitor configured to monitor power of the plurality of second wavelengths belonging to the second wavelength band, a storage unit that holds control information for adjusting a conversion characteristic of the optical medium, and a control unit configured to perform control of adjusting the conversion characteristic of the optical medium based on the control information acquired from the storage unit according to a first monitoring result by the first monitor.

16 Claims, 34 Drawing Sheets

(56) References Cited

U.S. PATENT DOCUMENTS

| | | | | |
|---|---|---|---|---|
| 2012/0008942 | A1* | 1/2012 | Kikuchi | H04J 14/0221 398/34 |
| 2019/0312641 | A1* | 10/2019 | Ishii | H04B 10/07957 |
| 2019/0349113 | A1* | 11/2019 | Komiya | H04J 14/02 |
| 2019/0353980 | A1* | 11/2019 | Shukunami | G02F 2/004 |
| 2019/0386767 | A1* | 12/2019 | Yuki | H04B 10/572 |
| 2021/0286228 | A1* | 9/2021 | Kato | G02F 1/3505 |
| 2021/0405502 | A1 | 12/2021 | Umeki et al. | |
| 2024/0106560 | A1* | 3/2024 | Muranaka | H04J 14/0227 |
| 2024/0283557 | A1* | 8/2024 | Nakagawa | H04J 14/0212 |

FOREIGN PATENT DOCUMENTS

| | | | | |
|---|---|---|---|---|
| JP | 2019-186735 | | 10/2019 | |
| JP | 2020-076834 | | 5/2020 | |
| JP | 2024046628 | A * | 4/2024 | |
| WO | WO-2023084621 | A1 * | 5/2023 | G02F 1/39 |

OTHER PUBLICATIONS

Pierluigi Poggiolini et al., "Closed For m Expressions of the Nonlinear Interference for UWB Systems," European Conference and Exhibition on Optical Communication 2022, paper Tu1D, Basel, Switzerland, Sep. 18-22, 2022.

Daniel Semrau et al., "Modulation Format Dependent, Closed-Form Formula for Estimating Nonlinear Interference in S+C+L Band Systems," 45th European Conference on Optical Communication (ECOC 2019), Dublin, Ireland, Sep. 22-26, 2019, pp. 1-4+.

Takayuki Kobayashi et al., "Wideba nd Inline-amplified WDM Transmission Using PPLN-based OPA with Over-10-THz Bandwidth," 2020 Optical Fiber Communications Conference and Exhibition (OFC), Mar. 8-12, 2020, pp. 1-3+.

Nurulanati Othm An et al., "Optimizing bandwidth of fiber optical parametric amplifier with different combinations of higher-order dispersion coefficient signs," International Conference on Applied Photonics and Electronics 2017 (InCAPE2017), EPJ Web of Conferences, vol. 162, Nov. 22, 2017+.

* cited by examiner

TRANSMIT POWER: -2 dBm
RECEIVE POWER (TRANSMISSION DISTANCE: 20 km)
RECEIVE POWER (TRANSMISSION DISTANCE: 50 km)
RECEIVE POWER (TRANSMISSION DISTANCE: 80 km)

FIG. 5

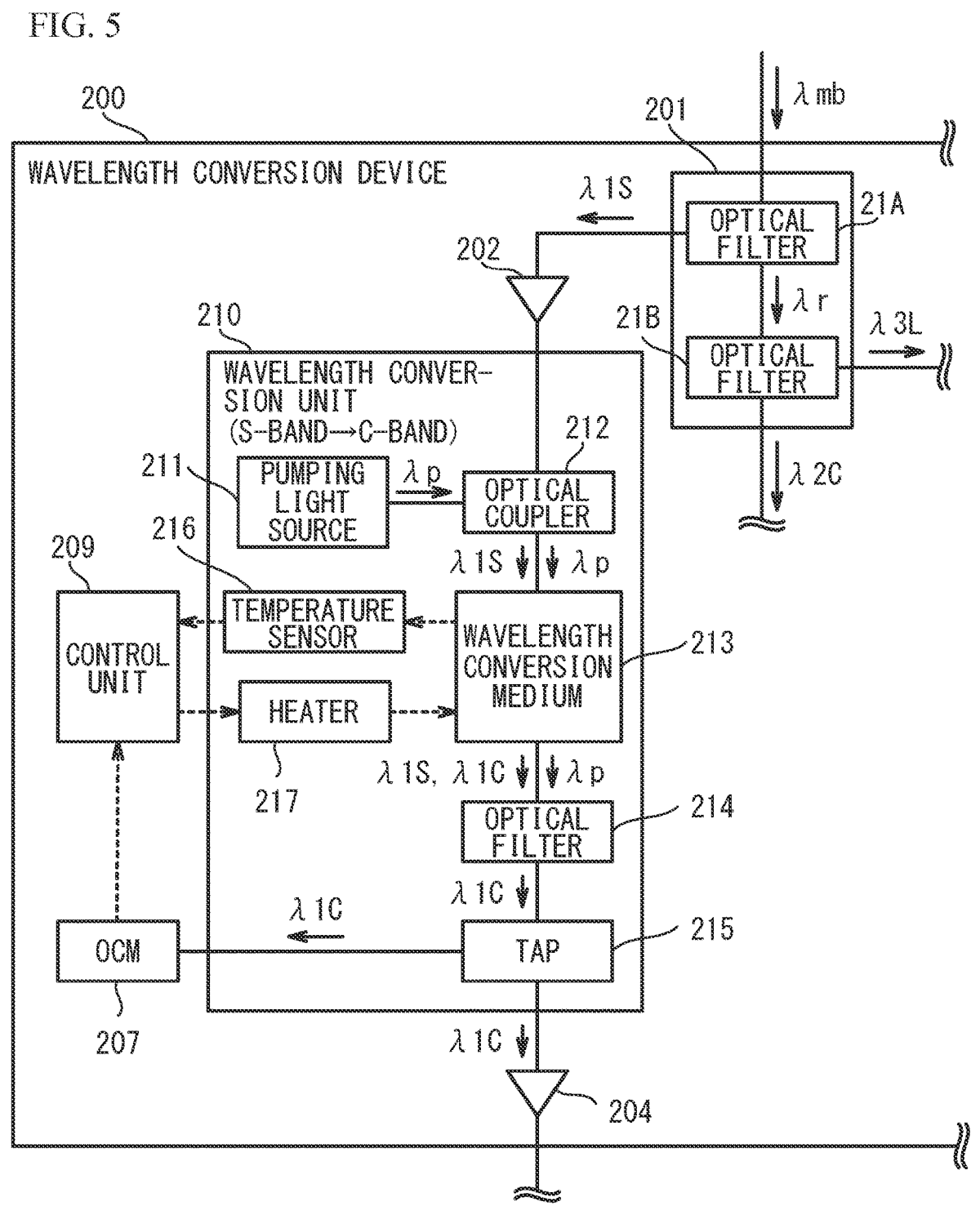

200
WAVELENGTH CONVERSION DEVICE
201
λ mb
λ 1S
OPTICAL FILTER
21A
202
λ r
21B
OPTICAL FILTER
λ 3L
210
WAVELENGTH CONVERSION UNIT (S-BAND→C-BAND)
λ 2C
212
211
PUMPING LIGHT SOURCE
λ p
OPTICAL COUPLER
216
209
λ 1S
λ p
CONTROL UNIT
TEMPERATURE SENSOR
WAVELENGTH CONVERSION MEDIUM
213
HEATER
217
λ 1S, λ 1C
λ p
OPTICAL FILTER
214
λ 1C
λ 1C
OCM
TAP
215
207
λ 1C
204

TEMPERATURE SHIFT
β2 IS POSITIVE (+)
β2 IS NEGATIVE (−)
PHASE MISMATCH AMOUNT Δβ (m⁻¹)
4γPp
0
-4γPp
(+) β2, (+) β4
(+) β2, (-) β4
(-) β2, (+) β4
(-) β2, (-) β4
0 25 50 75 100 125 150 175
λs−λp (nm)

PARAMETRIC GAIN G(dB)
60 50 40 30 20 10 0
UPWARD CONVEX SECOND-ORDER TILT
DOWNWARD CONVEX SECOND-ORDER TILT

FIG. 8 dBm

-40

-60

-80

C-BAND

S-BAND 1490 1510 1530 1550 1570

WAVELENGTH (nm)

COMPENSATION FOR VARIATIONS IN ZERO-DISPERSION WAVELENGTHS

FIG. 14

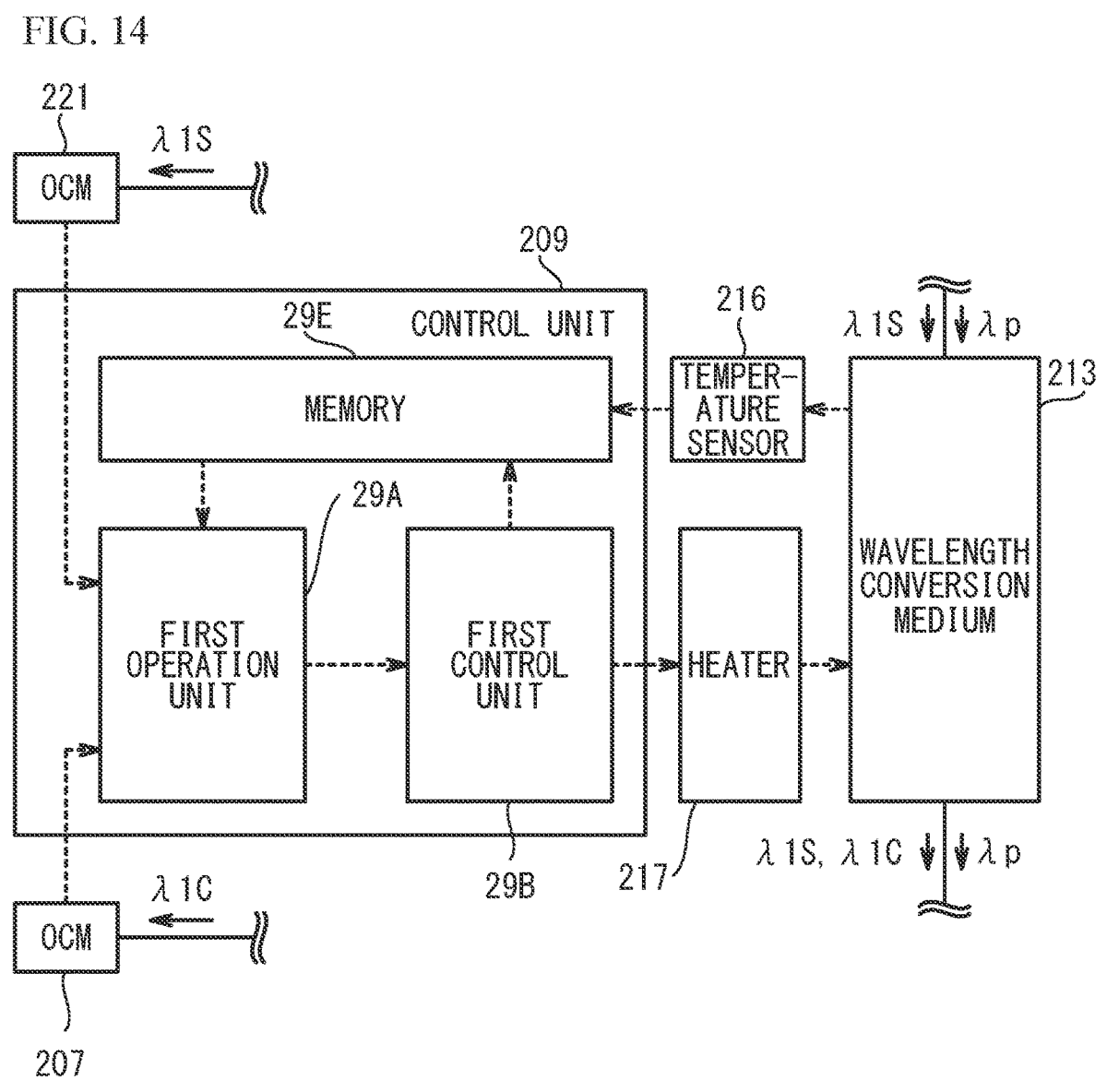

221
OCM
λ 1S
209
CONTROL UNIT
29E
MEMORY
216
TEMPERATURE SENSOR
λ 1S
λ p
213
WAVELENGTH CONVERSION MEDIUM
29A
FIRST OPERATION UNIT
FIRST CONTROL UNIT
HEATER
λ 1S, λ 1C
λ p
29B
217
λ 1C
OCM
207

FIG. 15

10
FIRST WDM TRANS-MITTER
20
SECOND WDM TRANS-MITTER
100
λ 1C
λ 2C
WAVELENGTH CONVERSION DEVICE
11A
132
WSS
133
WSS
WAVELENGTH CONVERSION UNIT (C-BAND→S-BAND)
112
PUMPING LIGHT SOURCE
λ q
OPTICAL COUPLER
111
λ 1C
λ q
TEMPERATURE SENSOR
WAVE-LENGTH CONVER-SION MEDIUM
113
λ 2C
116
HEATER
117
λ 1S, λ 1C
λ q
114
OPTICAL FILTER
λ 1S
102
12B
14B
104
109
142
VOA
CONTROL UNIT
VOA
143
163
152
TAP
PD
PD
TAP
153
162
106
OPTICAL COUPLER
λ 3L

FIG. 32

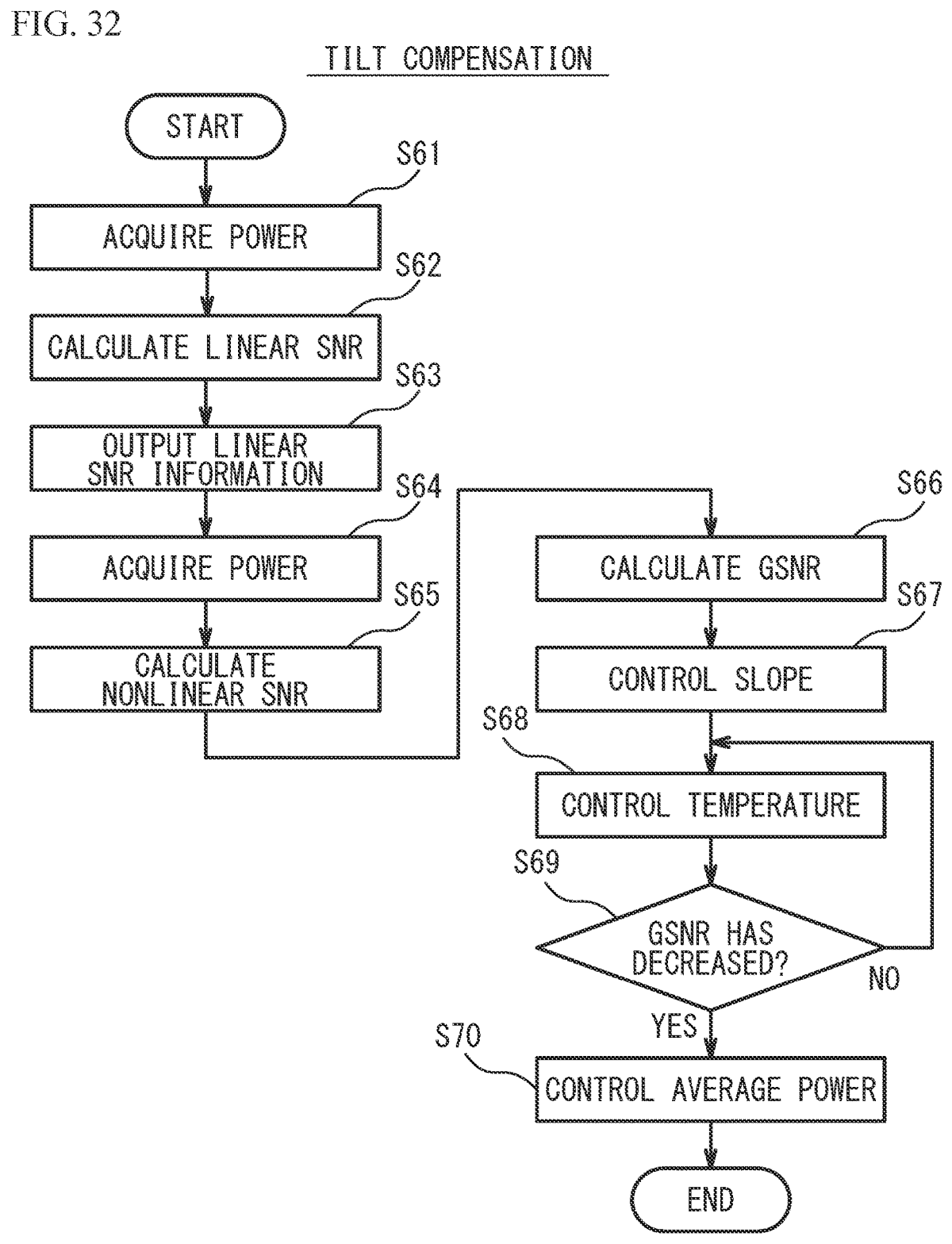

TILT COMPENSATION

START
S61 ACQUIRE POWER
S62 CALCULATE LINEAR SNR
S63 OUTPUT LINEAR SNR INFORMATION
S64 ACQUIRE POWER
S65 CALCULATE NONLINEAR SNR
S66 CALCULATE GSNR
S67 CONTROL SLOPE
S68 CONTROL TEMPERATURE
S69 GSNR HAS DECREASED?
NO
YES
S70 CONTROL AVERAGE POWER
END

WAVELENGTH CONVERSION DEVICE AND OPTICAL TRANSMISSION SYSTEM

CROSS-REFERENCE TO RELATED APPLICATION

This application is based upon and claims the benefits of priorities of the prior Japanese Patent Application No. 2022-151500, filed on Sep. 22, 2022, and the prior Japanese Patent Application No. 2023-152211, filed on Sep. 20, 2023, the entire contents of which are incorporated herein by reference.

FIELD

A certain aspect of embodiments described herein relates to a wavelength conversion device and an optical transmission system.

BACKGROUND

Wavelength division multiplexing (WDM) transmission systems, which multiplex optical signals of multiple wavelengths for high-speed, high-capacity communications, are known. In addition, to increase the transmission capacity, multiband broadband transmission using a plurality of wavelength bands such as a C-band (conventional-band) and an L-band (long band) is known. For example, the C-band is a wavelength band from 1530 nm to 1565 nm, and the L-band is a long-wavelength band from 1565 nm to 1625 nm.

In the WDM transmission system, for example, a large power deviation (tilt) is generated between an optical signal having a shorter wavelength and an optical signal having a longer wavelength during transmission due to an influence of stimulated Raman scattering (SRS) or the like in the optical transmission path. As a result, the signal quality at the receiving end deteriorates. Therefore, to inhibit the deterioration in signal quality at the receiving end, tilt compensation is required as disclosed in, for example, Japanese Patent Application Laid-Open Nos. 2019-186735 and 2014-229913.

SUMMARY

Meanwhile, although the appearance of the above tilt (first-order tilt) caused by, for example, the SRS is observed in broadband transmission using the C-band and the L-band, it is difficult to observe the appearance of the second-order tilt because the wavelength band is limited to the two wavelength bands, the C-band and the L-band.

However, in new broadband transmission in which the transmission capacity is further increased by using not only the C-band and the L-band but also the S-band (short band), the appearance of the second-order tilt caused by the SRS has started to be observed due to the widening of the wavelength band. The S-band is, for example, a wavelength band from 1460 nm to 1530 nm. As described above, in the broadband transmission using the C-band, the L-band, and the S-band, it is desirable to perform the tilt compensation also for the second-order tilt caused by the SRS to reduce the deterioration in signal quality at the receiving end.

According to an aspect of the embodiments, there is provided a wavelength conversion device including: an optical medium that converts a first wavelength-multiplexed light including a plurality of first wavelengths belonging to a first wavelength band to a second wavelength-multiplexed light including a plurality of second wavelengths belonging to a second wavelength band; a first monitor configured to monitor power of the plurality of second wavelengths belonging to the second wavelength band; a storage unit that holds control information for adjusting a conversion characteristic of the optical medium; and a control unit configured to perform control of adjusting the conversion characteristic of the optical medium based on the control information acquired from the storage unit according to a first monitoring result by the first monitor.

According to another aspect of the embodiments, there is provided an optical transmission system including a receiving-end wavelength conversion device and a transmitting-end wavelength conversion device, wherein the receiving-end wavelength conversion device includes: a receiving-end optical amplifier that amplifies a first wavelength-multiplexed light including a plurality of first wavelengths belonging to a first wavelength band; a first optical medium that converts the first wavelength-multiplexed light after amplification to a second wavelength-multiplexed light including a plurality of second wavelengths belonging to a second wavelength band; a receiving-end first monitor that monitors power of the plurality of second wavelengths belonging to the second wavelength band; a first storage unit configured to hold first control information for adjusting conversion characteristics of the first optical medium; and a receiving-end control unit configured to perform control to adjust the conversion characteristics of the first optical medium based on the first control information acquired from the first storage unit according to a first monitoring result by the receiving-end first monitor, and wherein the transmitting-end wavelength conversion device includes: a second optical medium that converts the second wavelength-multiplexed light output from a first transmitter to the first wavelength-multiplexed light; a transmitting-end first optical amplifier that amplifies the first wavelength-multiplexed light after conversion; a transmitting-end second optical amplifier that amplifies the second wavelength-multiplexed light output from a second transmitter; and an optical coupler that combines the second wavelength-multiplexed light output from the transmitting-end second optical amplifier and the first wavelength-multiplexed light output from the transmitting-end first optical amplifier and outputs a resulting light to a transmission line connecting the receiving-end wavelength conversion device and the transmitting-end wavelength conversion device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example of the wavelength conversion unit at the receiving end in accordance with the first embodiment.

FIG. 8 illustrates an example of tilt caused by wavelength conversion.

FIG. 14 illustrates an example of a control unit at the receiving end in accordance with the second embodiment.

FIG. 15 is a flowchart illustrating an example of tilt compensation in accordance with the second embodiment.

FIG. 32 is a flowchart illustrating an example of tilt compensation in accordance with the sixth embodiment.

DESCRIPTION OF EMBODIMENTS

Hereinafter, embodiments of the present disclosure will be described with reference to the drawings.

First Embodiment

Figure 1:
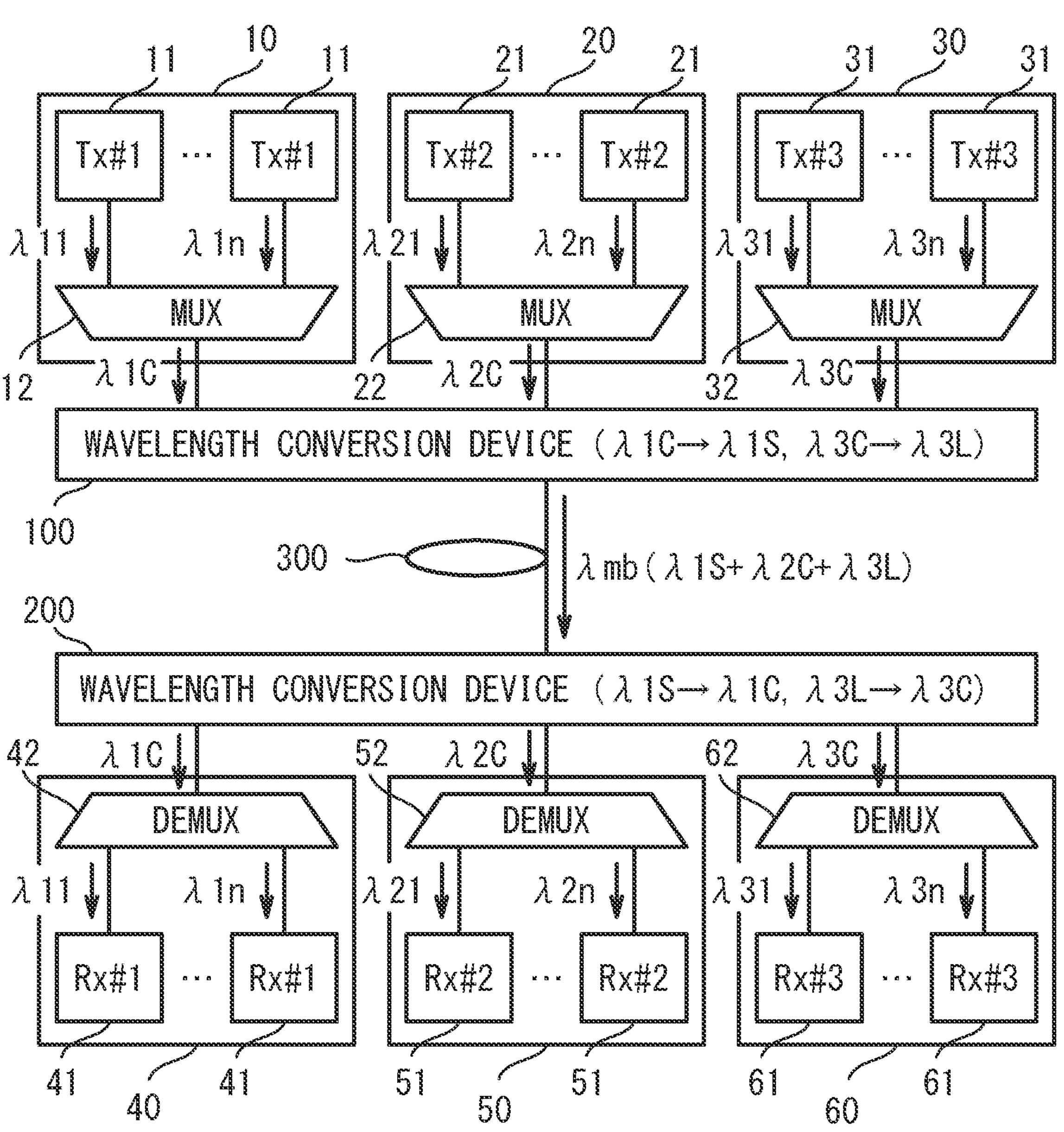
FIG. 1 illustrates an example of an optical transmission system.

As illustrated in FIG. 1, an optical transmission system ST includes a wavelength conversion device 100 at a transmitting end (transmitting-end wavelength conversion device) and a wavelength conversion device 200 at a receiving end (receiving-end wavelength conversion device). The wavelength conversion devices 100 and 200 are connected to each other via an optical transmission line 300. The optical transmission line 300 includes, for example, an optical fiber. A first WDM transmitter 10, a second WDM transmitter 20, and a third WDM transmitter 30 are connected to the wavelength conversion device 100. The first WDM transmitter 10 and the third WDM transmitter 30 are examples of a first transmitter. The second WDM transmitter 20 is an example of a second transmitter. A first WDM receiver 40, a second WDM receiver 50, and a third WDM receiver 60 are connected to the wavelength conversion device 200.

The first WDM transmitter 10 includes a plurality of first single-wavelength transmitters (denoted by Tx #1 in FIG. 1) 11 and an optical multiplexer 12 (denoted by MUX in FIG. 1). The first single-wavelength transmitters 11 respectively transmit single-wavelength lights λ11, . . . , λ1*n* with mutually different wavelengths belonging to the C-band. The single-wavelength lights λ11, . . . , λ1*n* are, for example, signal lights. The single-wavelength lights λ11, . . . , λ1*n* may be control lights. The optical multiplexer 12 multiplexes the single-wavelength lights λ11, . . . , λ1*n* and outputs a wavelength-multiplexed light λ1C. Thus, the first WDM transmitter 10 transmits the wavelength-multiplexed light λ1C belonging to the C-band.

The second WDM transmitter 20 includes a plurality of second single-wavelength transmitters (denoted by Tx #2 in FIG. 1) 21 and an optical multiplexer 22. The second single-wavelength transmitters 21 respectively transmit single-wavelength lights λ21, . . . , λ2*n* with mutually different wavelengths belonging to the C-band. The single-wavelength lights λ21, . . . , λ2*n* are signal lights. The single-wavelength lights λ21, . . . , λ2*n* may be control lights. The optical multiplexer 22 multiplexes the single-wavelength lights λ21, . . . , λ2*n* and outputs a wavelength-multiplexed light λ2C. Thus, the second WDM transmitter 20 transmits the wavelength-multiplexed light λ2C belonging to the C-band.

The third WDM transmitter 30 includes a plurality of third single-wavelength transmitters (denoted by Tx #3 in FIG. 1) 31 and an optical multiplexer 32. The third WDM transmitters 31 transmit single-wavelength lights λ31, . . . , λ3*n* with mutually different wavelengths belonging to the C-band, respectively. The single-wavelength lights λ31, . . . , λ3*n* are signal lights. The single-wavelength lights λ31, . . . , λ3*n* may be control lights. The optical multiplexer 32 multiplexes the single-wavelength lights λ31, . . . , λ3*n* and outputs a wavelength-multiplexed light λ3C. Thus, the third WDM transmitter 30 transmits the wavelength-multiplexed light λ3C belonging to the C-band.

The wavelength-multiplexed light λ1C transmitted from the first WDM transmitter 10, the wavelength-multiplexed light λ2C transmitted from the second WDM transmitter 20, and the wavelength-multiplexed light λ3C transmitted from the third WDM transmitter 30 are input to the wavelength conversion device 100. When the wavelength-multiplexed light λ1C is input, the wavelength conversion device 100 converts the wavelength-multiplexed light λ1C to a wavelength-multiplexed light λ1S belonging to the S-band. When the wavelength-multiplexed light λ3C is input, the wavelength conversion device 100 converts the wavelength-multiplexed light λ3C to a wavelength-multiplexed light λ3L belonging to the L-band. After the conversion, the wavelength conversion device 100 multiplexes the wavelength-multiplexed light λ1S, the wavelength-multiplexed light λ2C, and the wavelength-multiplexed light λ3L, and outputs the resulting light to the optical transmission line 300 as a multiband light λmb. Thus, the multiband light λmb passes through the optical transmission line 300. The multiband light λmb is an example of a broadband wavelength-multiplexed light.

Figure 2:
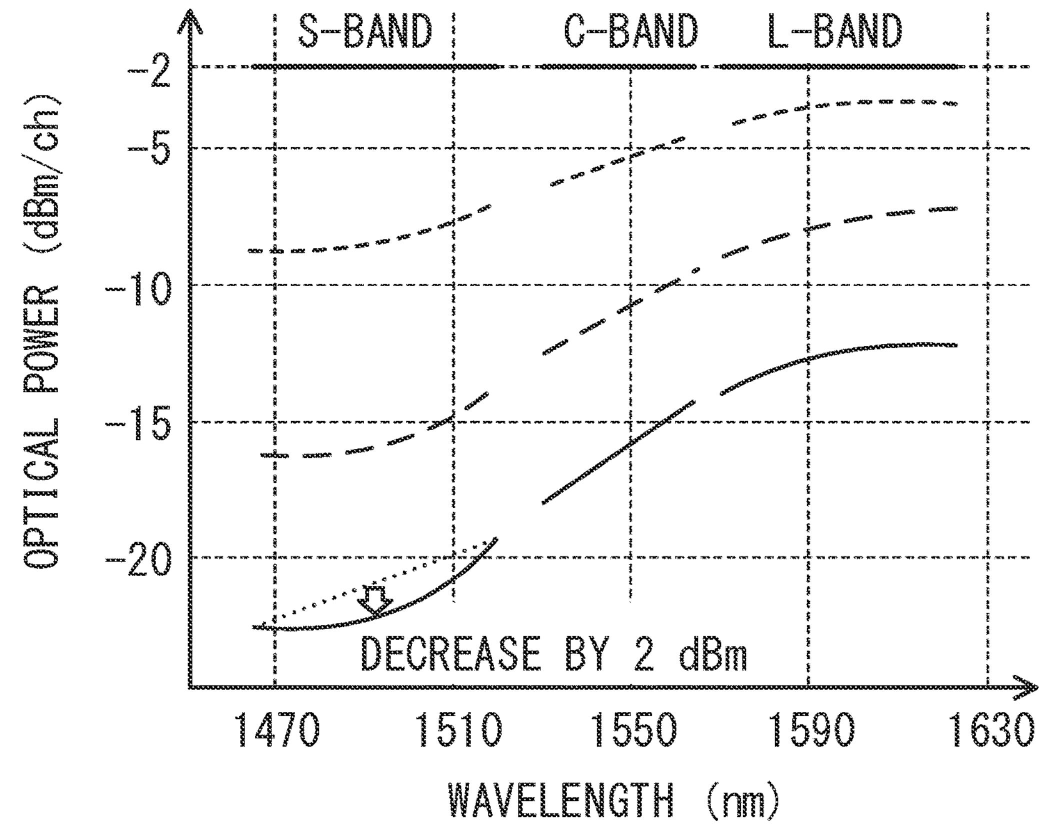
FIG. 2 is a diagram for describing an example of second-order tilt.

When the multiband light λmb passes through the optical transmission line 300, a tilt due to the SRS is generated. Specifically, a first-order tilt and a second-order tilt due to the SRS are generated. For example, as illustrated in FIG. 2, when the multiband light λmb is transmitted with a transmit power of −2 dBm, the receive power of the wavelengths belonging to the L-band decreases as the transmission distance increases. The receive power of the wavelengths belonging to the C-band and the receive power of the wavelengths belonging to the S-band also decrease as in the case of the L-band. As described above, the amount of decrease changes with the transmission distance.

Here, when the dashed curve connecting the shortest wavelength and the longest wavelength belonging to the L-band is approximated by a straight line (not illustrated) connecting the shortest wavelength and the longest wavelength belonging to the L-band, the amount of difference between the power at the central part of the curve and the power at the central part of the straight line is small. As described above, even when a power deviation is generated between a wavelength-multiplexed light including shorter wavelengths belonging to the L-band and a wavelength-multiplexed light including longer wavelengths belonging to the L-band, if a first-order approximation of the curve by a straight line is possible, the power deviation is treated as a first-order tilt, and the first-order tilt is compensated by an optical amplifier included in the wavelength conversion device 200 described later. A detailed description of the C-band is omitted since it is the same as the case of the L-band.

On the other hand, in the case of a transmission distance of 80 km, for example, when the solid curve connecting the shortest and longest wavelengths belonging to the S-band is approximated by a dashed straight line connecting the shortest and longest wavelengths, the amount of difference between the power at the center part of the solid curve and the power at the center part of the dashed straight line is larger than those in the cases of the L and C-bands. For example, the amount of difference between the power at the center of the solid curve and the power at the center of the dashed straight line is approximately 2 dBm. As a result, the optical signal to noise ratio (OSNR) at the receiving end decreases by about 2 dB.

As described above, when the transmission distance is extended and a power deviation is generated between a wavelength-multiplexed light including shorter wavelengths belonging to the S-band and a wavelength-multiplexed light including longer wavelengths belonging to the S-band, it is difficult to perform a first-order approximation of the curve by a straight line. In this case, the power deviation is treated as a second-order tilt, and the second-order tilt is compensated by a wavelength conversion unit included in the wavelength conversion device 200 described later.

Referring back to FIG. 1, the multiband light λmb that has passed through the optical transmission line 300 is input to the wavelength conversion device 200. When the multiband light λmb is input, the wavelength conversion device 200 demultiplexes the multiband light λmb into the wavelength-multiplexed light λ1S, the wavelength-multiplexed light λ2C, and the wavelength-multiplexed light λ3L. After demultiplexing, the wavelength conversion device 200 converts the wavelength-multiplexed light 215 to the wavelength-multiplexed light λ1C, and outputs the wavelength-multiplexed light λ1C to the first WDM receiver 40. The wavelength conversion device 200 outputs the wavelength-multiplexed light λ2C to the second WDM receiver 50 without converting the wavelength-multiplexed light λ2C. The wavelength conversion device 200 converts the wavelength-multiplexed light λ3L to the wavelength multiplexed light λ3C, and outputs the wavelength-multiplexed light λ3C to the third WDM receiver 60.

The first WDM receiver 40 includes a plurality of first receivers (denoted by Rx #1 in FIG. 1) 41 and an optical demultiplexer 42 (denoted by DEMUX in FIG. 1).

The optical demultiplexer 42 demultiplexes the wavelength-multiplexed light λ1C into the single-wavelength lights λ11, . . . , λ1*n*, and outputs the single-wavelength lights λ11, . . . , λ1*n* to the respective first receivers 41 corresponding to the wavelengths. Thus, the first receivers 41 receive the single-wavelength lights λ11, . . . , λ1*n* belonging to the C-band, respectively.

The second WDM receiver 50 includes a plurality of second receivers (denoted by Rx #2 in FIG. 1) 51 and an optical demultiplexer 52. The optical demultiplexer 52 demultiplexes the wavelength-multiplexed light λ2C into the single-wavelength lights λ21, . . . , λ2*n* and outputs the single-wavelength lights λ21, . . . , λ2*n* to the respective second receivers 51 corresponding to the wavelengths. Thus, the second receivers 51 receive the single-wavelength lights λ21, . . . , λ2*n*, respectively.

The third WDM receiver 60 includes a plurality of third receivers (denoted by Rx #3 in FIG. 1) 61 and an optical demultiplexer 62. The optical demultiplexer 62 demultiplexes the wavelength-multiplexed light λ3C into the single-wavelength lights λ31, . . . , λ3*n* and outputs the single-wavelength lights λ31, . . . , λ3*n* to the respective third receivers 61 corresponding to the wavelengths. As a result, the third receivers 61 receive the single-wavelength lights λ31, . . . , λ3*n*, respectively.

Next, the wavelength conversion device 100 will be described in detail with reference to FIG. 3.

Figure 3:
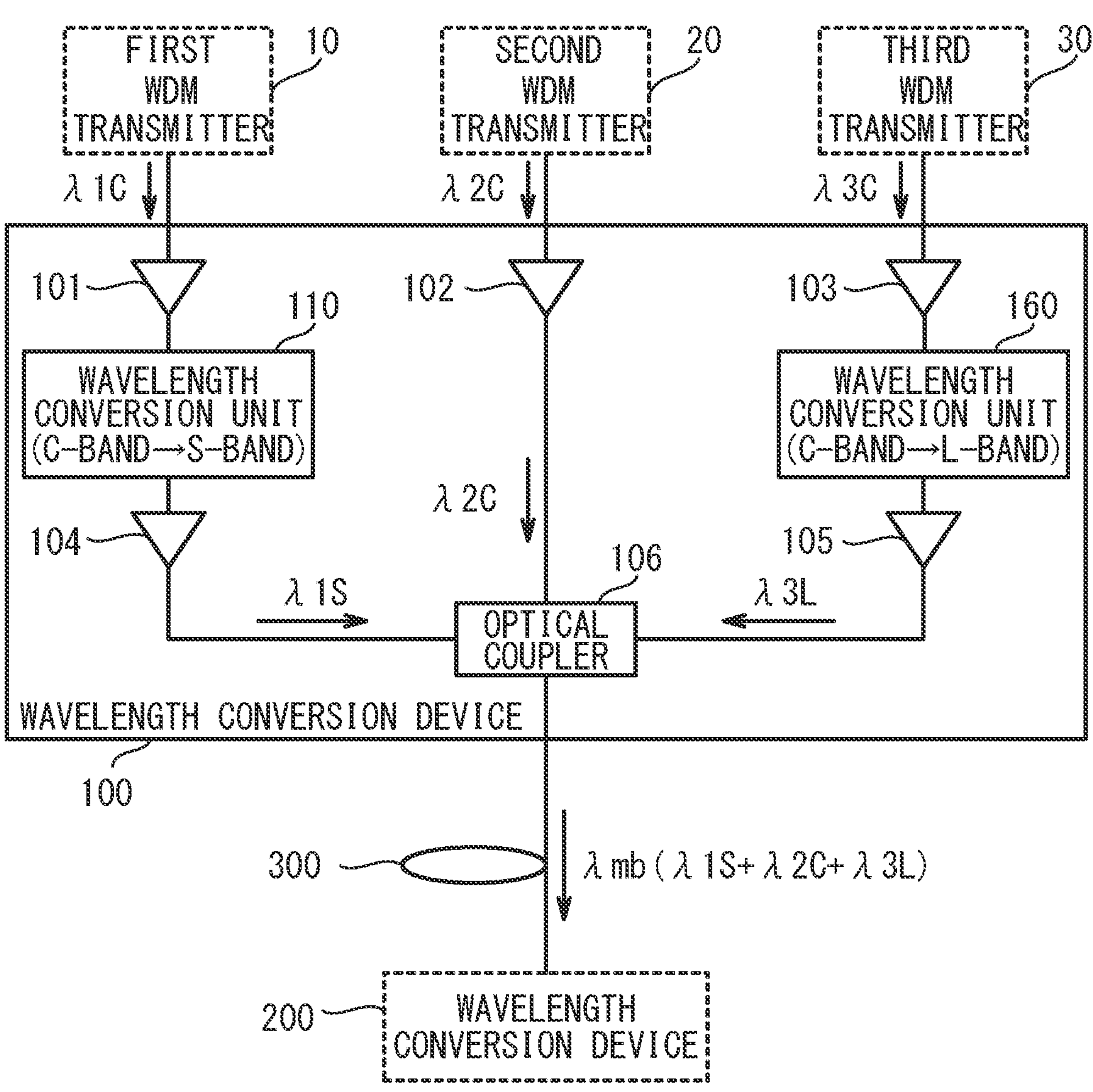
FIG. 3 illustrates an example of a wavelength conversion device at a transmitting end in accordance with a first embodiment.

As illustrated in FIG. 3, the wavelength conversion device 100 includes optical amplifiers 101, 102, 103, 104, and 105, an optical coupler 106, and wavelength conversion units 110 and 160. The optical amplifier 101 is provided prior to the wavelength conversion unit 110, and the optical amplifier 104 is provided subsequent to the wavelength conversion unit 110. The optical amplifier 103 is provided prior to the wavelength conversion unit 160, and the optical amplifier 105 is provided subsequent to the wavelength conversion unit 160.

The optical amplifier 101 is connected to the first WDM transmitter 10. The optical amplifier 102 is connected to the second WDM transmitter 20. The optical amplifier 103 is connected to the third WDM transmitter 30. The optical amplifiers 102, 104, and 105 are connected to the optical coupler 106. The optical coupler 106 is connected to the optical transmission line 300.

The optical amplifier 101 amplifies the wavelength-multiplexed light λ1C belonging to the C-band and outputs the amplified wavelength-multiplexed light λ1C to the wavelength conversion unit 110. The wavelength conversion unit 110 converts the wavelength-multiplexed light λ1C to the wavelength-multiplexed light λ1S belonging to the S-band, and outputs the wavelength-multiplexed light λ1S to the optical amplifier 104. The optical amplifier 104 amplifies the wavelength-multiplexed light λ1S belonging to the S-band and outputs the amplified wavelength-multiplexed light λ1S to the optical coupler 106. The optical amplifier 102 amplifies the wavelength-multiplexed light λ2C belonging to the C-band and outputs the amplified wavelength-multiplexed light λ2C to the optical coupler 106.

The optical amplifier 103 amplifies the wavelength-multiplexed light λ3C belonging to the C-band and outputs the amplified wavelength-multiplexed light λ3C to the wavelength conversion unit 160. The wavelength conversion unit 160 converts the wavelength-multiplexed light λ3C to the wavelength-multiplexed light λ3L belonging to the L-band, and outputs the wavelength-multiplexed light λ3L to the optical amplifier 105. The optical amplifier 105 amplifies the wavelength-multiplexed light λ3L belonging to the L-band and outputs the amplified wavelength-multiplexed light λ3L to the optical coupler 106. The optical coupler 106 combines the wavelength-multiplexed light λ1S, the wavelength-multiplexed light λ2C, and the wavelength-multiplexed light λ3L, and outputs the resulting light to the optical transmission line 300 as the multiband light λmb.

Next, the wavelength conversion device 200 will be described in detail with reference to FIG. 4.

Figure 4:
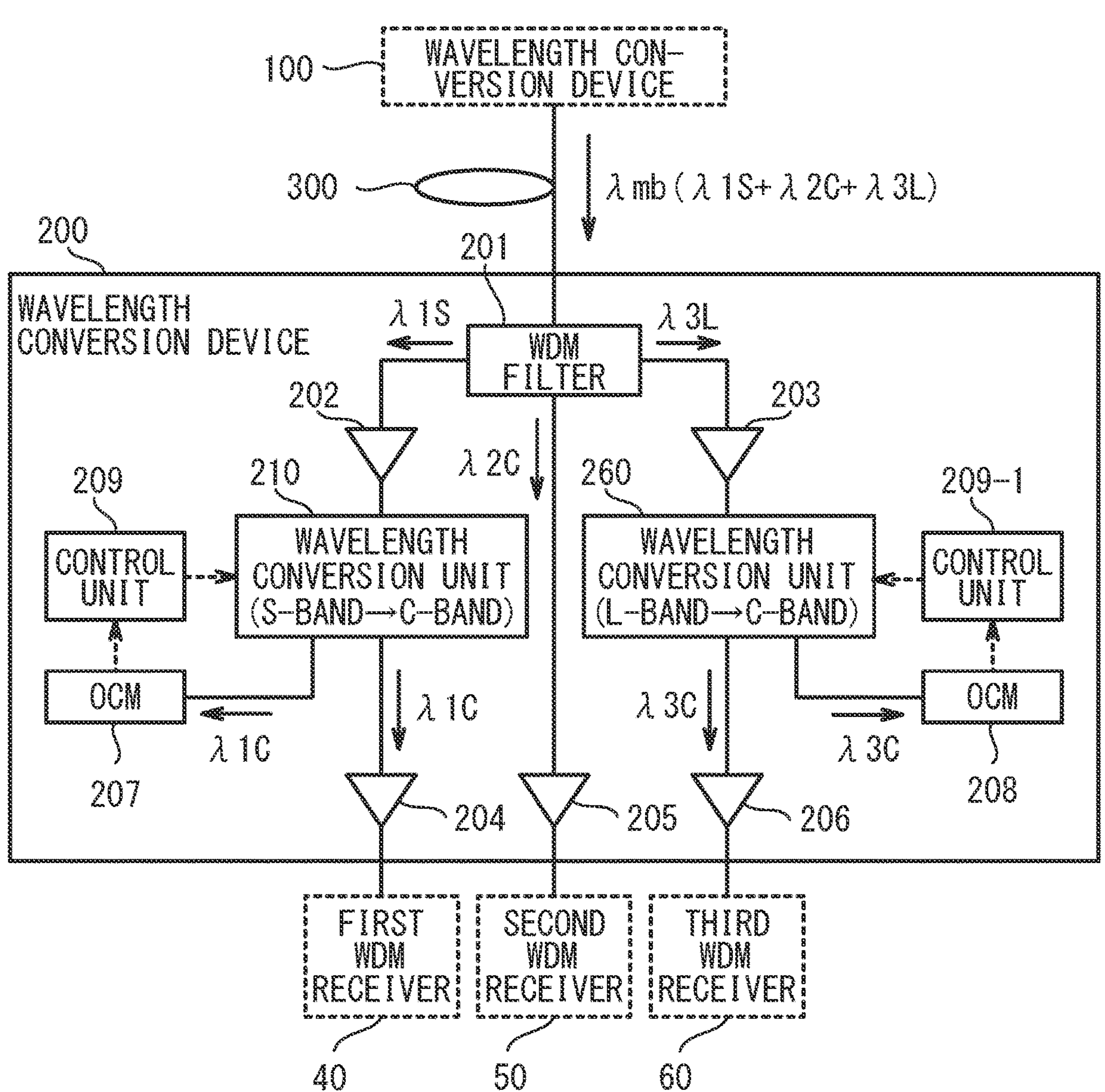
FIG. 4 illustrates an example of a wavelength conversion device at a receiving end in accordance with the first embodiment.

As illustrated in FIG. 4, the wavelength conversion device 200 of the first embodiment includes a WDM filter 201, optical amplifiers 202, 203, 204, 205, and 206, and wavelength conversion units 210 and 260. The wavelength conversion device 200 also includes optical channel monitors (OCMs) 207 and 208 and control units 209 and 209-1. The OCMs 207 and 208 are examples of a receiving-end first monitor. The OCM 207 may be included in the control unit 209. The OCM 208 may be included in the control unit 209-1.

The optical amplifier 202 is provided prior to the wavelength conversion unit 210, and the optical amplifier 204 is provided subsequent to the wavelength conversion unit 210. The optical amplifier 203 is provided prior to the wavelength conversion unit 260, and the optical amplifier 206 is provided subsequent to the wavelength conversion unit 260.

The optical amplifier 204 is connected to the first WDM receiver 40. The optical amplifier 205 is connected to the second WDM receiver 50. The optical amplifier 206 is connected to the third WDM receiver 60. The optical amplifiers 202, 203, and 205 are connected to the WDM filter 201. The WDM filter 201 is connected to the optical transmission line 300.

The multiband light λmb having passed through the optical transmission line 300 is input to the WDM filter 201. The WDM filter 201 separates the multiband light λmb into the wavelength-multiplexed light λ1S, the wavelength-multiplexed light λ2C, and the wavelength-multiplexed light λ3L. The optical amplifier 202 amplifies the wavelength-multiplexed light λ1S belonging to the S-band and outputs the amplified wavelength-multiplexed light λ1S to the wavelength conversion unit 210. The wavelength conversion unit 210 converts the wavelength-multiplexed light λ1S belonging to the S-band to the wavelength-multiplexed light λ1C belonging to the C-band, and outputs the wavelength-multiplexed light λ1C to the optical amplifier 204. The optical amplifier 204 amplifies the wavelength-multiplexed light λ1C belonging to the C-band so as to compensate for the first-order tilt, and outputs the amplified wavelength-multiplexed light λ3C to the first WDM receiver 40.

The optical amplifier 205 amplifies the wavelength-multiplexed light λ1C belonging to the C-band so as to compensate for the first-order tilt, and outputs the amplified wavelength-multiplexed light λ2C to the second WDM receiver 50. The optical amplifier 203 amplifies the wavelength-multiplexed light λ3L belonging to the L-band and outputs the amplified wavelength-multiplexed light λ3L to the wavelength conversion unit 260. The wavelength conversion unit 260 converts the wavelength-multiplexed light λ3L to the wavelength-multiplexed light λ3C belonging to the C-band, and outputs the wavelength-multiplexed light λ3C to the optical amplifier 206. The optical amplifier 206 amplifies the wavelength-multiplexed light λ3C belonging to the C-band so as to compensate for the first-order tilt, and outputs the amplified wavelength-multiplexed light λ3C to the third WDM receiver 60.

The OCM 207 monitors the power of the wavelength-multiplexed light λ1C belonging to the C-band output from the wavelength conversion unit 210. More specifically, the OCM 207 monitors the optical power of the single-wavelength lights λ11, . . . , λ1*n* included in the wavelength-multiplexed light λ1C. The OCM 207 outputs the monitoring results to the control unit 209 by an electrical control signal. The OCM 208 monitors the power of the wavelength-multiplexed light λ3C belonging to the C-band output from the wavelength conversion unit 260. More specifically, the OCM 208 monitors the optical power of the single-wavelength lights λ31, . . . , λ3*n* included in the wavelength-multiplexed light λ3C. The OCM 208 outputs the monitoring results to the control unit 209-1 by an electrical control signal. The monitoring results output by the OCMs 207 and 208 are examples of a first monitoring result.

Based on the monitoring results output from the OCM 207, the control unit 209 adjusts the conversion characteristics of the wavelength conversion unit 210 so as to compensate for the second-order tilt generated in the optical transmission line 300 through which the multi-band light λmb has been transmitted. Although the details will be described later, the wavelength conversion unit 210 includes a wavelength conversion medium such as a nonlinear optical medium, and the control unit 209 adjusts the conversion characteristics of the wavelength conversion unit 210 by controlling the temperature of the wavelength conversion medium.

Based on the monitoring results output from the OCM 208, the control unit 209-1 adjusts the conversion characteristics of the wavelength conversion unit 260 so as to compensate for the second-order tilt generated in the optical transmission line 300 through which the multiband light λmb has been transmitted. Although the details will be described later, the wavelength conversion unit 260 includes a wavelength conversion medium such as a nonlinear optical medium, and the control unit 209-1 adjusts the conversion characteristics of the wavelength conversion unit 260 by controlling the temperature of the wavelength conversion medium.

Next, details of the WDM filter 201 and the wavelength conversion unit 210 will be described with reference to FIG. 5. Since the wavelength conversion unit 260 basically has the same configuration as the wavelength conversion unit 210, a detailed description thereof will be omitted.

As illustrated in FIG. 5, the WDM filter 201 includes an optical filter 21A and an optical filter 21B. The optical filter 21A separates the wavelength-multiplexed light λ1S from the multiband light λmb and outputs the multiband residual light λr to the optical filter 21B. The wavelength-multiplexed light λ1S is input to the optical amplifier 202.

Since the wavelength-multiplexed light λ1S is separated from the multiband light λmb, the multiband residual light λr includes the wavelength-multiplexed light λ2C and the wavelength-multiplexed light λ3L. The optical filter 21B separates the multiband residual light λr into the wavelength-multiplexed light λ2C and the wavelength-multiplexed light λ3L and outputs them. The wavelength-multiplexed light λ2C is input to the optical amplifier 205 (see FIG. 4). The wavelength-multiplexed light λ3L is input to the optical amplifier 203 (see FIG. 4).

The wavelength conversion unit 210 includes a pumping light source 211, an optical coupler 212, a wavelength conversion medium 213, an optical filter 214, an optical branching tap (described as a terminal access point (TAP) in FIG. 5) 215, a temperature sensor 216, and a heater 217. The wavelength conversion unit 210 may include a thermo electric cooler (TEC) together with the heater 217. The wavelength conversion medium 213 is an example of an optical medium and a first optical medium. Specifically, the wavelength conversion medium 213 is a nonlinear optical medium. The nonlinear optical medium may be an optical fiber or a nonlinear optical crystal element such as a periodically poled lithium niobate (PPLN) waveguide element.

The pumping light source 211 outputs a pumping light λp in a waveband (e.g., 1520 nm band) longer than the S-band. The pumping light λp contains two different wavelengths. The optical coupler 212 is connected to the optical amplifier 202. Therefore, the pumping light λp and the wavelength-multiplexed light λ1S are input to the optical coupler 212. The optical coupler 212 adds the pumping light to the wavelength-multiplexed light λ1S and outputs the resulting light to the wavelength conversion medium 213.

The wavelength conversion medium 213 converts the wavelength-multiplexed light λ1S to the wavelength-multiplexed light λ1C based on the dispersion characteristics of the wavelength dispersion of the wavelength conversion medium 213 and the refractive index variation in the wavelength conversion medium 213 caused by the pumping light λp, and outputs the wavelength-multiplexed light λ1C together with the wavelength-multiplexed light λ1S. As described above, the wavelength conversion medium 213 converts the wavelength-multiplexed light λ1S containing a plurality of wavelengths belonging to the S-band, which is an example of a first waveband, to the wavelength-multiplexed light λ1C containing a plurality of wavelengths belonging to the C-band, which is an example of a second waveband. On the other hand, the pumping light λp passes through the wavelength conversion medium 213. Therefore, the wavelength conversion medium 213 outputs the wavelength-multiplexed light λ1S, the wavelength-multiplexed light λ1C, and the pumping light λp. The L-band is an example of a third wavelength band.

The optical filter 214 removes the wavelength-multiplexed light λ1S and the pumping light λp from the wavelength-multiplexed light λ1S, the wavelength-multiplexed light λ1C, and the pumping light λp output from the wavelength conversion medium 213, and outputs the wavelength-multiplexed light λ1C. Although not illustrated, the optical filter 214 includes a wavelength filter and a polarization filter, and the wavelength filter first removes the wavelength-multiplexed light λ1S, and then the polarization filter removes the pumping light λp. As a result, the wavelength multiplexed light λ1C remains without being removed, and the wavelength-multiplexed light λ1C is output from the optical filter 214.

The optical branching tap 215 branches the wavelength-multiplexed light λ1C and outputs the wavelength-multiplexed lights λ1C to the optical amplifier 204 and the OCM 207. Thus, the optical amplifier 204 can amplify the wavelength-multiplexed light λ1C. The OCM 207 can monitor the optical power of the plurality of single-wavelength lights λ11, . . . , λ1*n* included in the wavelength-multiplexed light λ1C.

The temperature sensor 216 detects the temperature of the wavelength conversion medium 213 and outputs the detected temperature to the control unit 209 by an electrical signal. The control unit 209 controls the temperature of the heater 217 to compensate for the second-order tilt based on the monitoring result output from the OCM 207 and the temperature of the wavelength conversion medium 213 detected by the temperature sensors 216. When the wavelength conversion unit 210 includes a TEC, the control unit 209 may control the temperature of the TEC. In this manner, the control unit 209 controls the temperature of the wavelength conversion medium 213 using the heater 217 or the TEC to adjust the conversion characteristics of the wavelength conversion medium 213.

For example, when the heater 217 heats the wavelength conversion medium 213 based on the control by the control unit 209, the conversion characteristics of the wavelength conversion medium 213 changes. The change in conversion characteristics of the wavelength conversion medium 213 causes an inverted second-order tilt that compensates for the second-order tilt. Therefore, by canceling the second-order tilt generated in the optical transmission line 300 with the inverted second-order tilt, it is possible to reduce a decrease in the OSNR caused by the second-order tilt.

Figure 8:
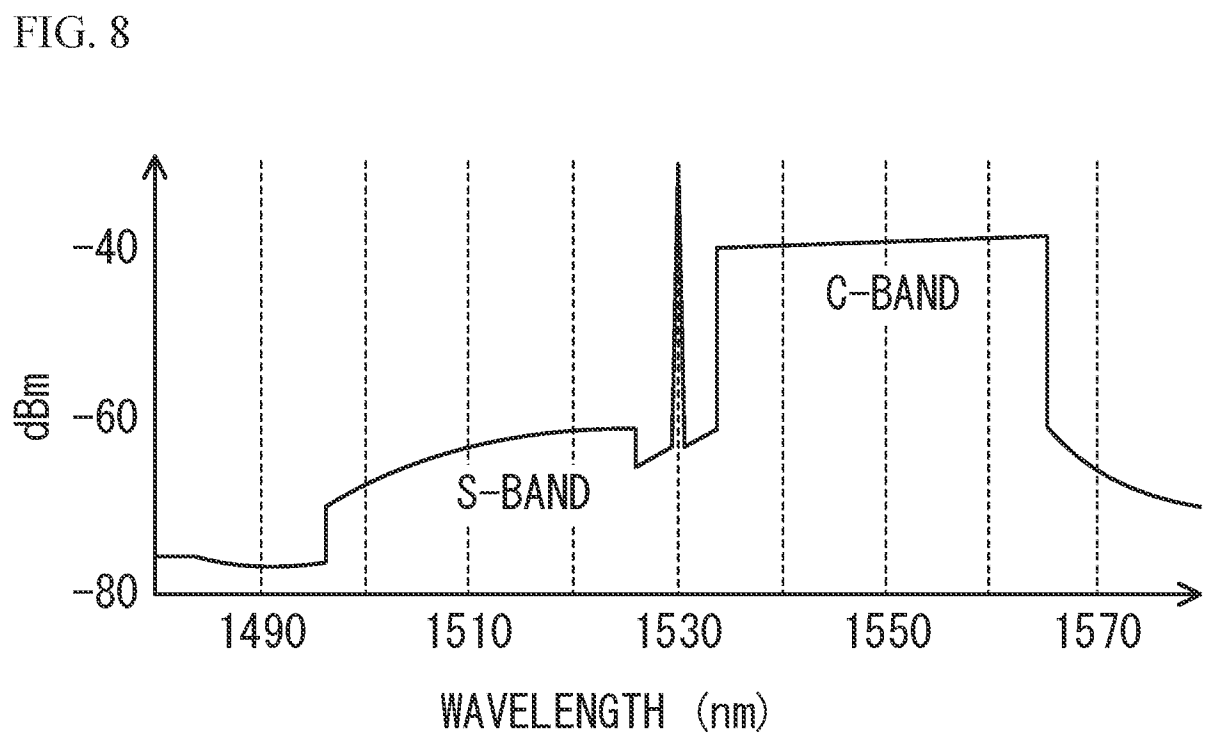

A mechanism by which the conversion characteristics of the wavelength conversion medium 213 vary with temperature will be described with reference to FIG. 6 to FIG. 8.

Figure 6:
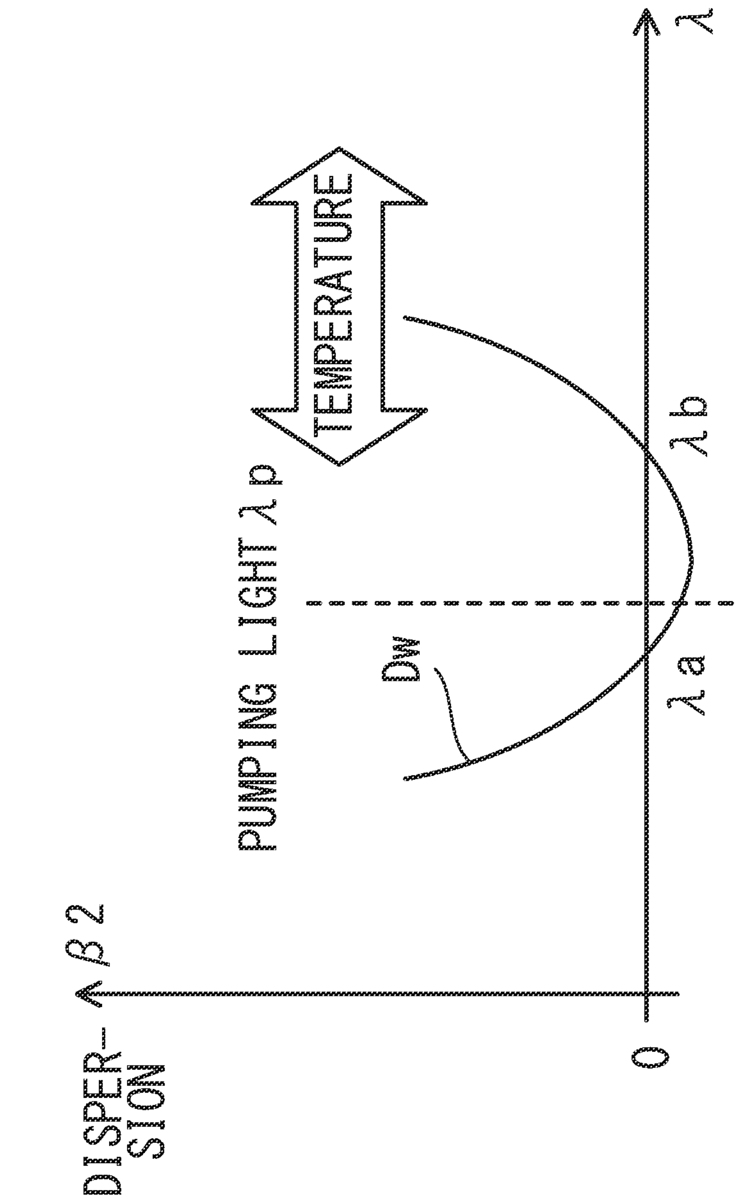
FIG. 6 is an example of a graph illustrating a zero-dispersion wavelength.

As illustrated in FIG. 6, the wavelength conversion medium 213 has dispersion characteristics depending on the wavelength λ as indicated by the dispersion curve Dw. The dispersion curve Dw has zero-dispersion wavelengths at which the second order dispersion $\beta_2$ is zero at predetermined wavelengths λa and λb. However, since there are variations in zero-dispersion wavelengths, the control unit 209 controls the temperature of the wavelength conversion medium 213 to shift the dispersion curve Dw in the horizontal axis direction, thereby compensating for variations in zero-dispersion wavelengths. The control unit 209 may compensate for variations in zero-dispersion wavelengths by moving and adjusting the wavelength of the pumping light λp input to the wavelength conversion medium 213.

Although the second-order dispersion $\beta_2$ has been described as an example in FIG. 6, the even high-order dispersion $\beta_{2m}$ (m=1, 2, 3, . . . ) can be expressed by the following calculation formula (1) and coefficients $\omega_p$ and $\omega_0$.

⟨Calculation Formula (1)⟩

$$\beta_{2m} = \sum_{n=2m}^{\infty} \frac{\beta_{n0}}{(n-2m)!}(\omega_p - \omega_0)^{n-2m} \tag{1}$$

The coefficients $\omega_p$ and $\omega_0$ in the calculation formula (1) are as follows.

$\omega_p$: frequency of pumping light $\omega_0$: zero dispersion frequency

Here, $\beta_{2m}$ means the dispersion of the 2m-order at the coefficient (frequency of pumping light) $\omega_p$.

Next, the phase mismatch amount $\Delta\beta$ in consideration of the even high-order dispersion $\beta_{2m}$ described above can be expressed by the following calculation formula (2) and a coefficient $\omega_s$.

⟨Calculation Formula (2)⟩

$$\Delta\beta = 2\sum_{m=1}^{\infty}\frac{\beta_{2m}}{(2m)!}(\Delta\omega)^{2m} \tag{2}$$

Here, $\Delta\omega$ in the calculation formula (2) is represented by $\omega_p-\omega_s$. The coefficient $\omega_s$ is the frequency of the signal light.

Therefore, from the calculation formulas (1) and (2), the phase mismatch amount $\Delta\oplus$ up to the sixth-order (m=3) dispersion can be expressed by the following calculation formula (3).

⟨Calculation Formula (3)⟩

$$\Delta\beta = \beta_2(\Delta\omega)^2 + \frac{\beta_4}{3}\left[2(\omega_p-\omega_0)^2 + \frac{1}{4}(\Delta\omega)^2\right](\Delta\omega)^2 + \frac{\beta_6}{24}\left[(\omega_p-\omega_0)^4 + \frac{1}{15}(\Delta\omega)^4\right](\Delta\omega)^2 \tag{3}$$

Figures 7A, 7B, 7C, 7D:
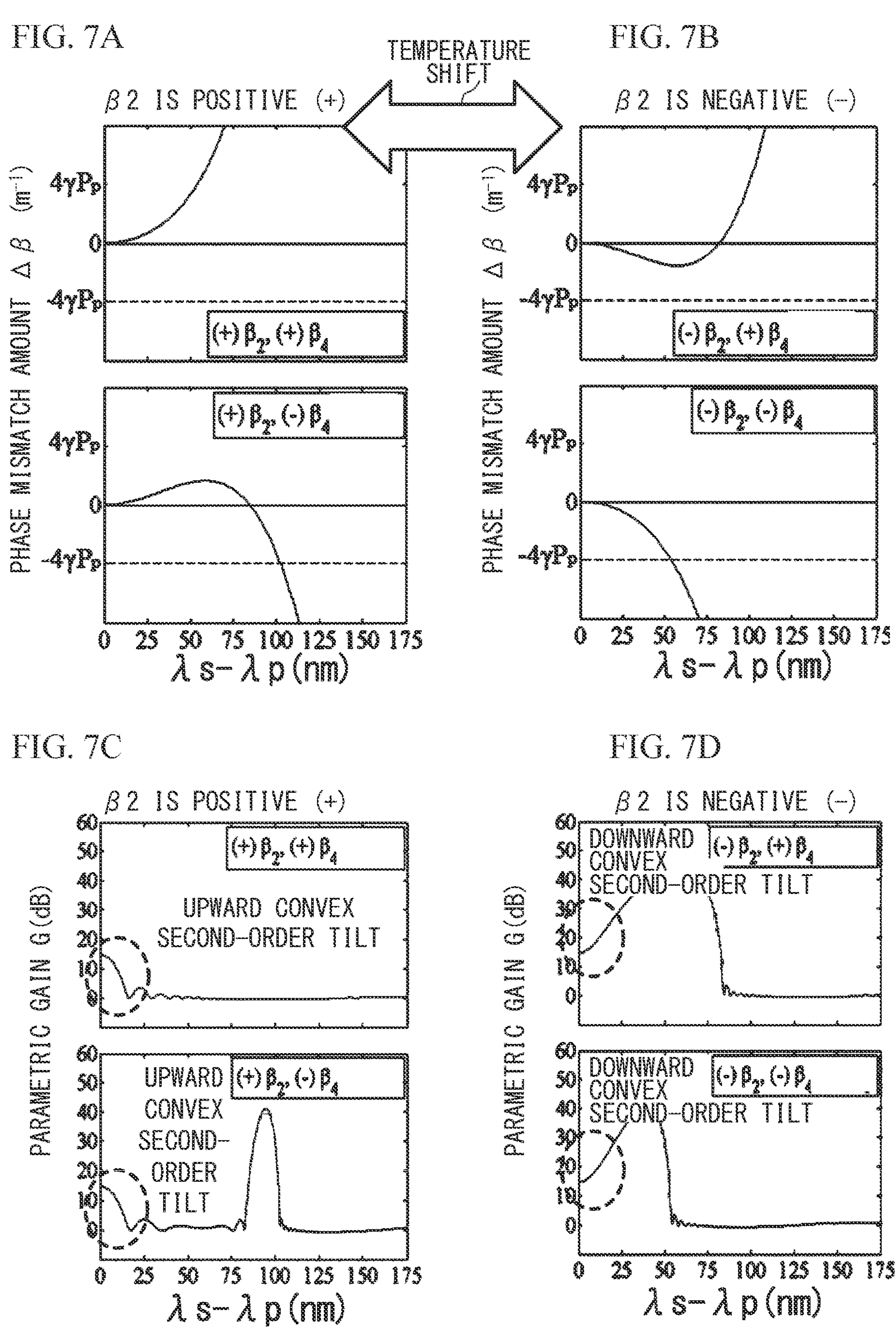
FIG. 7A to FIG. 7D are graphs for describing a relationship between wavelength difference and the amount of phase mismatch and a relationship between wavelength difference and parametric gain.

Here, in the above calculation formula (3), the influence of the sixth-order dispersion $\oplus_6$ on the phase mismatch amount $\Delta\beta$ is slight and may be ignored. Therefore, as long as the fourth-order dispersion $\beta_4$ is non-zero, the phase mismatch amount $\Delta\beta$ can be approximated by a fourth-order equation, and as illustrated in FIG. 7A and FIG. 7B, the phase mismatch amount $\Delta\beta$ can be represented by the fourth-order graph. The upper part of FIG. 7A illustrates a case where both the dispersion $\beta_2$ and the dispersion $\beta_4$ are positive (+), and the lower part of FIG. 7A illustrates a case where the dispersion $\beta_2$ is positive and the dispersion $\beta_4$ is negative (−). On the other hand, the upper part of FIG. 7B illustrates a case where the dispersion $\beta_2$ is negative and the dispersion $\beta_4$ is positive, and the lower part of FIG. 7B illustrates a case where both the dispersion $\beta_2$ and the dispersion $\beta_4$ are negative.

When the phase mismatch amount $\Delta\beta$ is expressed by a fourth-order expression, a second-order tilt occurs as illustrated in FIG. 7C and FIG. 7D. The parametric gain G can be calculated by, for example, the following calculation formula (4).

<Calculation Formula (4)>

$$G=10\log(Psout/Psin) \tag{4}$$

Note that Psout represents the output power of the signal light output from the wavelength conversion medium 213. Psin represents the input power of the signal light input to the wavelength conversion medium 213.

Here, as illustrated in FIG. 7C and FIG. 7D, the direction of the second-order tilt is determined by whether the dispersion $\beta_2$ is positive or negative. For example, when the dispersion $\beta_2$ is positive, an upward convex second-order tilt is generated, and when the dispersion $\beta_2$ is negative, a downward convex second-order tilt is generated. Since the dispersion $\beta_2$ is shifted by the temperature of the wavelength conversion medium 213, the second-order tilt can be controlled by the control unit 209 controlling the temperature of the wavelength conversion medium 213. This allows the shape of the second-order tilt generated in the optical transmission line 300 to be changed when the second-order tilt is generated in the wavelength conversion medium 213, as illustrated in FIG. 8, for example.

Figure 21:
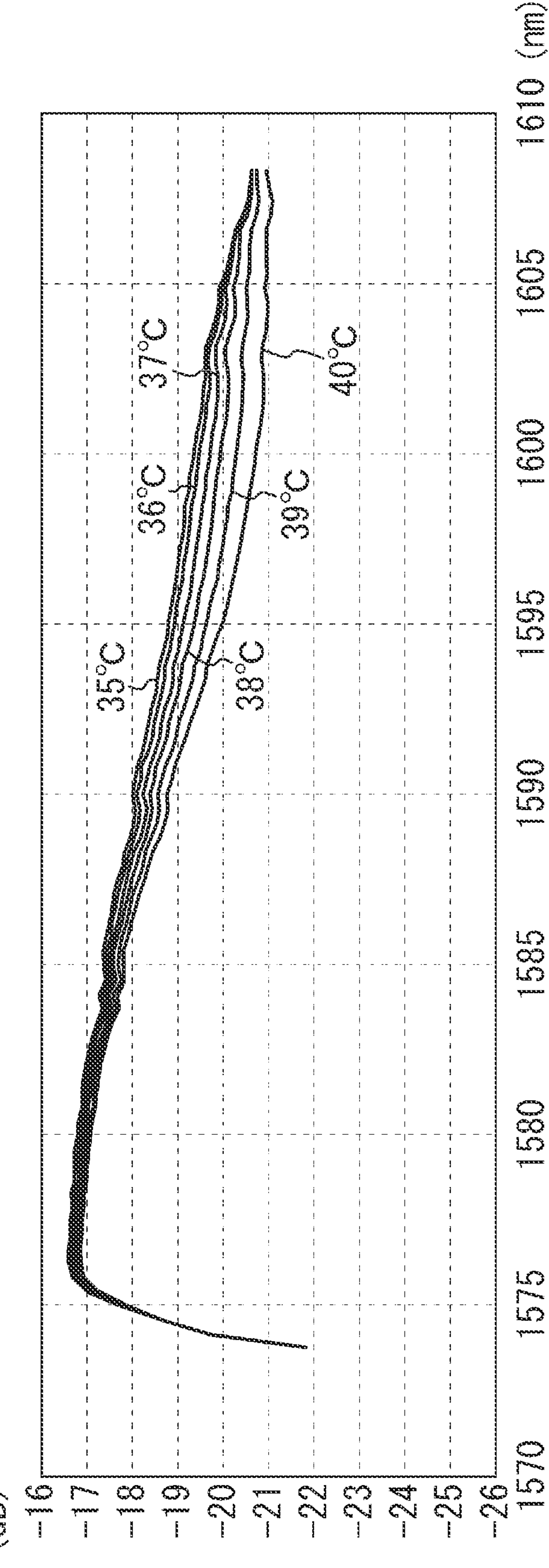
FIG. 21 illustrates an example of spectral variation.

Although parametric amplification has been described here for the sake of convenience, a similar second-order tilt change can be confirmed in wavelength conversion. FIG. 21 illustrates a change in the spectrum (wavelength range: 1575 nm to 1608 nm) of the pseudo WDM signal converted into the L-band when the highly nonlinear fiber is used and the temperature is controlled in increments of 1° C. It can be confirmed that a temperature change of 5° C. causes almost no intensity change due to the temperature change in the range of the wavelengths 1575 nm to 1585 nm, but causes a maximum change of 2 dB in the range of the wavelengths 1585 nm to 1608 nm. This indicates that there is a possibility that the second-order tilt of about 2 dB is compensated although the amount of tilt control is smaller than that of the parametric amplification.

Figure 9:
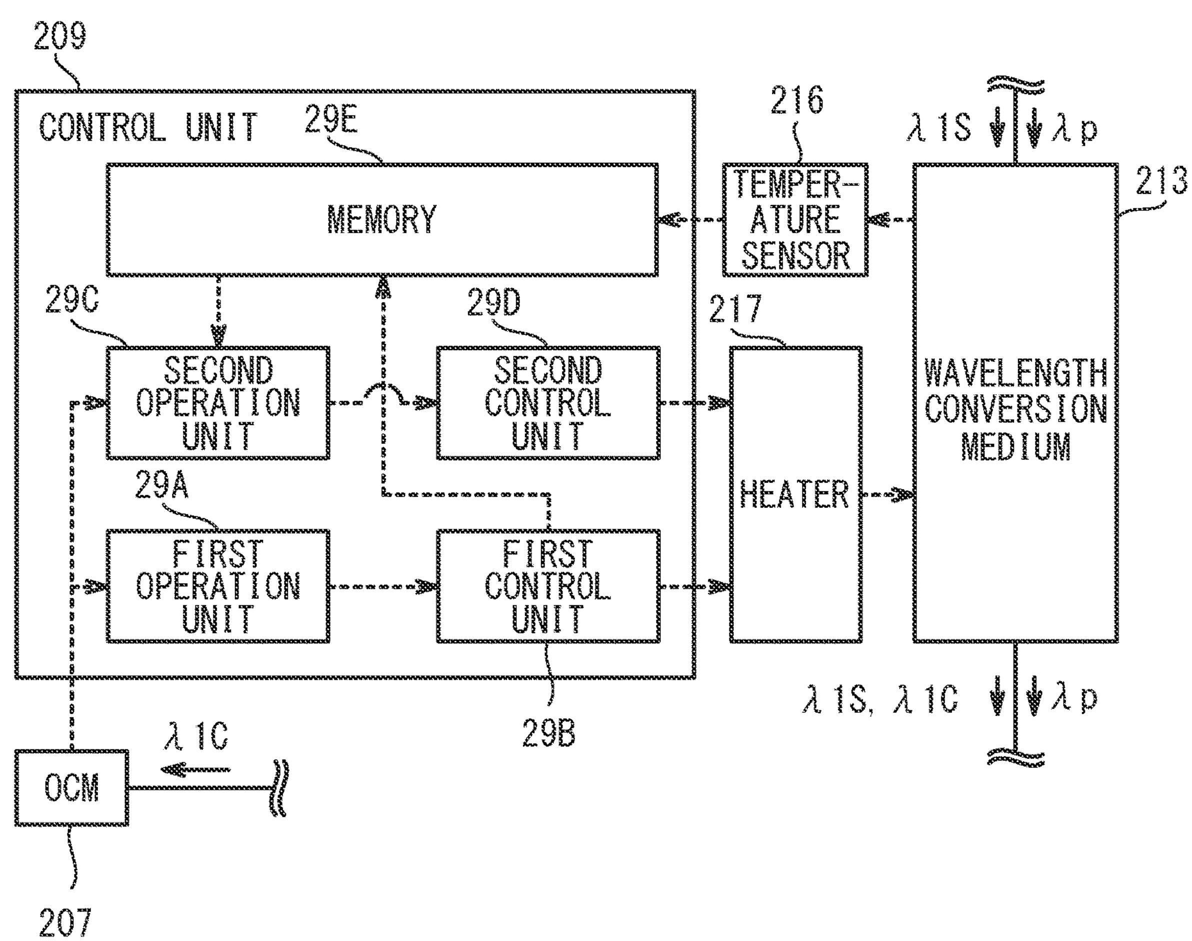
FIG. 9 illustrates an example of a control unit at the receiving end in accordance with the first embodiment.

Next, details of the control unit 209 will be described with reference to FIG. 9. Since the control unit 209-1 basically has the same configuration as the control unit 209, a detailed description thereof will be omitted.

The control unit 209 includes a first operation unit 29A, a first control unit 29B, a second operation unit 29C, a second control unit 29D, and a memory 29E as hardware circuits. The first control unit 29B and the second control unit 29D are examples of a control unit (specifically, a receiving-end control unit). The memory 29E is an example of a storage unit (specifically, a first storage unit). The first operation unit 29A, the first control unit 29B, the second operation unit 29C, the second control unit 29D, and the memory 29E are implemented by, for example, a single large-scale integration (LSI). The first operation unit 29A and the first control unit 29B cooperate with each other to compensate for variations in zero-dispersion wavelengths. The second operation unit 29C and the second control unit 29D cooperate with each other to compensate for the second-order tilt generated in the optical transmission line 300. The details of the operation of the first operation unit 29A and the first control unit 29B for compensating for variations in zero-dispersion wavelengths and the operation of the second operation unit 29C and the second control unit 29D for compensating for the second-order tilt will be described later.

The first operation unit 29A, the first control unit 29B, the second operation unit 29C, and the second control unit 29D may be implemented by, for example, a single central processing unit (CPU), or may be implemented by individual CPUs. The first operation unit 29A, the first control unit 29B, the second operation unit 29C, and the second control unit 29D may be implemented by a single or a plurality of application specific integrated circuits (ASICs), or may be implemented by a single or a plurality of field programmable gate arrays (FPGAs). The memory 29E includes, for example, a random-access memory (RAM) and a read only memory (ROM). The wavelength conversion device 200 is operated when the program stored in the memory 29E is read and executed by, for example, a CPU or other device. The program corresponds to a flowchart described later.

Figure 10:
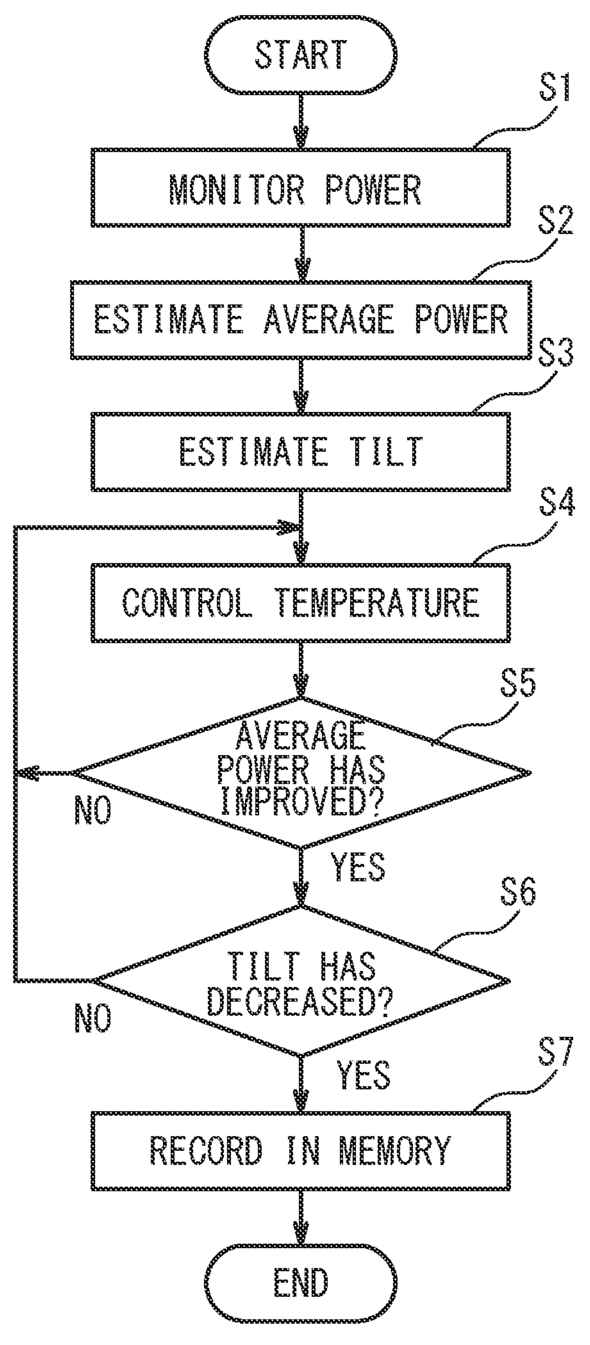
FIG. 10 is a flow chart illustrating an example of compensation for variations in zero-dispersion wavelengths.

Next, the first compensation operation of the wavelength conversion device 200 of the first embodiment will be described with reference to FIG. 10. The first compensation operation is an operation of compensating for variations in zero-dispersion wavelengths, and is executed by the OCM 207, the first operation unit 29A, and the first control unit 29B.

For example, when power is supplied to the wavelength conversion device 200 and the operation of the wavelength conversion device 200 starts, the OCM 207 monitors the power of the wavelength-multiplexed light λ1C (step S1). More specifically, the OCM 207 monitors the optical power of the plurality of single-wavelength lights λ11, . . . , λ1$n$ included in the wavelength-multiplexed light λ1C. Observing the optical power, the OCM 207 outputs the monitoring result to the first operation unit 29A by an electrical control signal. The monitoring result includes each wavelength and the optical power of each wavelength.

When the monitoring result is input, the first operation unit 29A estimates the average power of the wavelength-multiplexed light λ1C based on the monitoring result (step S2). Specifically, the first operation unit 29A estimates the average power by dividing the sum of the optical power of each wavelength by the number of wavelengths. When the average power is estimated, the first operation unit 29A estimates the tilt of the wavelength-multiplexed light λ1C based on the monitoring result (step S3). Specifically, the first operation unit 29A estimates the tilt of the wavelength-multiplexed light λ1C by calculating the difference between the optical power at a side of a longer wavelength and the optical power at a side of a shorter wavelength. The first operation unit 29A may estimate the average power and the tilt based on the monitoring result and a known calculation formula. Further, the processing order of steps S2 and S3 may be reversed.

When the first operation unit 29A estimates the tilt, the first control unit 29B controls the temperature of the heater 217 (step S4). For example, the first control unit 29B sets the temperature of the heater 217 to a temperature corresponding to the average power based on a formula (or a function) that defines the relationship between the average power and the temperature. The first control unit 29B may set the temperature of the heater 217 to a temperature corresponding to the average power by referring to a table defining the relationship between the average power and the temperature. Such a table defining the relationship between the average power and the temperature may be stored in the memory 29E. When the first control unit 29B controls the temperature of the heater 217 and the temperature of the wavelength conversion medium 213 rises, the conversion characteristics of the wavelength conversion medium 213 are adjusted and the average power estimated by the first operation unit 29A changes.

When the temperature of the heater 217 is controlled, the first operation unit 29A determines whether the average power has improved (step S5). For example, the first operation unit 29A compares the average power before and after the temperature rise and determines whether the average power has improved. When the average power has not improved (step S5: NO), the first control unit 29B executes the process of step S4. This causes the first control unit 29B to control the temperature of the heater 217 again. In this manner, the first control unit 29B controls the temperature of the heater 217 until the average power has improved.

When the average power has improved (step S5: YES), the first operation unit 29A determines whether the tilt has decreased (step S6). For example, the first operation unit 29A compares the tilt before and after the temperature rise and determines whether the tilt has decreased. When the tilt has not decreased (step S6: NO), the first control unit 29B executes the process of step S4. That is, the first control unit 29B controls the temperature of the heater 217 until the tilt has decreased. This causes the first control unit 29B to control the temperature of the heater 217 again. As described above, the first control unit 29B controls the temperature of the heater 217 until the average power has improved and the tilt has decreased.

When the tilt has not decreased, the first control unit 29B controls the temperature of the heater 217 based on a formula (or a function) defining the relationship between the tilt and the temperature. The first control unit 29B may control the temperature of the heater 217 by referring to a table defining the relationship between the tilt and the temperature. Such a table defining the relationship between the tilt and the temperature may be stored in the memory 29E.

When the tilt has decreased (step S6: YES), the first control unit 29B associates the average power and the tilt with which the determinations in steps S5 and S6 are affirmed with the temperature setting value for the heater 217 when it is determined that the average power has improved and the tilt has decreased, and records them in the memory 29E as control information (specifically, first control information) (step S7). For example, a formula (or a function) or a table may be used for the association. The first control unit 29B may instruct the temperature sensor 216 to record the temperature when it is determined that the average power has improved and the tilt has decreased in the memory 29E, and the temperature sensor 216 may record the temperature in the memory 29E as the temperature setting value. When the average power, the tilt, and the temperature setting value are recorded, the first compensation operation for variations in zero-dispersion wavelengths, executed by the OCM 207, the first operation unit 29A, and the first control unit 29B is completed. As described above, the control unit 209 performs control to adjust the conversion characteristics of the wavelength conversion medium 213 so as to compensate for variations in zero-dispersion wavelengths.

Figure 11:
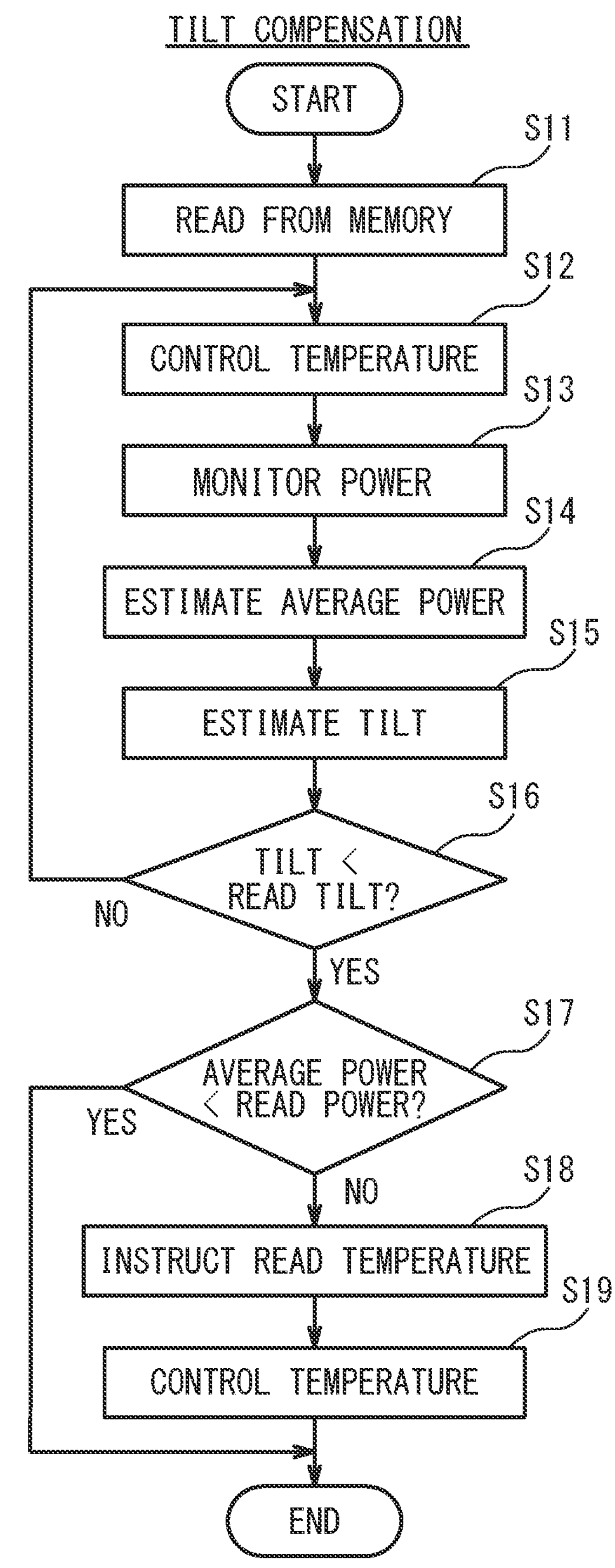
FIG. 11 is a flowchart illustrating an example of tilt compensation in accordance with the first embodiment.

Next, a second compensation operation of the wavelength conversion device 200 of the first embodiment will be described with reference to FIG. 11. The second compensation operation is an operation of compensating for the second-order tilt and is executed by the OCM 207, the second operation unit 29C, and the second control unit 29D.

First, the second operation unit 29C reads, from the memory 29E, the control information in which the average power, the tilt, and the temperature setting value are associated with each other (step S11). Here, the control information recorded in the memory 29E in step S7 is used in order to obtain fine accuracy. Note that control information predetermined within a controllable range may be recorded in the memory 29E and utilized.

When the control information is read out, the second control unit 29D controls the temperature of the heater 217 (step S12). For example, the second control unit 29D sets the temperature of the heater 217 to a temperature corresponding to the average power based on a formula (or a function) that defines the relationship between the average power and the temperature. The second control unit 29D may set the temperature of the heater 217 to a temperature corresponding to the average power by referring to a table defining the relationship between the average power and the temperature. When the second control unit 29D controls the temperature of the heater 217 and the temperature of the wavelength conversion medium 213 thereby rises, the conversion characteristics of the wavelength conversion medium 213 are adjusted and the average power estimated by the second operation unit 29C changes. The first control unit 29B may control the temperature of the TEC. In this case, the temperature of the wavelength conversion medium 213 decreases.

When the temperature is controlled, the OCM 207 monitors the power of the wavelength-multiplexed light λ1C (step S13). More specifically, the OCM 207 monitors the optical power of the plurality of single-wavelength lights λ11, . . . , λ1*n* included in the wavelength-multiplexed light λ1C. When the optical power is monitored, the OCM 207 outputs the monitoring result to the second operation unit 29C by an electrical control signal.

When the monitoring result is input, the second operation unit 29C estimates the average power of the wavelength-multiplexed light λ1C based on the monitoring result (step S14). Specifically, the second operation unit 29C estimates the average power by dividing the sum of the optical power of each wavelength by the number of wavelengths. When the average power is estimated, the second operation unit 29C estimates the tilt of the wavelength-multiplexed light λ1C based on the monitoring result (step S15). Specifically, the second operation unit 29C estimates the tilt of the wavelength-multiplexed light λ1C by calculating the difference between the optical power at a side of a longer wavelength and the optical power at a side of a shorter wavelength. The second operation unit 29C may estimate the average power and the tilt based on the monitoring result and a known calculation formula. Further, the processing order of steps S14 and S15 may be reversed.

When the second operation unit 29C estimates the tilt, the second control unit 29D determines whether the tilt estimated by the second operation unit 29C is less than the read tilt, which is the tilt read in the process of step S11 (step S16). When the estimated tilt is equal to or larger than the read tilt (step S16: NO), the processes from step S12 to step S15 are repeated. In other words, the processes from steps S12 to S15 are repeated until the estimated tilt becomes less than the read tilt. This maintains compensation for variations in zero-dispersion wavelengths.

When the estimated tilt is less than the read tilt (step S16: YES), the second control unit 29D determines whether the average power estimated by the second operation unit 29C is less than the read power, which is the average power read in the process of step S11 (step S17). When the estimated average power is equal to or larger than the read power (step S17: NO), the second operation unit 29C instructs the second control unit 29D to perform temperature control based on the read temperature, which is the temperature setting value read in the process of step S11 (step S18).

Thus, the second control unit 29D controls the temperature of the heater 217 based on the read temperature (Step S19). As described above, when there is a possibility that the compensation for variations in zero-dispersion wavelengths is impaired due to the excessive average power, the tilt compensation is reset in the middle of the processing. This maintains compensation for variations in zero-dispersion wavelengths.

On the other hand, when the estimated average power is less than the read power (step S17: YES), the processes of steps S18 and S19 are skipped. As a result, compensation for variations in zero-dispersion wavelengths and the tilt compensation are both achieved. When the estimated average power is less than the read power or when the process of step S19 is completed, the second compensation operation for the second-order tilt by the OCM 207, the second operation unit 29C, and the second control unit 29D is completed.

As described above, in the wavelength conversion device 200 in accordance with the first embodiment, the OCM 207 monitors the power of the wavelength-multiplexed light λ1C, and the control unit 209 performs control to adjust the conversion characteristics of the wavelength conversion medium 213 using the control information acquired from the memory 29E according to the monitoring result. For example, the control unit 209 performs control to adjust the temperature of the wavelength conversion medium 213 and the wavelength of the pumping light λp by controlling the temperature of the heater 217. This compensates for the second-order tilt while compensating for variations in zero-dispersion wavelengths.

When the control unit 209 adjusts the conversion characteristics of the wavelength conversion medium 213, the conversion efficiency of the wavelength conversion medium 213 may be reduced based on the adjustment of the conversion characteristics. Specifically, there is a possibility that the conversion efficiency of the wavelength band from the S-band to the C-band is reduced and highly accurate conversion may be interrupted. Therefore, the control unit 209 determines whether the amount of decrease in the conversion efficiency based on the adjustment of the conversion characteristics of the wavelength conversion medium 213 is equal to or greater than a predetermined amount. Then, when the decrease amount of the conversion efficiency is equal to or greater than the predetermined amount, the control unit 209 resets the compensation for the second-order tilt, and adjusts the conversion characteristics of the wavelength conversion medium 213 so as to compensate for variations in zero-dispersion wavelengths in preference to the compensation for the second-order tilt.

Second Embodiment

Figure 12:
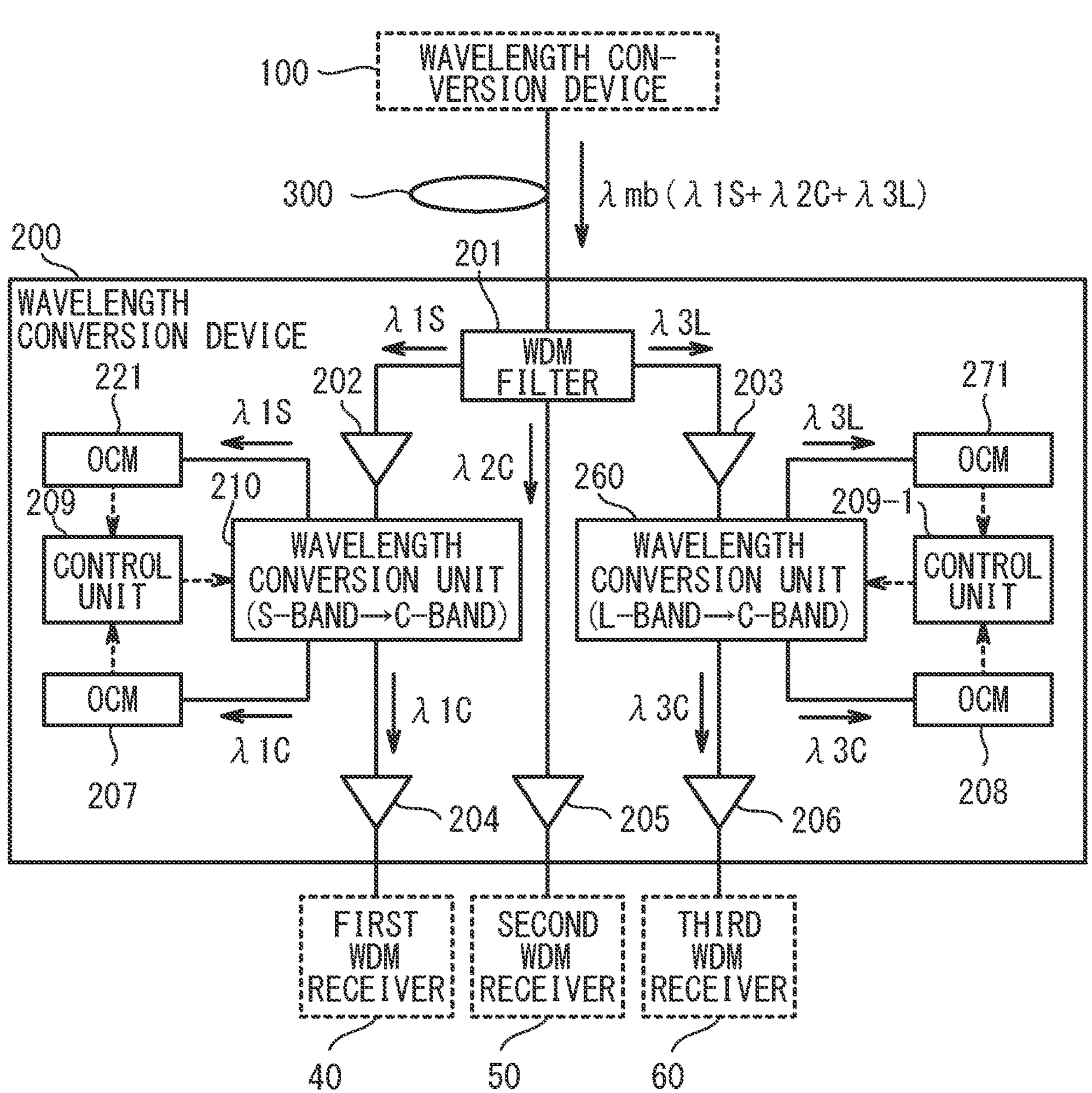
FIG. 12 illustrates an example of a wavelength conversion device at the receiving end in accordance with a second embodiment.
Figure 13:
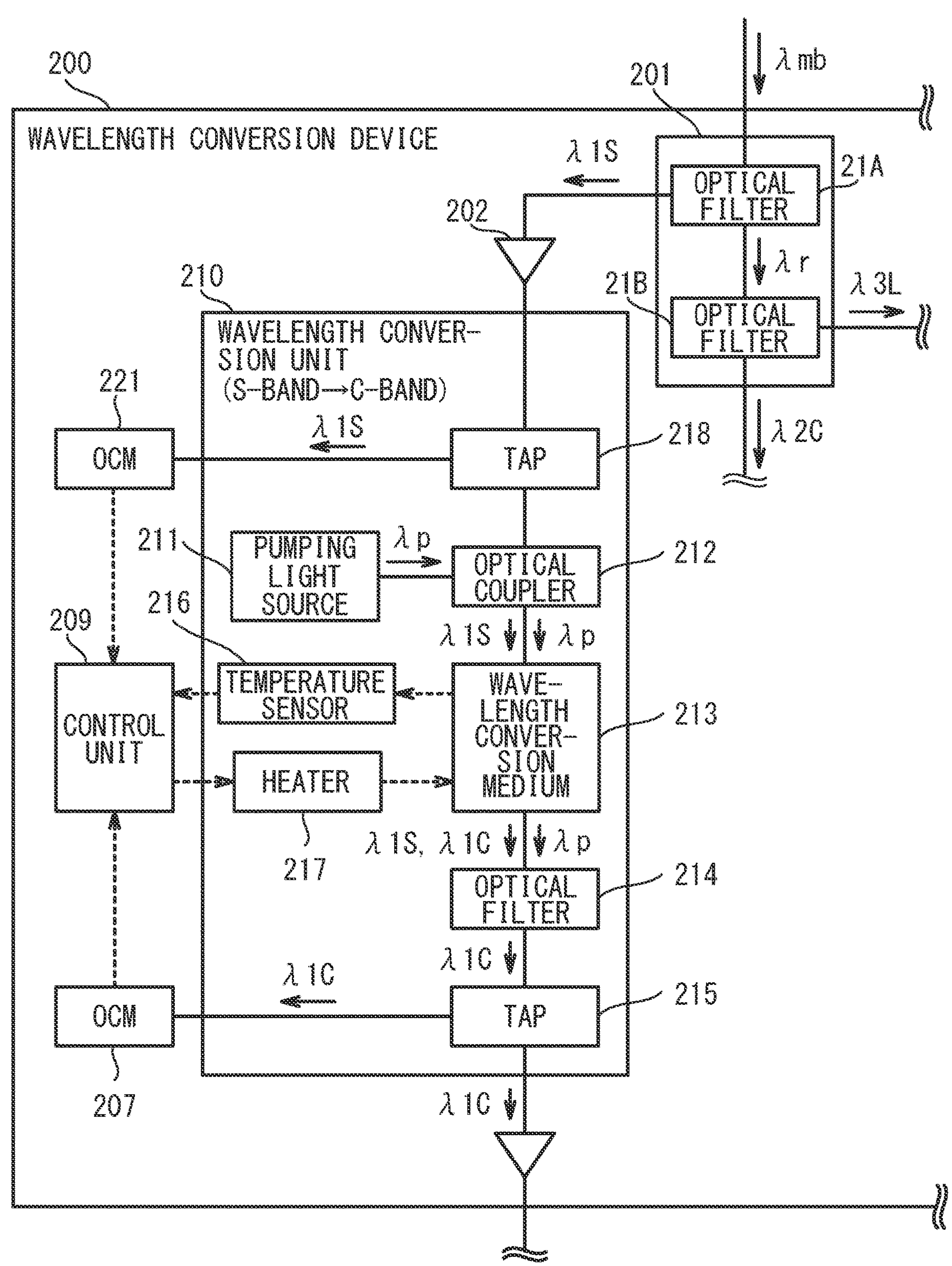
FIG. 13 illustrates an example of the wavelength conversion unit at the receiving end in accordance with the second embodiment.

Next, a second embodiment will be described with reference to FIG. 12 to FIG. 15. In FIG. 12 to FIG. 14, components similar to those illustrated in FIG. 4, FIG. 5, and FIG. 9 are denoted by the same reference numerals in principle, and description thereof is omitted.

As illustrated in FIG. 12, the wavelength conversion device 200 in accordance with the second embodiment further includes OCMs 221 and 271 as compared with the wavelength conversion device 200 of the first embodiment. The OCMs 221 and 271 are examples of a receiving-end second monitor. The OCM 221 may be included in the control unit 209. The OCM 271 may be included in the control unit 209-1.

As illustrated in FIG. 13, the wavelength conversion unit 210 in accordance with the second embodiment includes a TAP 218 prior to the optical coupler 212, and the TAP 218 is connected to the OCM 221. Therefore, when the wavelength-multiplexed light λ1S belonging to the S-band is input to the wavelength conversion unit 210, the wavelength-multiplexed light λ1S is branched by the TAP 218 and input to the OCM 221. That is, the OCM 221 monitors the power of the wavelength-multiplexed light λ1S before being input to the wavelength conversion medium 213. More specifically, the OCM 221 monitors the optical power of a plurality of wavelength lights included in the wavelength-multiplexed light λ1S. The OCM 221 outputs the monitoring result to the control unit 209 by an electrical control signal.

The wavelength conversion unit 260 of the second embodiment basically has the same configuration as the wavelength conversion unit 210 of the first embodiment. Therefore, when the wavelength-multiplexed light λ3L belonging to the L-band is input to the wavelength conversion unit 260, the wavelength-multiplexed light λ3L is branched by the TAP (not illustrated) included in the wavelength conversion unit 260 and input to the OCM 271 (see FIG. 12). That is, the OCM 271 monitors the power of the wavelength-multiplexed light λ3L before being input to the wavelength conversion medium of the wavelength conversion unit 260. More specifically, the OCM 271 monitors the optical power of a plurality of wavelength lights included in the wavelength-multiplexed light λ3L. The OCM 271 outputs the monitoring result to the control unit 209-1 by an electrical control signal. The monitoring results output by the OCMs 221 and 271 are examples of a second monitoring result.

As illustrated in FIG. 14, the control unit 209 of the second embodiment includes the first operation unit 29A, the first control unit 29B, and the memory 29E. The control unit 209 of the second embodiment is different from the control unit 209 of the first embodiment in that the second operation unit 29C and the second control unit 29D are not included. The monitoring result output by the OCM 221 is input to the first operation unit 29A. Therefore, the monitoring result output by the OCM 207 and the monitoring result output by the OCM 221 are input to the first operation unit 29A. Since the control unit 209-1 of the second embodiment basically has the same configuration as the control unit 209 of the second embodiment, a detailed description thereof will be omitted.

Figure 15:
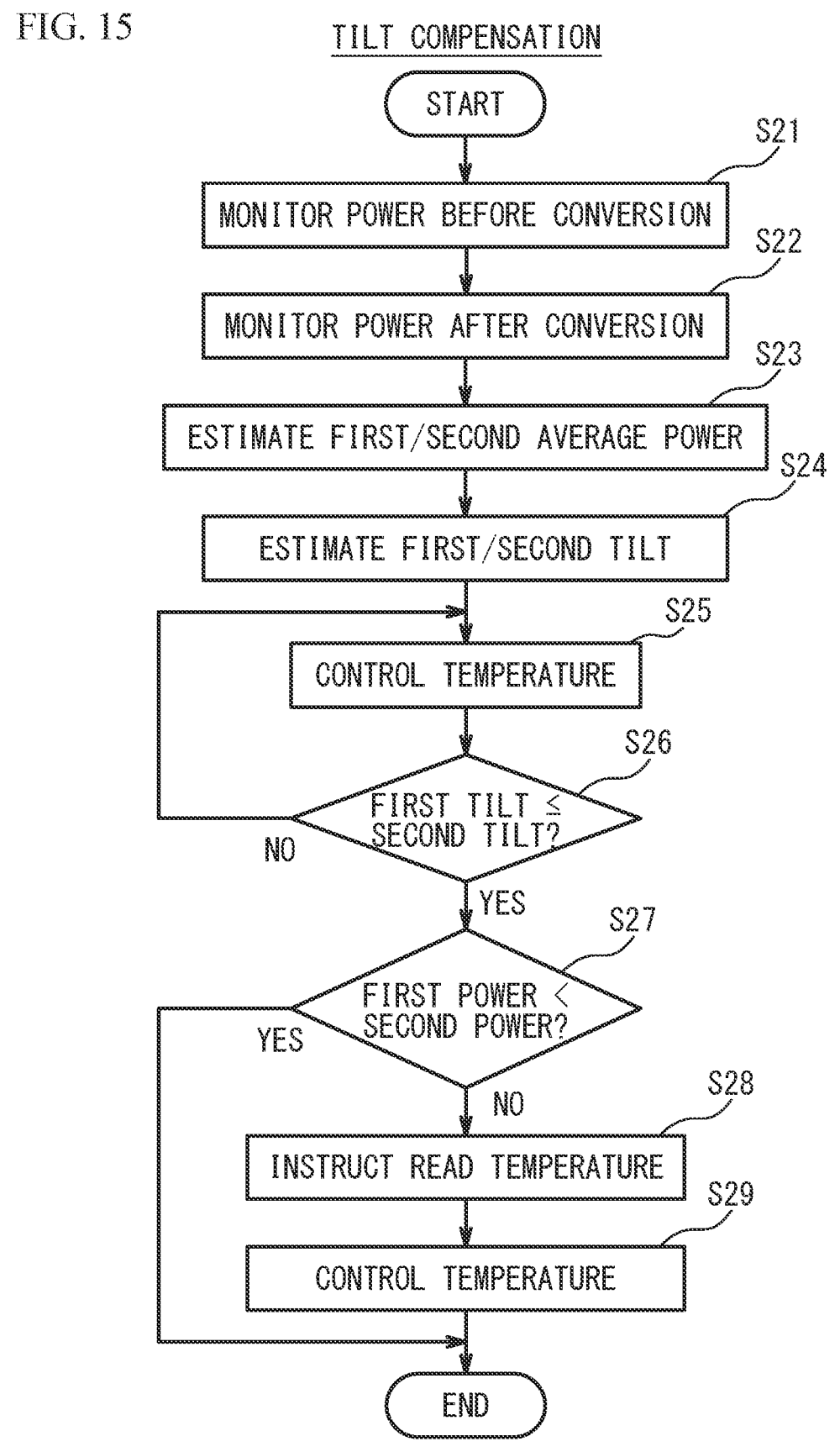

Next, the second compensation operation of the wavelength conversion device 200 in accordance with the second embodiment will be described with reference to FIG. 15. The second compensation operation of the second embodiment is an operation of compensating for the second-order tilt by the OCMs 207 and 221, the first operation unit 29A, and the first control unit 29B. Since the first compensation operation for compensating for variations in zero-dispersion wavelengths is common to the first embodiment, a detailed description thereof will be omitted in the second embodiment.

First, the OCM 221 monitors the power of the wavelength-multiplexed light λ1S before the wavelength band is converted (step S21). More specifically, the OCM 221 monitors the optical power of a plurality of wavelength lights included in the wavelength-multiplexed light λ1S. When the optical power is monitored, the OCM 207 outputs the monitoring result to the first operation unit 29A by an electrical control signal.

Then, the OCM 207 monitors the power of the wavelength-multiplexed light λ1C after the wavelength band is converted (step S22). More specifically, the OCM 207 monitors the optical power of the plurality of single-wavelength lights λ11, . . . , λ1*n* included in the wavelength-multiplexed light λ1C. When the optical power is monitored, the OCM 207 outputs the monitoring result to the first operation unit 29A by an electrical control signal.

When the monitoring results are input from the OCMs 207 and 221 to the first operation unit 29A, the first operation unit 29A estimates the first average power and the second average power (step S23). Specifically, the first operation unit 29A estimates the first average power of the wavelength-multiplexed light λ1C based on the monitoring result input from the OCM 207. The first operation unit 29A estimates the second average power of the wavelength-multiplexed light λ1S based on the monitoring result input from the OCM 221.

When the first average power and the second average power are estimated, the first operation unit 29A estimates a first tilt and a second tilt (step S24). Specifically, the first operation unit 29A estimates the first tilt of the wavelength-multiplexed light λ1C based on the monitoring result input from the OCM 207. The first operation unit 29A estimates the second tilt of the wavelength-multiplexed light λ1S based on the monitoring result input from the OCM 221.

When the first tilt and the second tilt are estimated, the first control unit 29B controls the temperature of the heater 217 (step S25). As described in the first embodiment, the first control unit 29B controls the temperature of the heater 217 based on a formula or by referring to a table. When the temperature of the heater 217 is controlled, the first operation unit 29A determines whether the first tilt is equal to or less than the second tilt (step S26). When the first tilt is not equal to or less than the second tilt (step S26: NO), the first control unit 29B executes the process of step S25. This causes the first control unit 29B to control the temperature of the heater 217 again. As described above, the first control unit 29B controls the temperature of the heater 217 until the first tilt becomes equal to or less than the second tilt.

When the first tilt becomes equal to or less than the second tilt (step S26: YES), the first operation unit 29A determines whether the first average power is less than the second average power (step S27). In FIG. 15, the first average power is simply referred to as a first power, and the second average power is simply referred to as a second power. When the first average power is not less than the second average power (step S27: NO), the first operation unit 29A reads the temperature setting value from the memory 29E and instructs the first control unit 29B to perform temperature control based on the read temperature, which is the temperature setting value that has been read (step S28).

Thus, the first control unit 29B controls the temperature of the heater 217 based on the read temperature (Step S29). As described above, when there is a possibility that the compensation for variations in zero-dispersion wavelengths is impaired because the first average power becomes equal to or larger than the second average power, the tilt compensation is reset in the middle of the processing. This maintains compensation for variations in zero-dispersion wavelengths.

On the other hand, when the first average power is less than the second average power (step S27: YES), the processes of steps S28 and S29 are skipped. As a result, compensation for variations in zero-dispersion wavelengths and tilt compensation are both achieved. When the first average power is less than the second average power, or when the process of step S29 is completed, the second compensation operation for the second-order tilt by the OCMs 207 and 221, the first operation unit 29A, and the first control unit 29B is completed.

As described above, in the wavelength conversion device 200 in accordance with the second embodiment, the OCMs 207 and 221 monitor the power of the wavelength-multiplexed light λ1C and the power of the wavelength-multiplexed light λ1S, respectively, and the control unit 209 adjusts the conversion characteristics of the wavelength conversion medium 213 based on these monitoring results. Thus, the second-order tilt is compensated while variations in zero-dispersion wavelengths are compensated.

Third Embodiment

Next, a third embodiment will be described with reference to FIG. 16 to FIG. 20. In FIG. 16 to FIG. 19B, the same components as those illustrated in FIG. 3 to FIG. 5 and FIG.

9 are denoted by the same reference numerals in principle, and description thereof is omitted.

Figure 16:
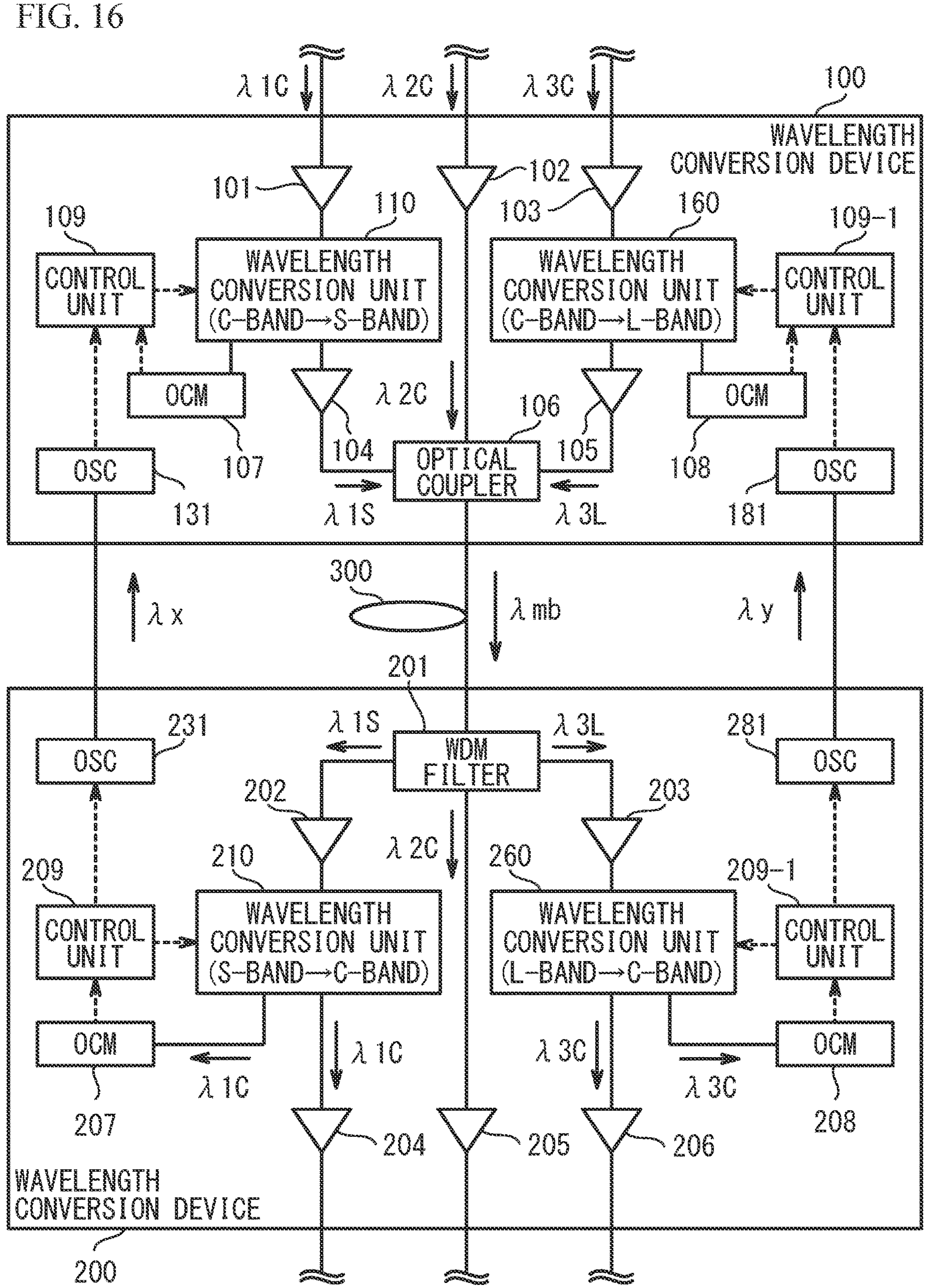
FIG. 16 illustrates a wavelength conversion device at the transmitting end and a wavelength conversion device at the receiving end in accordance with a third embodiment.

As illustrated in FIG. 16, the wavelength conversion device 100 of the third embodiment further includes OCMs 107 and 108, control units 109 and 109-1 and optical supervisory channel (OSC) communication units (simply referred to as OSC in FIGS. 16) 131 and 181, as compared with the wavelength conversion device 100 of the first embodiment. The OCMs 107 and 108 are examples of a transmitting-end first monitor. The wavelength conversion device 200 of the third embodiment further includes OSC communication units 231 and 281, as compared with the wavelength conversion device 200 of the first embodiment. The OSC communication units 131 and 181 are example of an OSC reception unit. The OSC communication units 231 and 281 are examples of an OSC transmission unit.

Figure 17:
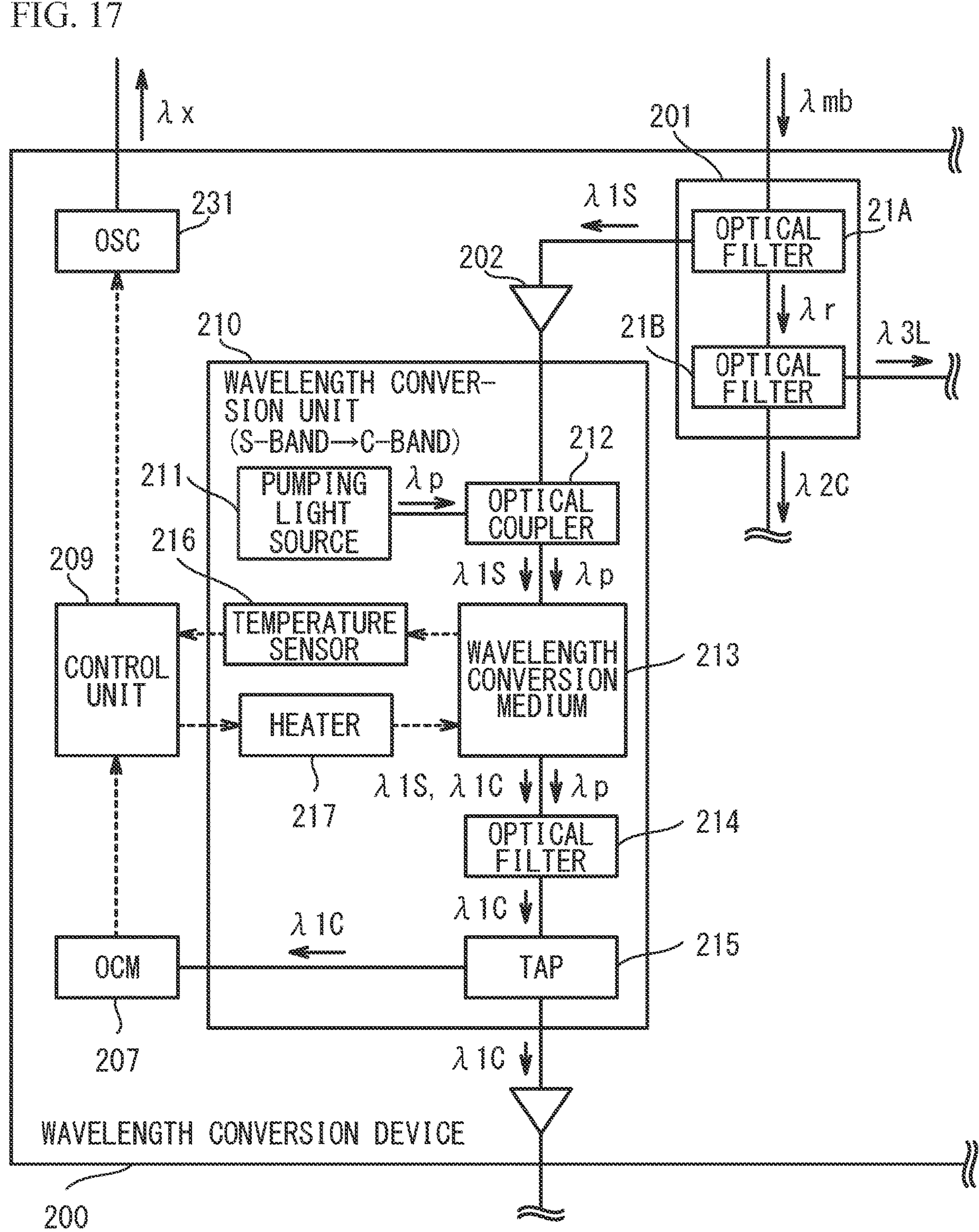
FIG. 17 illustrates the wavelength conversion unit at the receiving end in accordance with the third embodiment.

As illustrated in FIG. 17, the OSC communication unit 231 optically transmits an OSC light λx corresponding to the control signal output from the control unit 209. Although not illustrated in FIG. 17, the OSC communication unit 281 optically transmits an OSC light λy corresponding to the control signal output from the control unit 209-1. The OSC light λx may pass through the optical transmission line 300 or may pass through another optical transmission line different from the optical transmission line 300.

Figure 18:
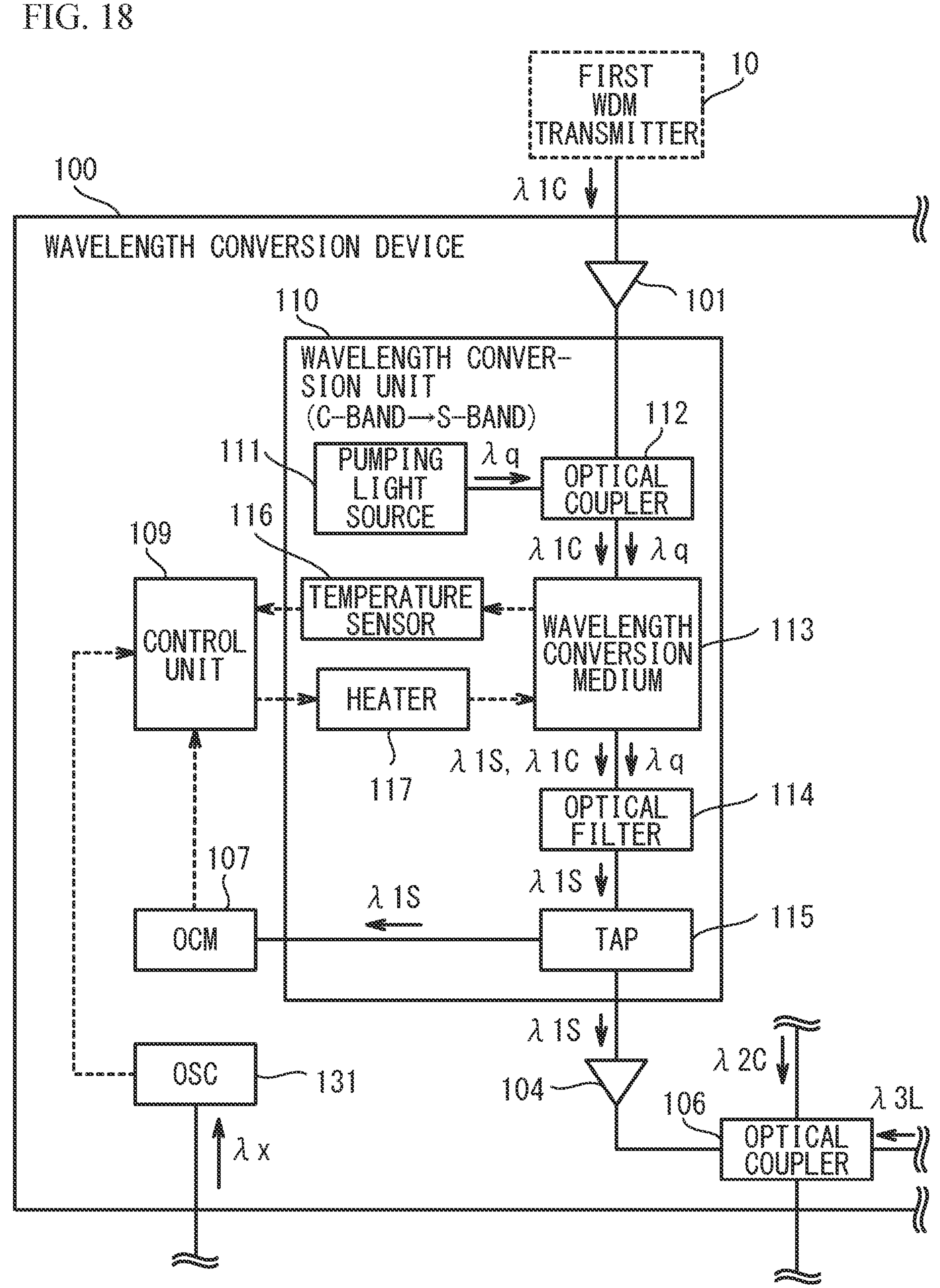
FIG. 18 illustrates the wavelength conversion unit at the transmitting end in accordance with the third embodiment.

As illustrated in FIG. 18, the wavelength conversion unit 110 includes a pumping light source 111, an optical coupler 112, a wavelength conversion medium 113, an optical filter 114, an optical branching tap (described as TAP in FIG. 18) 115, a temperature sensor 116, and a heater 117. The wavelength conversion unit 210 may include a TEC together with the heater 117. The wavelength conversion medium 113 is an example of a second optical medium.

The pumping light source 111 outputs a pumping light λq in a wavelength band shorter than the C-band. The pumping light λq contains two different wavelengths. The optical coupler 112 is connected to the optical amplifier 101. Therefore, the pumping light λq and the wavelength-multiplexed light λ1C are input to the optical coupler 112. The optical coupler 112 adds the pumping light λq to the wavelength-multiplexed light λ1C and outputs the resulting light to the wavelength conversion medium 113.

Similarly to the wavelength conversion medium 213, the wavelength conversion medium 113 converts the wavelength-multiplexed light λ1C to the wavelength-multiplexed light λ1S and outputs the wavelength-multiplexed light λ1S together with the wavelength-multiplexed light λ1C. On the other hand, the pumping light λq passes through the wavelength conversion medium 113. Therefore, the wavelength conversion medium 113 outputs the wavelength-multiplexed light λ1C, the wavelength-multiplexed light λ1S, and the pumping light λq.

The optical filter 114 removes the wavelength-multiplexed light λ1C and the pumping light λq from the wavelength-multiplexed light λ1C, the wavelength-multiplexed light λ1S, and the pumping light λq output from the wavelength conversion medium 113, and outputs the wavelength-multiplexed light λ1S. The optical branching tap 115 branches the wavelength-multiplexed light λ1S and outputs the wavelength-multiplexed lights λ1S to the optical amplifier 104 and an OCM 107. Thus, the optical amplifier 104 can amplify the wavelength-multiplexed light λ1S. Further, the OCM 107 can monitor the optical power of a plurality of wavelength lights included in the wavelength-multiplexed light λ1S.

The temperature sensor 116 detects the temperature of the wavelength conversion medium 113 and outputs the detected temperature to the control unit 109 by an electrical signal. The OSC communication unit 131 optically receives the OSC light λx transmitted from the OSC communication unit 231, and transmits a control signal corresponding to the OSC light λx to the control unit 109.

The control unit 109 controls the temperature of the heater 117 so as to compensate for the second-order tilt based on the monitoring result output from the OCM 107, the temperature of the wavelength conversion medium 213 detected by the temperature sensor 116, and the control signal transmitted from the OSC communication unit 131. Thereby, the conversion characteristics of the wavelength conversion medium 113 are adjusted.

As illustrated in FIG. 16, the OSC communication unit 281 optically transmits the OSC light λy corresponding to the control signal output from the control unit 209-1. The OSC communication unit 181 optically receives the OSC light λy transmitted from the OSC communication unit 281, and transmits a control signal according to the OSC light λy to the control unit 109-1. The OSC light λy may pass through the optical transmission line 300 or may pass through another optical transmission line different from the optical transmission line 300. The control unit 109-1 controls the temperature of a heater (not illustrated) included in the wavelength conversion unit 160 based on the control signal to adjust the conversion characteristics of the wavelength conversion medium (not illustrated) included in the wavelength conversion unit 160.

Figure 19A:
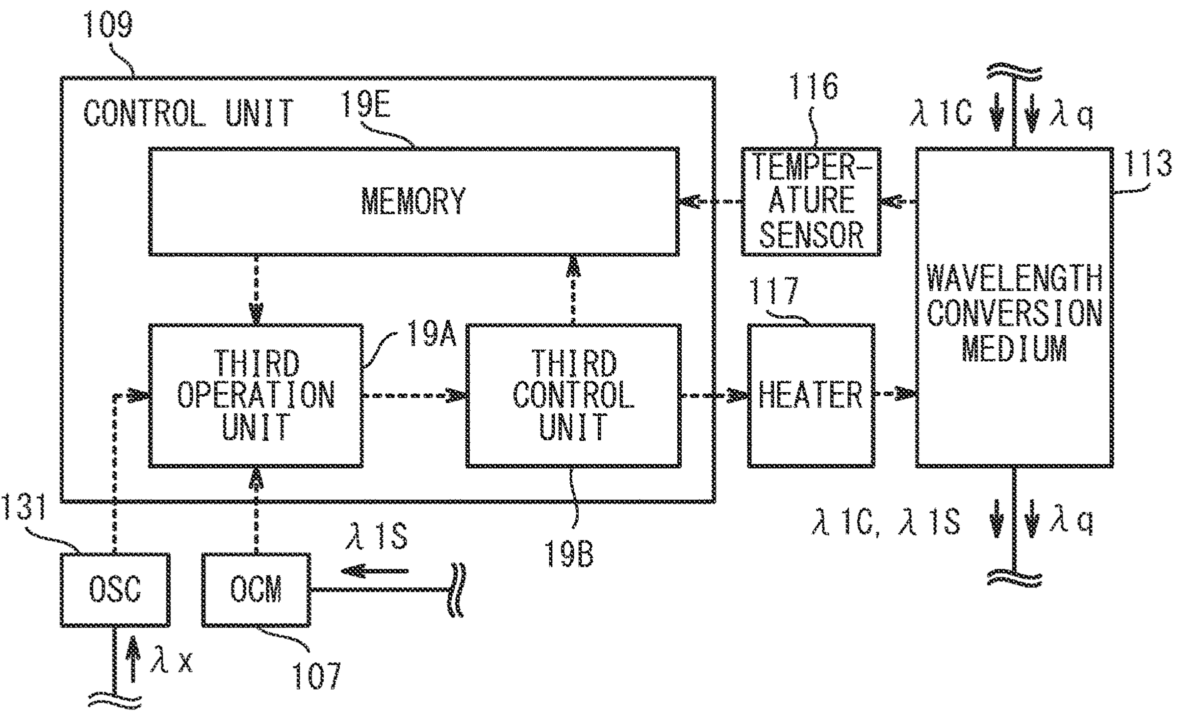
FIG. 19A and FIG. 19B illustrate control units in accordance with the third embodiment.

As illustrated in FIG. 19A, the control unit 109 of the third embodiment includes a third operation unit 19A, a third control unit 19B, and a memory 19E. The third control unit 19B is an example of a transmitting-end control unit. The memory 19E is an example of a second storage unit. As in the case of the first embodiment, the third control unit 19B records the average power, the tilt, and the temperature setting value for the heater 117 in association with each other as control information (specifically, second control information) in the memory 19E. The monitoring result transmitted by the OSC 131 is input to the third operation unit 19A. Since the control unit 109-1 of the third embodiment basically has the same configuration as the control unit 109 of the third embodiment, a detailed description thereof will be omitted.

Figure 19B:
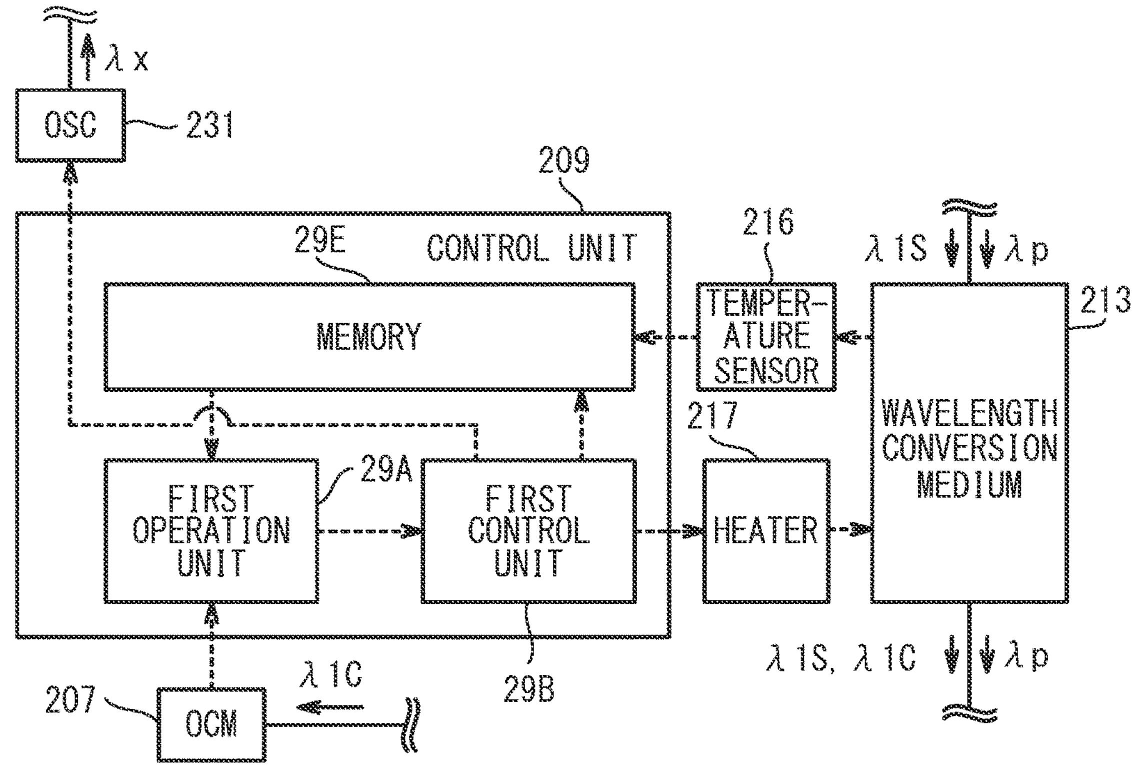

As illustrated in FIG. 19B, the control unit 209 of the third embodiment includes the first operation unit 29A, the first control unit 29B, and the memory 29E. The control signal transmitted by the first control unit 29B is input to the OSC communication unit 231. Since the control unit 209-1 of the third embodiment basically has the same configuration as the control unit 209 of the third embodiment, a detailed description thereof will be omitted.

Figure 20:
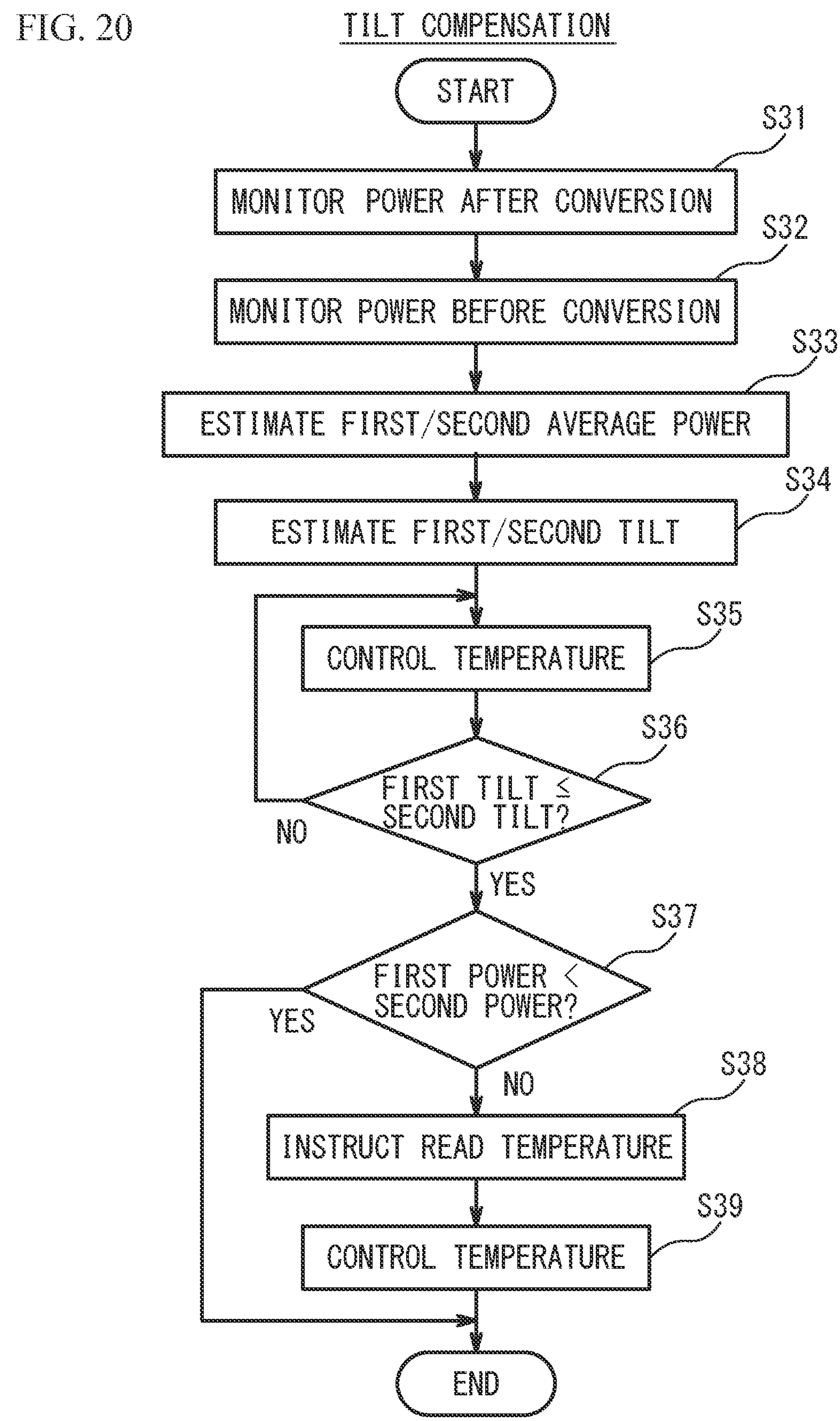
FIG. 20 is a flowchart illustrating an example of tilt compensation in accordance with the third embodiment.

Next, the second compensation operation of the wavelength conversion device 200 in accordance with the third embodiment will be described with reference to FIG. 20. The second compensation operation of the third embodiment is an operation of compensating for the second-order tilt by the OCMs 107 and 207, the first operation unit 29A, the first control unit 29B, the third operation unit 19A, the third control unit 19B, and the like. Since the first compensation operation for compensating for variations in zero-dispersion wavelengths is common to the first embodiment, a detailed description thereof will be omitted in the third embodiment.

First, the OCM 207 monitors the power of the wavelength-multiplexed light λ1C after the wavelength band is converted (step S31). More specifically, the OCM 207 monitors the optical power of the plurality of single-wavelength lights λ11, . . . , λ1*n* included in the wavelength-multiplexed light λ1C. When the optical power is monitored, the OCM 207 outputs the monitoring result to the first operation unit 29A by an electrical control signal.

Then, the OCM 107 monitors the power of the wavelength-multiplexed light λ1S before the wavelength band is converted by the wavelength conversion medium 113 (step S32). More specifically, the OCM 107 monitors the optical power of a plurality of wavelength lights included in the wavelength-multiplexed light λ1S after the wavelength band is converted by the wavelength conversion medium 113 and before the wavelength band is converted by the wavelength conversion medium 213. When the optical power is monitored, the OCM 107 outputs the monitoring result to the third operation unit 19A by an electrical control signal.

Then, the first operation unit 29A estimates the first average power, and the third operation unit 19A estimates the second average power (step S33). Specifically, when the monitoring result is input from the OCM 207 to the first operation unit 29A, the first operation unit 29A estimates the first average power based on the monitoring result input from the OCM 207. When the monitoring result is input from the OCM 107 to the third operation unit 19A, the third operation unit 19A estimates the second average power based on the monitoring result input from the OCM 107.

Then, the first operation unit 29A estimates the first tilt, and the third operation unit 19A estimates the second tilt (step S34). Specifically, the first operation unit 29A estimates the first tilt of the wavelength-multiplexed light λ1C based on the monitoring result input from the OCM 207. The third operation unit 19A estimates the second tilt of the wavelength-multiplexed light λ1S based on the monitoring result input from the OCM 107.

When the first operation unit 29A estimates the first average power and the first tilt, the first control unit 29B transmits a control signal including the first average power, the first tilt, and the temperature setting value stored in the memory 29E to the OSC communication unit 231. As a result, the OSC communication unit 231 transmits the OSC light λx according to the control signal. The OSC communication unit 131 receives the OSC light λx transmitted from the OSC communication unit 231 and transmits a control signal according to the OSC light λx to the third operation unit 19A.

When the first tilt and the second tilt are estimated, the third control unit 19B controls the temperature of the heater 117 (step S35). As in the first embodiment, the third control unit 19B controls the temperature of the heater 117 based on a formula or by referring to a table. When the temperature of the heater 117 is controlled, the third operation unit 19A determines whether the first tilt is equal to or less than the second tilt (step S36). When the first tilt is not equal to or less than the second tilt (step S36: NO), the third control unit 19B executes the process of step S35. This causes the third control unit 19B to control the temperature of the heater 117 again. As described above, the third control unit 19B controls the temperature of the heater 117 until the first tilt becomes equal to or less than the second tilt.

When the first tilt is equal to or less than the second tilt (step S36: YES), the third operation unit 19A determines whether the first average power is less than the second average power (step S37). In FIG. 20, the first average power is simply referred to as a first power, and the second average power is simply referred to as a second power. When the first average power is not less than the second average power (step S37: NO), the third operation unit 19A reads the temperature setting value from the control signal, and instructs the third control unit 19B to perform temperature control based on the read temperature which is the temperature setting value that has been read (step S38).

Thus, the third control unit 19B controls the temperature of the heater 117 based on the read temperature (step S39). As described above, when there is a possibility that the compensation for variations in zero-dispersion wavelengths is impaired because the first average power becomes equal to or larger than the second average power, the tilt compensation is reset in the middle of the processing. This maintains compensation for variations in zero-dispersion wavelengths.

On the other hand, when the first average power is less than the second average power (step S37: YES), the processes of steps S38 and S39 are skipped. As a result, compensation for variations in zero-dispersion wavelengths and tilt compensation are both achieved. When the first average power is less than the second average power, or when the process of step S39 is completed, the second compensation operation for the second-order tilt by the OCMs 107 and 207, the first operation unit 29A, the first control unit 29B, the third operation unit 19A, the third control unit 19B, and the like is completed.

As described above, in the wavelength conversion device 100 in accordance with the third embodiment, the OCM 107 monitors the power of the wavelength-multiplexed light λ1S, and the OCM 207 monitors the power of the wavelength-multiplexed light λ1C. The control unit 109 adjusts the conversion characteristics of the wavelength conversion medium 113 based on these monitoring results. Thus, the second-order tilt is compensated while variations in zero-dispersion wavelengths are compensated.

Fourth Embodiment

Figure 22:
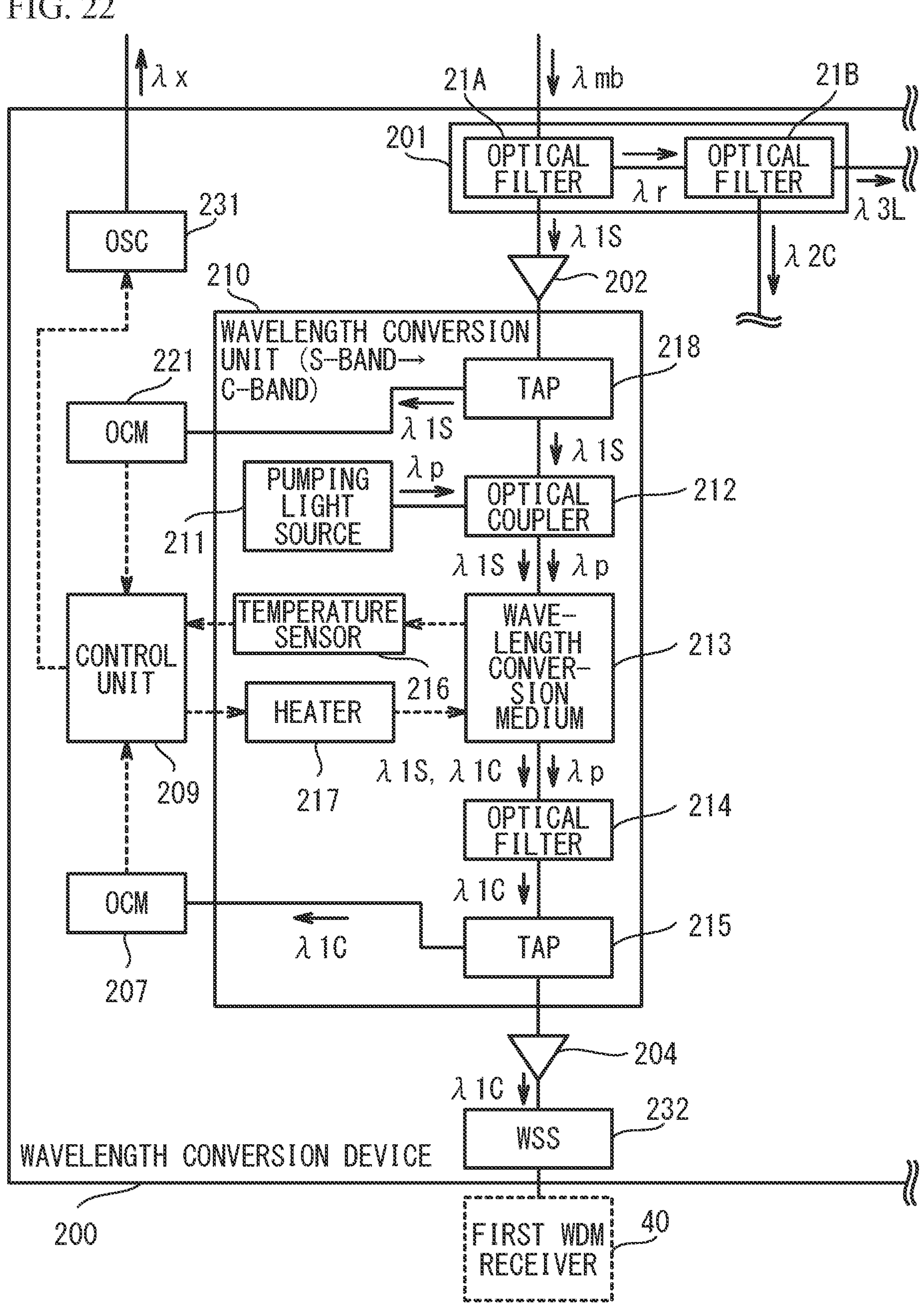
FIG. 22 is an example of a wavelength conversion unit at the receiving end in accordance with a fourth embodiment.
Figure 23:
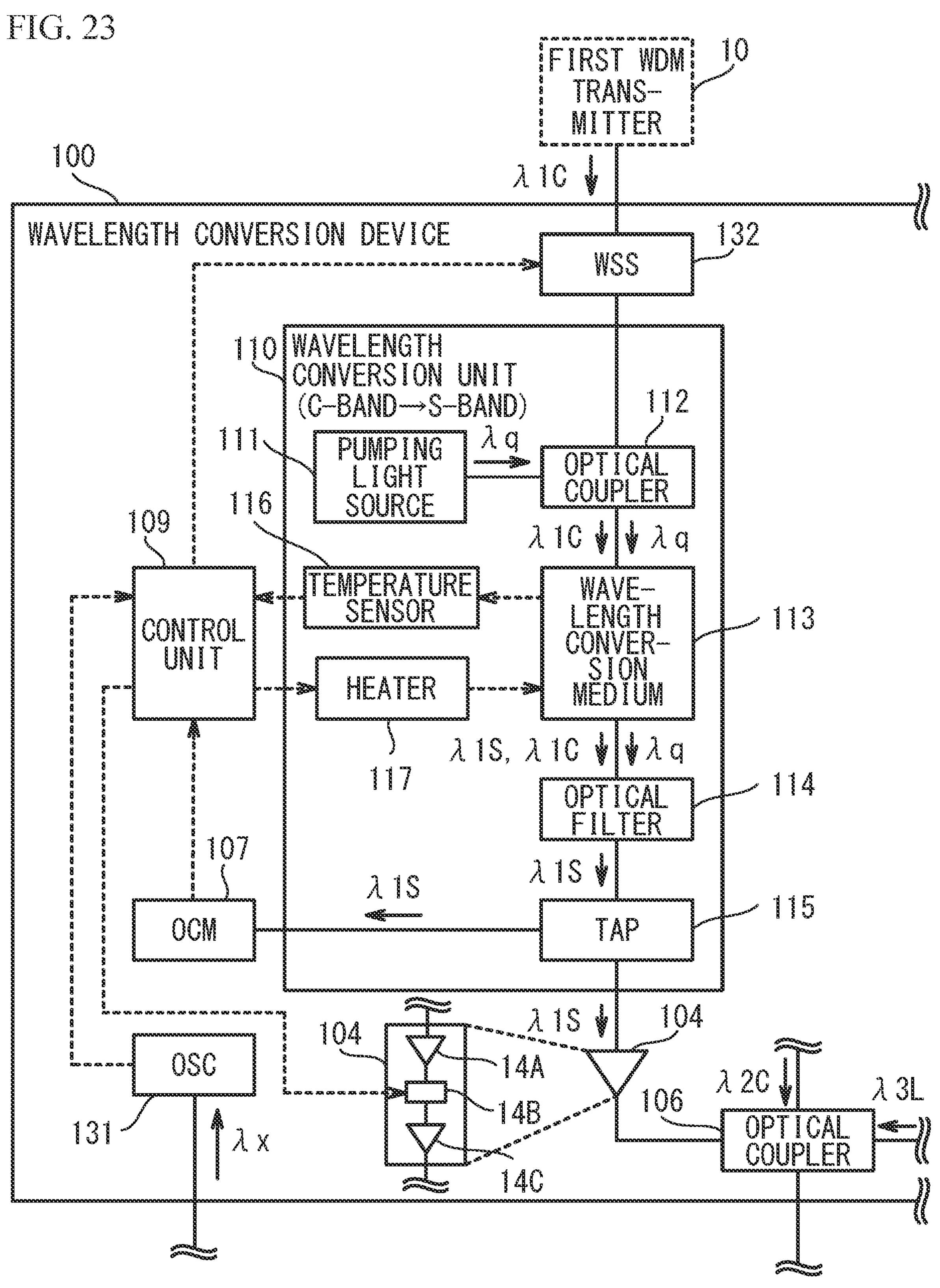
FIG. 23 is an example of a wavelength conversion unit at the transmitting end in accordance with the fourth embodiment.
Figure 24:
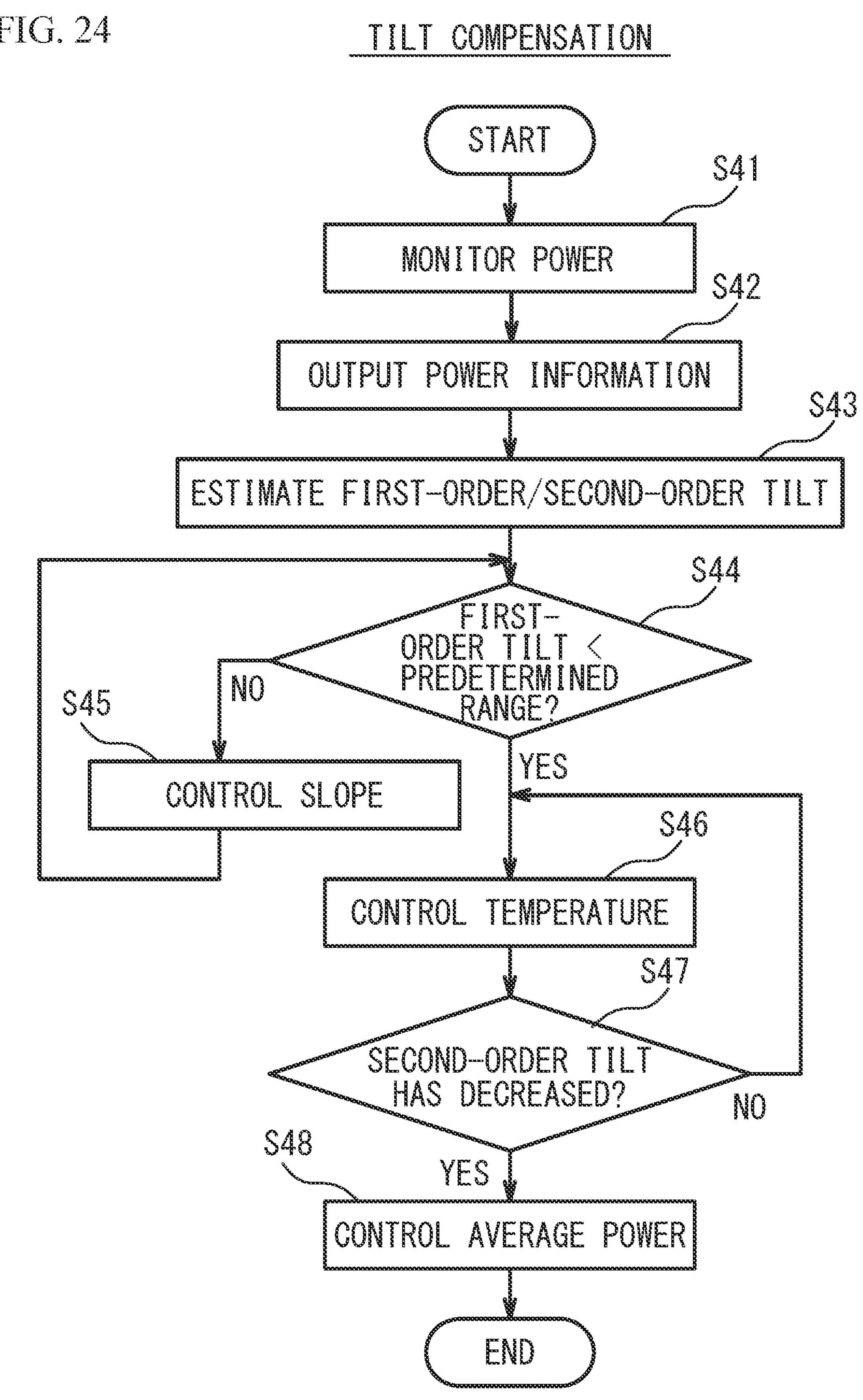
FIG. 24 is a flowchart illustrating an example of tilt compensation in accordance with the fourth embodiment.

Next, a fourth embodiment of the present disclosure will be described with reference to FIG. 22 to FIG. 24. In FIG. 22, the same components as those illustrated in FIG. 13 to FIG. 17 are denoted by the same reference numerals in principle, and the description thereof will be omitted. In FIG. 23, the same components as those illustrated in FIG. 18 are denoted by the same reference numerals in principle, and the description thereof will be omitted. In FIG. 22 and FIG. 23, the configuration for the C-band and the configuration for the L-band are not illustrated. The configuration for the L-band is basically the same as the configuration for the S-band as described with reference to FIG. 16, for example.

As illustrated in FIG. 22, the OSC communication unit 231 optically transmits the OSC light λx corresponding to the control signal output from the control unit 209. Although omitted in FIG. 22, as in the third embodiment, the OSC communication unit 281 optically transmits the OSC light λy corresponding to the control signal output from the control unit 209-1 (see FIG. 16). The OSC light λx may pass through the optical transmission line 300 or may pass through another optical transmission line different from the optical transmission line 300.

As illustrated in FIG. 22, the wavelength conversion device 200 in accordance with the fourth embodiment includes a wavelength selective switch (WSS) 232. The WSS 232 is located between the optical amplifier 204 and the first WDM receiver 40. The WSS 232 selects a path for the wavelength-multiplexed light λ1C output from the optical amplifier 204 and outputs the wavelength-multiplexed light λ1C to the selected path. For example, the WSS 232 outputs the wavelength-multiplexed light λ1C including some wavelengths to the first WDM receiver 40. The WSS 232 outputs the wavelength-multiplexed light λ1C including the remaining wavelengths to another wavelength conversion device (not illustrated) located downstream of the wavelength conversion device 200.

On the other hand, as illustrated in FIG. 23, the OSC communication unit 131 optically receives the OSC light λx transmitted from the OSC communication unit 231, and transmits the control signal corresponding to the OSC light λx to the control unit 109. Although omitted in FIG. 23, as in the third embodiment, the OSC communication unit 181 optically receives the OSC light λy corresponding to the control signal output from the control unit 209-1 (see FIG. 16). The OSC light λx may pass through the optical transmission line 300 or may pass through another optical transmission line different from the optical transmission line 300.

As illustrated in FIG. 23, the wavelength conversion device 100 in accordance with the fourth embodiment includes a WSS 132 instead of the optical amplifier 101. The WSS 132 is located between the first WDM transmitter 10 and the optical coupler 112 included in the wavelength conversion unit 110. The WSS 132 selects a path for the wavelength-multiplexed light λ1C output from the first WDM transmitter 10 and outputs the wavelength-multiplexed light λ1C to the selected path. For example, the WSS 132 outputs the wavelength-multiplexed light λ1C including some wavelengths to the optical coupler 112. The WSS 132 outputs the wavelength-multiplexed light λ1C including the remaining wavelengths to another wavelength conversion device (not illustrated) different from the wavelength conversion devices 100 and 200.

Further, the optical amplifier 104 in accordance with the fourth embodiment includes a pre-amplifier 14A, a tilt compensation unit 14B, and a post-amplifier 14C. The tilt compensation unit 14B can be implemented by a hardware circuit such as a variable optical attenuator (VOA). The pre-amplifier 14A amplifies the wavelength-multiplexed light λ1S output from the TAP 115 of the wavelength conversion unit 110. The tilt compensation unit 14B attenuates the wavelength-multiplexed light λ1S output from the pre-amplifier 14A based on the control by the control unit 209. The post amplifier 14C amplifies the wavelength-multiplexed light λ1S output from the tilt compensation unit 14B and outputs the amplified wavelength-multiplexed light λ1S to the optical coupler 106.

Next, the tilt compensation of the optical transmission system ST including the wavelength conversion devices 100 and 200 in accordance with the fourth embodiment will be described with reference to FIG. 24. In the optical transmission system ST in accordance with the fourth embodiment, the wavelength conversion devices 100 and 200 cooperate with each other to compensate for the first-order tilt, the second-order tilt, and the residual tilt after the third-order tilt.

First, each of the OCMs 207 and 221 monitors power (step S41). More specifically, the OCM 207 monitors the optical power of a plurality of single-wavelength lights λ11, . . . , λ1*n* included in the wavelength-multiplexed light λ1C. The OCM 221 monitors the optical power of a plurality of single-wavelength lights λ11, . . . , λ1*n* included in the wavelength-multiplexed light λ1S. That is, the OCM 207 monitors the optical power of the wavelength-multiplexed light λ1C after the conversion by the wavelength conversion unit 210, and the OCM 221 monitors the optical power of the wavelength-multiplexed light λ1S before the conversion by the wavelength conversion unit 210. When the optical power is monitored, the OCMs 207 and 221 output the monitoring results (i.e., optical power) to the control unit 209 by the electrical control signals, respectively.

Then, the control unit 209 outputs power information (step S42). More specifically, the control unit 209 transmits the power information including respective monitoring results by the OCMs 207 and 221 to the OSC communication unit 231 based on the control signals. The power information includes, for example, the spectrum of the optical power (i.e., wavelength characteristics). When the control unit 209 transmits the power information to the OSC communication unit 231, the OSC communication unit 231 transmits the OSC light λx corresponding to the power information. The OSC communication unit 131 receives the OSC light λx transmitted from the OSC communication unit 231, and transmits the power information corresponding to the OSC light λx to the control unit 109.

Then, the control unit 109 estimates the first-order tilt and the second-order tilt (step S43). More specifically, the control unit 109 estimates the first-order tilt and the second-order tilt of each of the wavelength-multiplexed light λ1S and the wavelength-multiplexed light λ1C based on the power information transmitted from the OSC communication unit 131 and the monitoring result input from the OCM 107. For example, the control unit 109 can estimate the first-order tilt and the second-order tilt of each of the wavelength-multiplexed lights λ1S and λ1C after passing through the optical transmission line 300 based on any one or two of the following monitoring results: two types of the monitoring results included in the power information and the monitoring result input from the OCM 107. The control unit 109 may estimate the first-order tilt and the second-order tilt of each of the wavelength-multiplexed lights λ1S and λ1C after passing through the optical transmission line 300 based on all three of the following monitoring results: the two types of the monitoring results and the monitoring result input from the OCM 107.

Then, the control unit 109 determines whether the first-order tilt is within a predetermined range (step S44). More specifically, the control unit 109 determines whether the first-order tilt of the wavelength-multiplexed optical λ1C output from the wavelength conversion unit 210 to the OCM 207 is within the range of the first-order tilt of the wavelength-multiplexed light λ1S output from the optical amplifier 202 to the wavelength conversion unit 210.

When the first-order tilt is not within the predetermined range (step S44: NO), the control unit 109 controls the slope of the optical amplifier 104 (step S45). For example, the control unit 109 performs control to adjust the slope of the tilt compensation unit 14B included in the optical amplifier 104 so that the deviation of the power of each of the wavelengths of the wavelength-multiplexed light λ1S is reduced. In this manner, the control unit 109 compensates for the first-order tilt in the wavelength-multiplexed light λ1S. The control unit 109 repeats the processes of steps S44 and 45 until the first-order tilt falls within the predetermined range described above.

When the first-order tilt is within the predetermined range (step S44: YES), the control unit 109 controls the temperature of the wavelength conversion unit 110 (step S46). More specifically, the control unit 109 controls the temperature of the heater 117 based on the temperature of the wavelength conversion medium 113 detected by the temperature sensor 116. As described in the first embodiment, the control unit 109 can control the temperature of the heater 117 based on a formula or with reference to a table. In this manner, the control unit 109 compensates for the second-order tilt in the wavelength-multiplexed light λ1S by performing control to adjust the conversion characteristics of the wavelength conversion medium 113 using temperature.

Then, the control unit 109 determines whether the second-order tilt has decreased (step S47). For example, the control unit 109 determines whether the second-order tilt of the wavelength-multiplexed light λ1C output from the wavelength conversion unit 210 is minimum. When the second-order tilt has not decreased (step S47: NO), the control unit 109 repeats the processes of steps S46 and 47 until the second-order tilt decreases.

When the second-order tilt has decreased (step S47: YES), the control unit 109 controls the average power of the WSS 132 (step S48) and ends the process. More specifically, the control unit 109 calculates the compensation amount for the residual tilt based on one, two, or all of the following monitoring results: the two types of monitoring results described above and the monitoring result input from the OCM107, and performs control to adjust the average power of the WSS 132 based on the calculated compensation amount. In this manner, the control unit 109 compensates for the residual tilt in the wavelength-multiplexed light 215 by performing control to adjust the average power of the WSS 132. As described above, the optical transmission system ST of the fourth embodiment can compensate for not only the second-order tilt but also the first-order tilt and the residual tilt.

Fifth Embodiment

Figure 25:
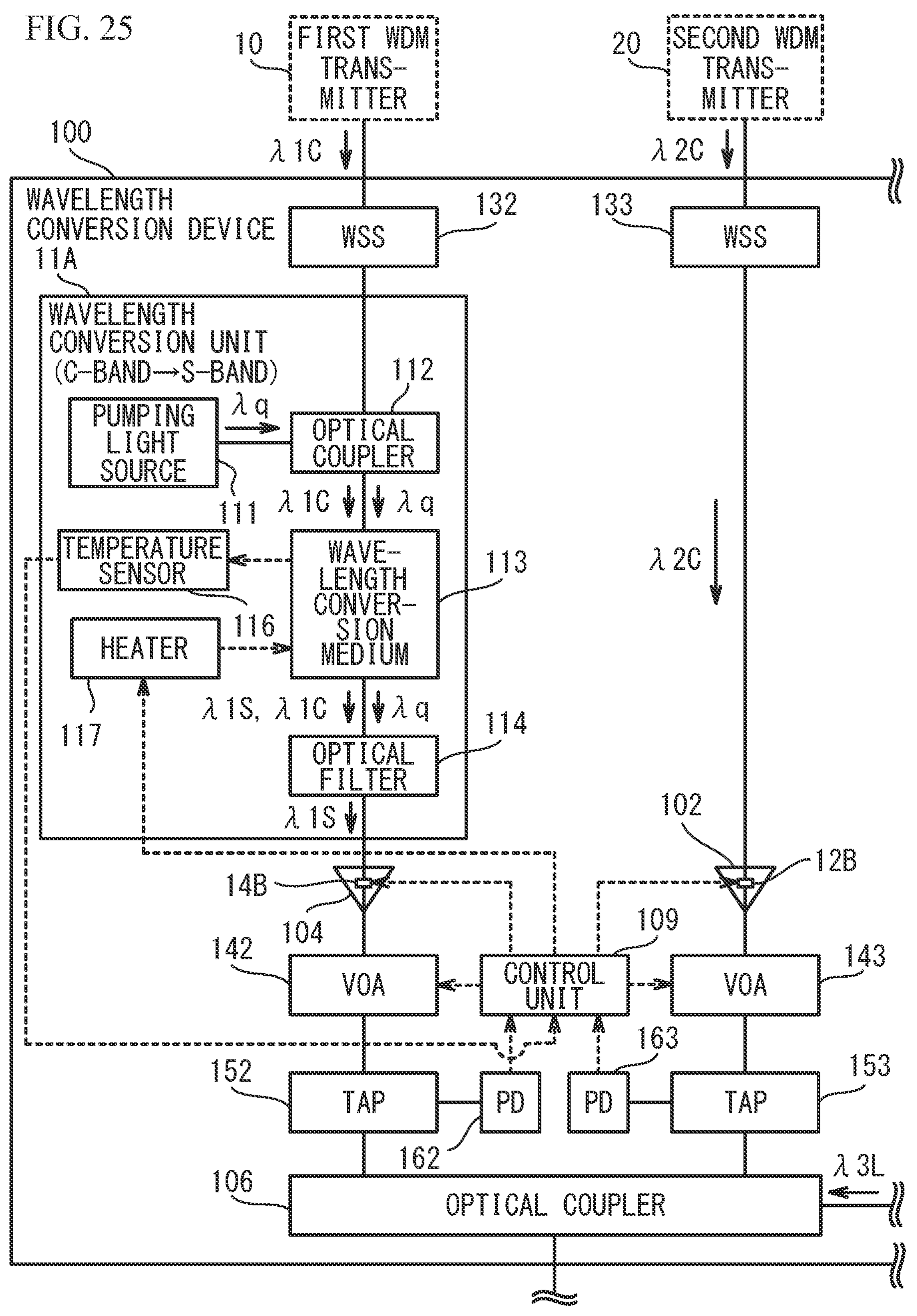
FIG. 25 illustrates an example of a wavelength conversion unit at the transmitting end in accordance with a fifth embodiment.

Next, a fifth embodiment of the present disclosure will be described with reference to FIG. 25 to FIG. 27. In FIG. 25, the same components as those illustrated in FIG. 16 and FIG. 23 are denoted by the same or corresponding reference numerals in principle, and the description thereof is omitted. In FIG. 25, the configuration for the L-band is not illustrated. The configuration for the L-band is basically the same as the configuration for the S-band as described with reference to FIG. 16, for example.

As illustrated in FIG. 25, the wavelength conversion device 100 in accordance with the fifth embodiment includes a WSS 133. The optical amplifier 102 in accordance with the fifth embodiment includes a tilt compensation unit 12B. The WSS 133 is located between the second WDM transmitter 20 and the optical amplifier 102. The WSS 133 selects a path for the wavelength-multiplexed light λ2C output from the second WDM transmitter 20 and outputs the wavelength-multiplexed light λ2C to the selected path. For example, the WSS 133 outputs the wavelength-multiplexed light λ2C including some wavelengths to the optical amplifier 102. The WSS 133 outputs the wavelength-multiplexed light λ2C including the remaining wavelengths to another wavelength conversion device (not illustrated) different from the wavelength conversion devices 100 and 200.

The wavelength conversion device 100 in accordance with the fifth embodiment includes VOAs 142 and 143, TAPs 152 and 153, and photo diodes (PDs) 162 and 163. The VOA 142 is an example of a first variable optical attenuator. The VOA 143 is an example of a second variable optical attenuator. The PD 162 is an example of a transmitting-end first monitor. The PD 163 is an example of a transmitting-end second monitor. The VOA 142 and the TAP 152 are optically connected. The TAP 152 and the PD 162 are optically connected. The VOA 143 and the TAP 153 are optically connected. The TAP 153 and the PD 163 are optically connected.

On the other hand, in the wavelength conversion device 100 in accordance with the fifth embodiment, unlike the wavelength conversion device in accordance with the fourth embodiment (see FIG. 23), the OSC communication unit 131 is excluded. Therefore, in the optical transmission system ST in accordance with the fifth embodiment, the wavelength conversion devices 100 and 200 do not cooperate with each other, and the wavelength conversion device 100 alone compensates for the first-order tilt and the second-order tilt.

In the wavelength conversion device 100 in accordance with the fifth embodiment, the OCM 107 and the TAP 115 are also excluded. That is, the wavelength conversion unit 11A in accordance with the fifth embodiment is different from the wavelength conversion unit 110 in accordance with the fourth embodiment.

Here, both the VOA 142 and the TAP 152 are located between the optical amplifier 104 and the optical coupler 106. The VOA 142 is located downstream of the optical amplifier 104 and is optically connected to the optical amplifier 104. The TAP 152 is located downstream of the VOA 142 and is optically connected to the optical coupler 106. On the other hand, both the VOA 143 and the TAP 153 are located between the optical amplifier 102 and the optical coupler 106. The VOA 143 is located downstream of the optical amplifier 102 and is optically connected to the optical amplifier 102. The TAP 153 is located downstream of the VOA 143 and is optically connected to the optical coupler 106.

The VOA 142 attenuates the wavelength-multiplexed light 215 output from the optical amplifier 104 and outputs the attenuated wavelength-multiplexed light λ1S to the TAP 152. The TAP 152 branches the wavelength-multiplexed light λ1S and outputs a part of the wavelength-multiplexed light λ1S to the PD 162. The PD 162 detects the wavelength-multiplexed light λ1S before passing through the optical transmission line 300 and monitors the power of each of the wavelengths of the wavelength-multiplexed light λ1S. On the other hand, the VOA 143 attenuates the wavelength-multiplexed light λ1C output from the optical amplifier 102 and outputs the attenuated wavelength-multiplexed light λ1C to the TAP 153. The TAP 153 branches the wavelength-multiplexed light λ1C and outputs a part of the wavelength-multiplexed light λ1C to the PD 163. The PD163 detects the wavelength-multiplexed light λ1C before passing through the optical transmission line 300 and monitors the power of each of the wavelengths of the wavelength-multiplexed light λ1C.

Next, details of the control unit 109 in accordance with the fifth embodiment will be described with reference to FIG. 26. Since the control units (not illustrated) for the C-band and the L-band basically have the same configuration as the control unit 109, and thus the detailed description thereof will be omitted.

Figure 26:
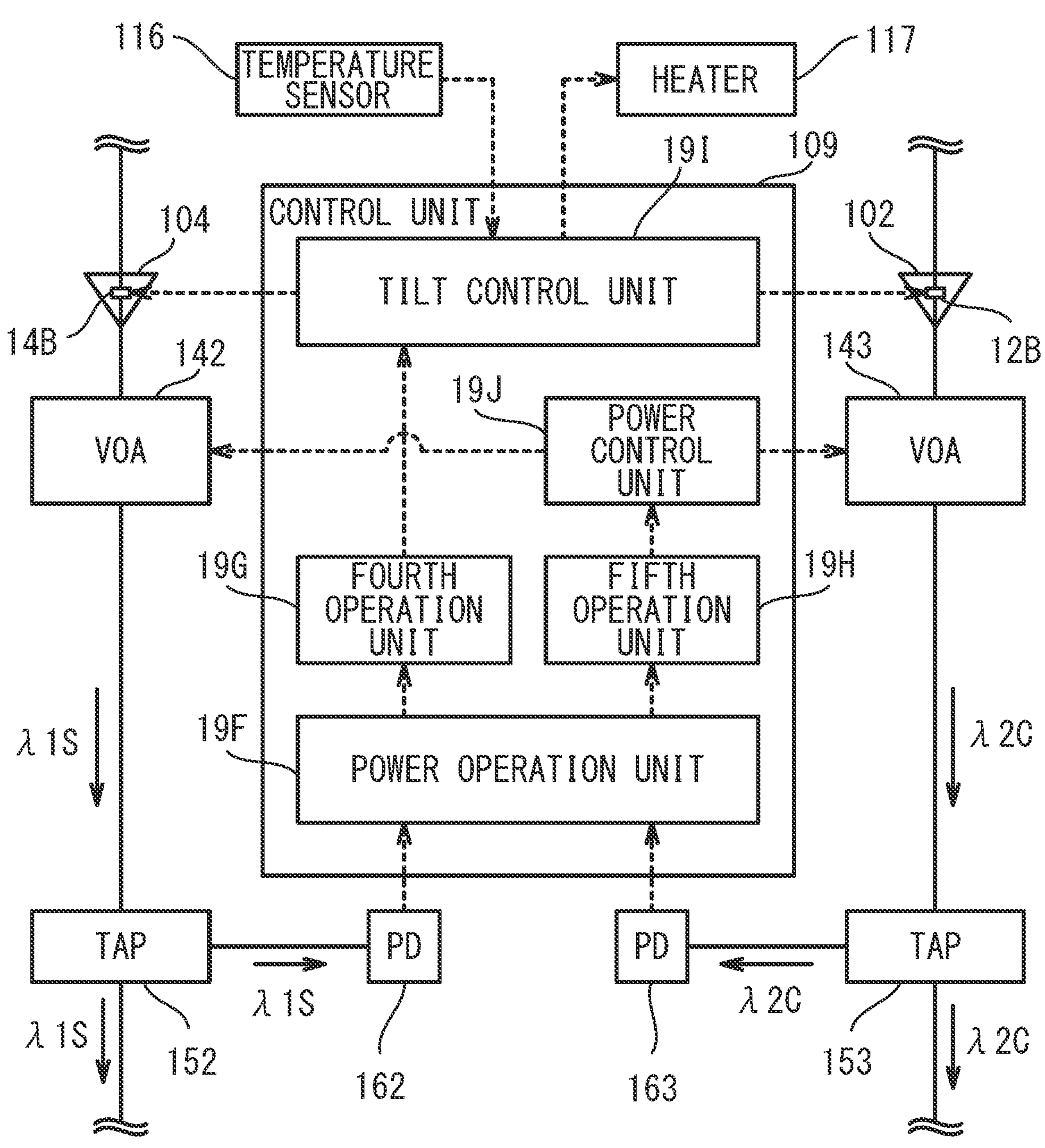
FIG. 26 illustrates an example of a control unit in accordance with the fifth embodiment.
Figure 27:
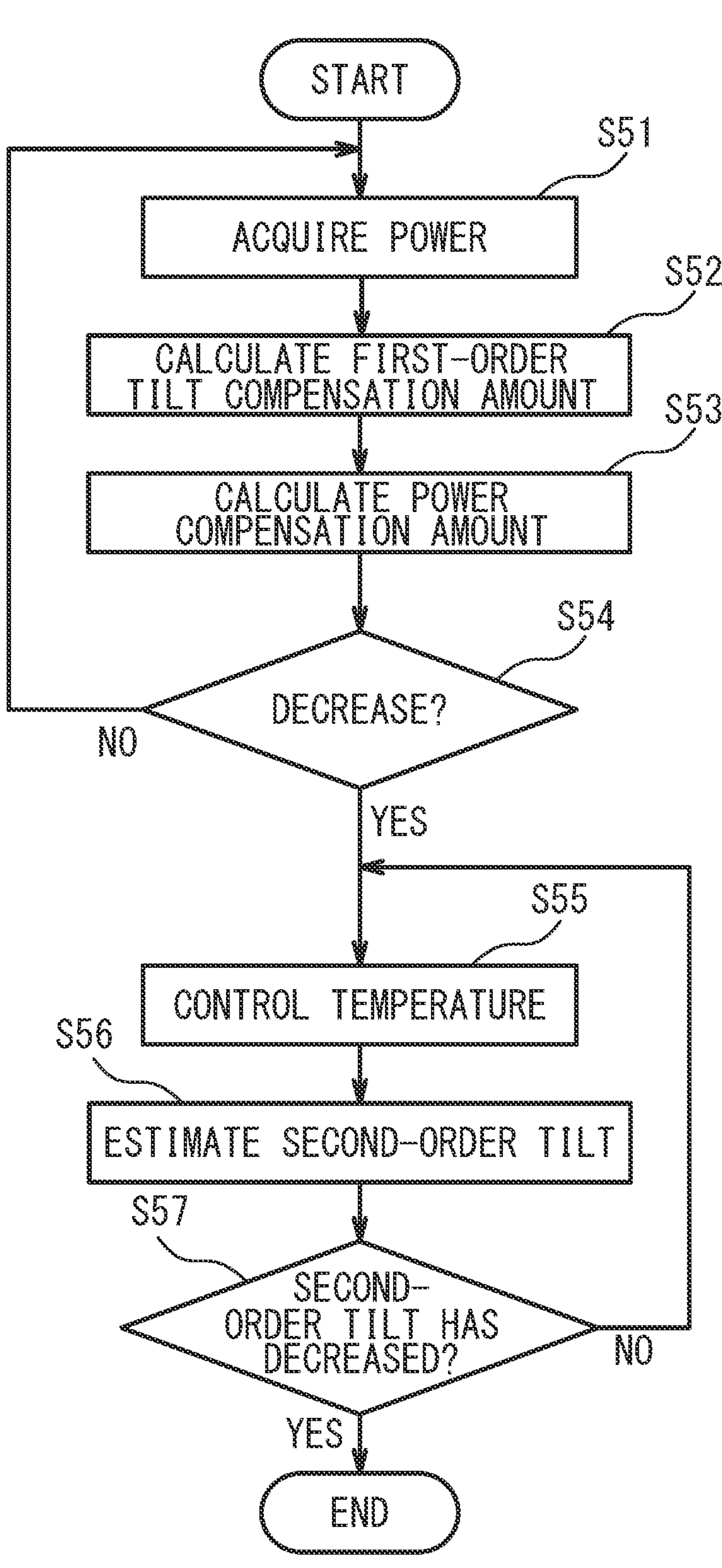
FIG. 27 is a flowchart illustrating an example of tilt compensation in accordance with the fifth embodiment.

As illustrated in FIG. 26, the control unit 109 in accordance with the fifth embodiment includes a power operation unit 19F, a fourth operation unit 19G, a fifth operation unit 19H, a tilt control unit 19I, and a power control unit 19J. The power operation unit 19F acquires the power of the wavelengths belonging to the S-band from the PD 162, and estimates the average power, the first-order tilt, and the second-order tilt of the wavelength-multiplexed light λ1S based on the acquired power. Similarly, the power operation unit 19F acquires the power of the wavelengths belonging to the C-band from the PD 163, and estimates the average power, the first-order tilt, and the second-order tilt of the wavelength-multiplexed light λ1C based on the acquired power.

The fourth operation unit 19G calculates the first-order tilt compensation amount corresponding to the average power of the wavelengths belonging to the S-band, based on the average power of the wavelengths belonging to the S-band estimated by the power operation unit 19F. Similarly, the fourth operation unit 19G calculates the first-order tilt compensation amount corresponding to the average power of the wavelengths belonging to the C-band, based on the average power of the wavelengths belonging to the C-band estimated by the power operation unit 19F.

The fifth operation unit 19H calculates a power compensation amount corresponding to the average power of the wavelengths belonging to the S-band, based on the average power of the wavelengths belonging to the S-band estimated by the power operation unit 19F. Similarly, the fifth operation unit 19H calculates a power compensation amount corresponding to the average power of the wavelengths belonging to the C-band, based on the average power of the wavelengths belonging to the C-band acquired by the power operation unit 19F.

The tilt control unit 19I controls the optical amplifiers 102 and 104 based on the first-order tilt compensation amount calculated by the fourth operation unit 19G. Specifically, the tilt control unit 19I controls the tilt compensation unit 14B of the optical amplifier 104 based on the first-order tilt compensation amount corresponding to the power of the wavelengths belonging to the S-band. The tilt control unit 19I controls the tilt compensation unit 12B of the optical amplifier 102 based on the first-order tilt compensation amount corresponding to the power of the wavelengths belonging to the C-band. Under the control by the tilt control unit 19I, each of the tilt compensation units 12B and 14B compensates for the first-order tilt.

Further, the tilt control unit 19I controls the temperature of the heater 117 so as to compensate for the second-order tilt based on the power of the wavelengths belonging to the S-band acquired by the power operation unit 19F and the temperature of the wavelength-conversion medium 113 detected by the temperature sensor 116. For example, the tilt control unit 19I may include any one of the configurations illustrated in FIG. 9, FIG. 14, and FIG. 19A.

The power control unit 19J controls the VOAs 142 and 143 based on the power compensation amount calculated by the fifth operation unit 19H. Specifically, the power control unit 19J controls the VOA 142 based on the power compensation amount corresponding to the power of the wavelengths belonging to the S-band. The power control unit 19J controls the VOA 143 based on the power compensation amount corresponding to the power of the wavelengths belonging to the C-band. Under the control by the power control unit 19J, the VOAs 142 and 143 attenuate the power of the wavelength-multiplexed light λ1S and the power of the wavelength-multiplexed light λ1C, respectively.

Next, tilt compensation of the optical transmission system ST having the wavelength conversion devices 100 and 200 in accordance with the fifth embodiment will be described with reference to FIG. 27. In the optical transmission system ST in accordance with the fifth embodiment, the wavelength conversion device 100 alone compensates for the first-order tilt and the second-order tilt.

First, the power operation unit 19F acquires the power of each of the wavelength-multiplexed lights λ1S and λ1C (step S51). As described above, the power operation unit 19F acquires the power of the wavelengths belonging to the S-band from the PD 162. In addition, the power operation unit 19F acquires the power of the wavelengths belonging to the C-band from the PD 163. After acquiring the power of each of the wavelength-multiplexed lights λ1S and λC, the power operation unit 19F estimates the average power and the first-order tilt.

Then, the fourth operation unit 19G calculates the first-order tilt compensation amount (step S52). More specifically, the fourth operation unit 19G calculates the first-order tilt compensation amount corresponding to the average power of the wavelengths belonging to the S-band, based on the average power of the wavelengths belonging to the S-band acquired by the power operation unit 19F. The fourth operation unit 19G calculates the first-order tilt compensation amount corresponding to the power of the wavelengths belonging to the C-band based on the average power of the wavelengths belonging to the C-band acquired by the power operation unit 19F. When the fourth operation unit 19G calculates the first-order tilt compensation amount, the tilt control unit 19I controls the tilt compensation unit 14B of the optical amplifier 104 based on the first-order tilt compensation amount corresponding to the average power of the wavelengths belonging to the S-band. The tilt control unit 19I controls the tilt compensation unit 12B of the optical amplifier 102 based on the first-order tilt compensation amount corresponding to the average power of the wavelengths belonging to the C-band.

Then, the fifth operation unit 19H calculates a power compensation amount (step S53). More specifically, the fifth operation unit 19H calculates the power compensation amount corresponding to the average power of the wavelengths belonging to the S-band, based on the average power of the wavelengths belonging to the S-band estimated by the power operation unit 19F. Similarly, the fifth operation unit 19H calculates the power compensation amount corresponding to the average power of the wavelengths belonging to the C-band, based on the average power of the wavelengths belonging to the C-band estimated by the power operation unit 19F. When the fifth operation unit 19H calculates the power compensation amount, the power control unit 19J controls the VOA 142 based on the power compensation amount corresponding to the average power of the wavelengths belonging to the S-band. The power control unit 19J controls the VOA 143 based on the power compensation amount corresponding to the average power of the wavelengths belonging to the C-band.

Then, the power operation unit 19F determines whether the power and the first-order tilt of each of the wavelength-multiplexed lights λ1S and λ1C have decreased (step S54). For example, the power operation unit 19F determines whether both the average power of the wavelength-multiplexed light λ1S before passing through the optical transmission line 300 and the average power of the wavelength-multiplexed light λ1C before passing through the optical transmission line 300 are within a predetermined first threshold range. Further, the power operation unit 19F determines whether both the first-order tilt of the wavelength-multiplexed light λ1S before passing through the optical transmission line 300 and the first-order tilt of the wavelength-multiplexed light λ1C before passing through the optical transmission line 300 are within a predetermined second threshold range. When the number of wavelengths is increased, the power operation unit 19F may determine whether the power is improved.

When the power and the first-order tilt of each of the wavelength-multiplexed lights λ1S and λ1C have not decreased (step S54: NO), the processes of steps S51 to S54 are repeated. In other words, the processes of steps S51 to S54 are repeated until the power and the first-order tilt of each of the wavelength-multiplexed lights λ1S and λ1C decrease.

When the power and the first-order tilt of each of the wavelength-multiplexed lights λ1S and λ1C have decreased (step S54: YES), the tilt control unit 19I controls the temperature (step S55). More specifically, the tilt control unit 19I controls the temperature of the heater 117 based on the read temperature of the wavelength conversion medium 113 read from the temperature sensor 116.

Then, the power operation unit 19F estimates the second-order tilt (step S56). As described above, the power operation unit 19F acquires the power of the wavelengths belonging to the S-band from the PD 162, and estimates the second-order tilt of the wavelength-multiplexed light λ1S based on the acquired power. Similarly, the power operation unit 19F acquires the power of the wavelengths belonging to the C-band from the PD 163, and estimates the second tilt of the wavelength-multiplexed light λ1C based on the acquired power.

Then, the power operation unit 19F determines whether the second-order tilt has decreased (step S57). For example, the power operation unit 19F determines whether both the second-order tilt of the wavelength-multiplexed light λ1S before passing through the optical transmission line 300 and the second-order tilt of the wavelength-multiplexed light λ1C before passing through the optical transmission line 300 are minimum. When the second-order tilt has not decreased (step S57: NO), the processes of steps S55 to S57 are repeated. That is, the processes of steps S55 to S57 are repeated until the second-order tilt of each of the wavelength-multiplexed lights λ1S and λ1C decreases. When the second-order tilt has decreased (step S57: YES), the tilt compensation in accordance with the fifth embodiment is ended.

As described above, in the fifth embodiment, not only is the compensation for the residual tilt omitted, but the tilt compensation is completed by the wavelength conversion device 100 alone. Therefore, the optical transmission system ST of the fifth embodiment can execute the tilt compensation at a higher speed than the optical transmission system ST of the he fourth embodiment in which the tilt compensation is performed by the cooperation between the wavelength conversion devices 100 and 200.

Sixth Embodiment

Figure 28:
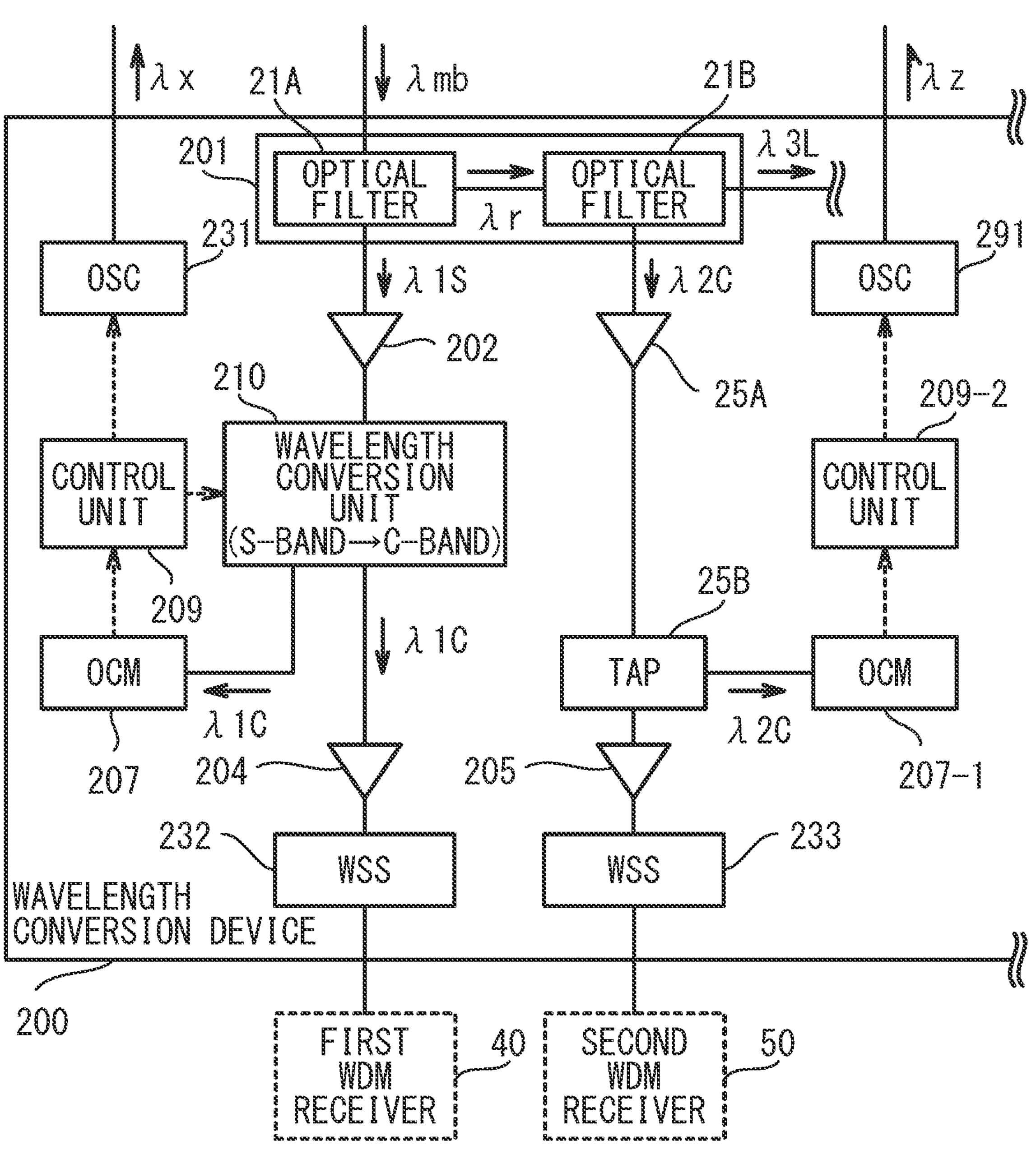
FIG. 28 illustrates an example of the wavelength conversion device at the receiving end in accordance with a sixth embodiment.
Figure 29:
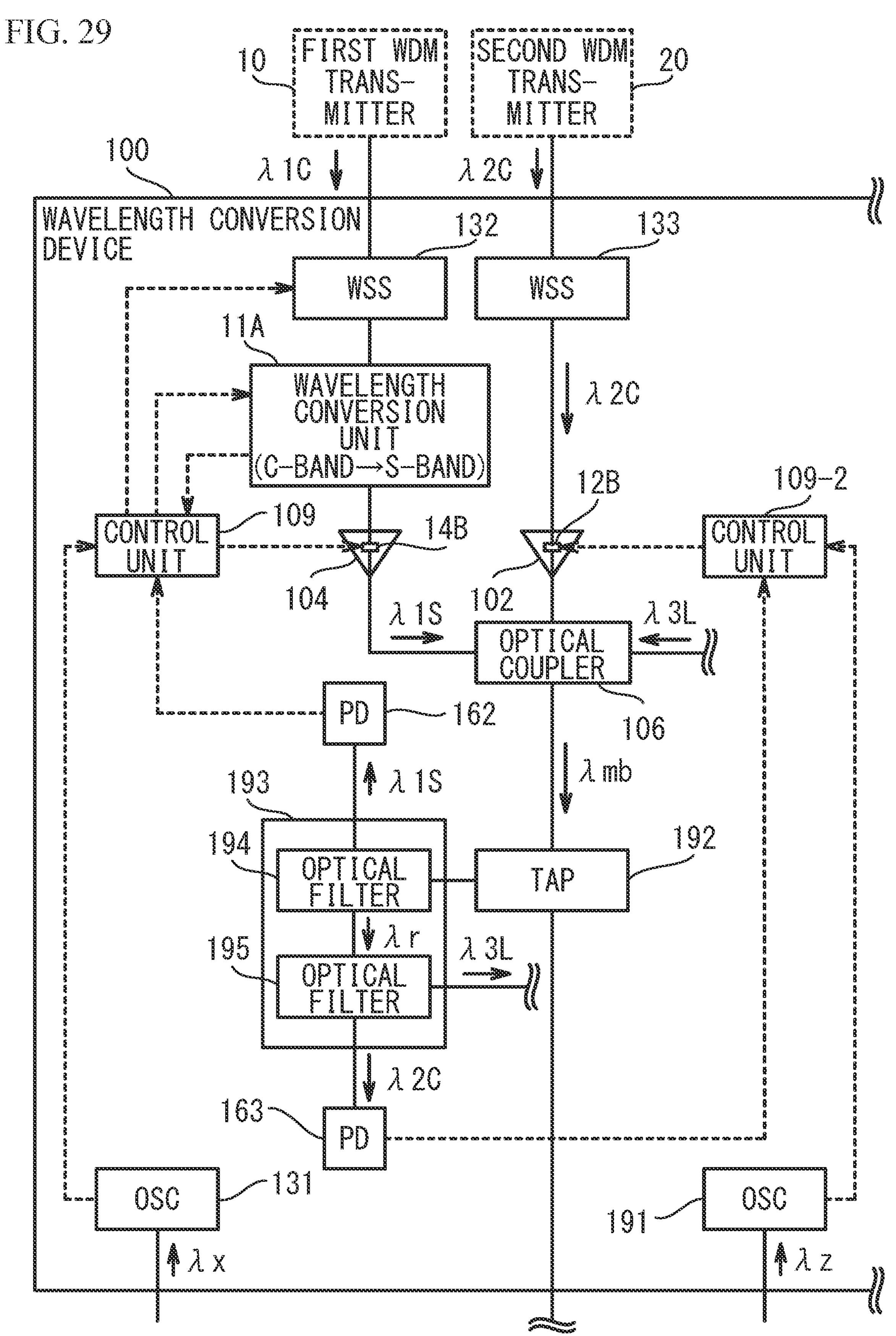
FIG. 29 illustrates an example of a wavelength conversion device at the transmitting end in accordance with the sixth embodiment.

Next, a sixth embodiment of the present disclosure will be described with reference to FIG. 28 to FIG. 32. In FIG. 28, the same components as those illustrated in FIG. 22 are denoted by the same or corresponding reference numerals in principle, and the description thereof is omitted. In FIG. 29, the same components as those illustrated in FIG. 23 are denoted by the same or corresponding reference numerals in principle, and the description thereof is omitted. In FIG. 28 and FIG. 29, the configuration for the L-band is not illustrated. The configuration for the L-band is basically the same as the configuration for the S-band as described with reference to FIG. 16, for example.

As illustrated in FIG. 28, the OSC communication unit 231 optically transmits the OSC light λx corresponding to the control signal output from the control unit 209. Although omitted in FIG. 28, as in the third embodiment, the OSC communication unit 281 optically transmits the OSC light λy corresponding to the control signal output from the control unit 209-1 (see FIG. 16). Further, an OSC communication unit 291 optically transmits the OSC light λz corresponding to the control signal output from the control unit 209-2. The OSC light λz may pass through the optical transmission line 300 or may pass through another optical transmission line different from the optical transmission line 300.

As illustrated in FIG. 28, the wavelength conversion device 200 in accordance with the sixth embodiment includes a WSS 233. The WSS 233 is located between the optical amplifier 205 and the second WDM receiver 50. The WSS 233 selects a path for the wavelength-multiplexed light λ2C output from the optical amplifier 205 and outputs the wavelength-multiplexed light λ2C to the selected path. For example, the WSS 233 outputs the wavelength-multiplexed light λ2C including some wavelengths to the second WDM receiver 50. The WSS 233 outputs the wavelength-multiplexed light λ2C including the remaining wavelengths to another wavelength conversion device (not illustrated) located downstream of the wavelength conversion device 200.

Further, the wavelength conversion device 200 in accordance with the sixth embodiment includes an optical amplifier 25A, a TAP 25B, an OCM 207-1, and a control unit 209-2. The optical amplifier 25A and the TAP 25B are located between the optical filter 21B and the optical amplifier 205. The TAP 25B is located downstream of the optical amplifier 25A. The optical amplifier 25A may be excluded from the wavelength conversion device 200. The OCM 207-1 is located between the TAP 25B and the control unit 209-2.

As a result, the wavelength-multiplexed light λ2C is branched by the TAP 25B and guided to the OCM 207-1. The OCM 207-1 monitors the optical power of a plurality of single-wavelength lights included in the wavelength-multiplexed light λ2C. The OCM 207-1 outputs the monitoring result (i.e., the optical power) to the control unit 209-2 by an electrical control signal. The control unit 209-2 transmits the power information including the monitoring result by the OCM 207-1 to the OSC communication unit 291 based on the control signal. As a result, the OSC communication unit 291 transmits the OSC light λz corresponding to the power information.

On the other hand, as illustrated in FIG. 29, an OSC communication unit 191 optically receives the OSC light λz transmitted from the OSC communication unit 291, and transmits a control signal corresponding to the OSC light λz to the control unit 109-2. Although not illustrated in FIG. 29, as in the third embodiment, the OSC communication unit 181 optically receives the OSC light λy corresponding to the control signal output from the control unit 209-1 (see FIG. 16).

As illustrated in FIG. 29, the wavelength conversion device 100 in accordance with the sixth embodiment includes a wavelength conversion unit 11A and the WSS 133. The wavelength conversion unit 11A has the same configuration as the wavelength conversion unit 110 excluding the TAP 115 (see FIG. 25). The WSS 133 is located between the second WDM transmitter 20 and the optical amplifier 102. The WSS 133 selects a path for the wavelength-multiplexed lightλ2C output from the second WDM transmitter 20 and outputs the wavelength-multiplexed lightλ2C to the selected path. For example, the WSS 133 outputs the wavelength-multiplexed light λ2C including some wavelengths to the optical amplifier 102. The WSS 133 outputs the wavelength-multiplexed light λ2C including the remaining wavelengths to another wavelength conversion device (not illustrated) different from the wavelength conversion devices 100 and 200.

The wavelength conversion device 100 in accordance with the sixth embodiment further includes the PDs 162 and 163, a TAP 192, and a WDM filter 193. The WDM filter 193 includes optical filters 194 and 195. Examples of the optical filters 194 and 195 include a band pass filter (BPF). The TAP 192 is located between the optical coupler 106 and the optical transmission line 300.

The WDM filter 193 is optically connected to the PDs 162 and 163 and the TAP 192. More specifically, the optical filter 194 is optically connected to the PD 162 and the TAP 192. The optical filter 194 is also optically connected to the optical filter 195. The optical filter 195 is optically connected to the PD 163.

Thus, the multiband light λmb is branched by the TAP 192 and guided to the optical filter 194 of the WDM filter 193. The optical filter 194 separates the wavelength-multiplexed light λ1S from the multiband light λmb, and outputs the multiband residual light λr to the optical filter 195. The wavelength-multiplexed light λ1S is input to the PD 162.

Since the wavelength-multiplexed light λ1S is separated from the multiband light λmb, the multiband residual light λr includes the wavelength-multiplexed light λ2C and the wavelength-multiplexed light λ3L. The optical filter 195 separates the multiband residual light λr into the wavelength-multiplexed light λ2C and the wavelength-multiplexed light λ3L and outputs them. The wavelength-multiplexed light λ2C is input to the PD 163. The wavelength-multiplexed light λ3L is input to a PD (not illustrated) connected to the control unit 109-1 (see FIG. 16). The PD 162 detects the wavelength-multiplexed light λ1S and monitors the power of each of the wavelengths of the wavelength-multiplexed light λ1S. The PD 163 detects the wavelength-multiplexed light λ2C and monitors the power of each of the wavelengths of the wavelength-multiplexed light λ2C.

Next, details of the control units 109 and 209 in accordance with the sixth embodiment will be described with reference to FIG. 30. The control unit (not illustrated) for the L-band basically has the same configuration as the control unit 109, and thus the detailed description thereof is omitted.

Figure 30:
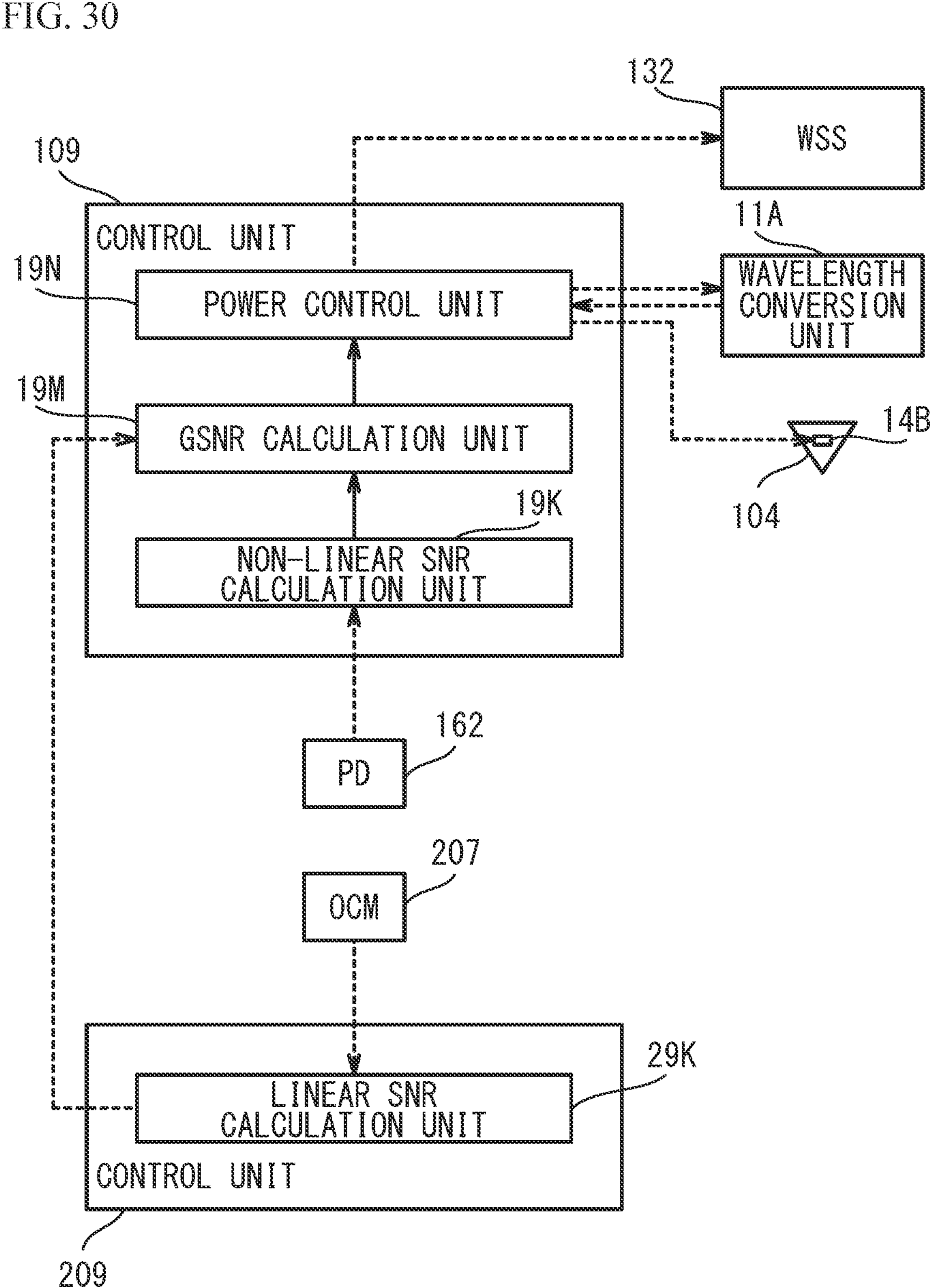
FIG. 30 illustrates an example of a control unit in accordance with the sixth embodiment.

As illustrated in FIG. 30, the control unit 109 in accordance with the sixth embodiment includes a non-linear signal to noise ratio (SNR) calculation unit 19K, a generalized SNR (GSNR) calculation unit 19M, and a power control unit 19N. On the other hand, the control unit 209 in accordance with the sixth embodiment includes a linear SNR calculation unit 29K.

The non-linear SNR calculation unit 19K acquires the power of the wavelength-multiplexed light λ1S monitored by the PD 162, and calculates the nonlinear SNR as SNR_NL based on the acquired power and the following calculation formula (5). The nonlinear SNR is an example of a nonlinear second signal quality.

⟨Calculation Formula (5)⟩

$$\mathrm{SNR\_NL} = \frac{\mathrm{P\_CH}(T)/\mathrm{B\_CH}}{\mathrm{G\_NLI}} = \frac{1}{\eta d\left(\mathrm{P\_CH}(T)/\mathrm{B\_CH}\right)^2} \tag{5}$$

Here, the numerator P_CH(T) represents the power of the wavelength channel to be monitored of the wavelength conversion device 100. That is, P_CH(T) represents the power of the wavelength-multiplexed light λ1S in the C-band monitored by the PD 162, for example. The numerator B_CH represents the bandwidth of the C-band. Therefore, P_CH(T)/B_CH corresponds to the optical power per unit bandwidth of the wavelength channel to be monitored.

The denominator G_NLI represents the optical power of nonlinear noise per unit bandwidth. When P_NLI representing the optical power of nonlinear noise is represented by the following calculation formula (6), G_NLI is represented by the following calculation formula (7).

<Calculation Formula (6)>

$$P\_NLI = \eta(P\_CH(T))^3 \tag{6}$$

<Calculation Formula (7)>

$$G\_NLI = \eta d(P\_CH(T)/B\_CH)^3 \tag{7}$$

Where η in the calculation formula (6) represents a known proportionality factor for calculating the nonlinear SNR. Therefore, P_NLI is proportional to, for example, the cube of the power of the wavelength-multiplexed light λ1S input to the optical coupler 106. In addition, ηd in the calculation formula (7) represents a known proportional coefficient determined by the fiber type or the like of the optical transmission line 300. Since B_CH is known, when the power of the wavelength-multiplexed light λ1S is notified to the non-linear SNR calculation unit 19K, the non-linear SNR calculation unit 19K can calculate the nonlinear SNR.

The linear SNR calculation unit 29K calculates the linear SNR as SNR_L based on the optical power of the wavelength-multiplexed light λ1C monitored by the OCM 207 and the following calculation formula (8). The linear SNR is an example of a linear first signal quality.

<Calculation Formula (8)>

$$SNR\_L = P\_CH/P\_ASE \tag{8}$$

Here, P_CH represents the power of the wavelength channel to be monitored in the wavelength conversion device 200. That is, P_CH represents the power of the wavelength-multiplexed light λ1C in the C-band monitored by the OCM 207, for example. P_ASE represents the optical power of amplified spontaneous emission (ASE) noise. Thus, the linear SNR is represented by the ratio between the power of the wavelength-multiplexed light λ1C and the optical power of the ASE noise. After calculating the linear SNR, the linear SNR calculation unit 29K outputs linear SNR information including the linear SNR to the GSNR calculation unit 19M of the control unit 109.

The GSNR calculation unit 19M calculates the GSNR based on the nonlinear SNR calculated by the non-linear SNR calculation unit 19K, the linear SNR of the linear SNR information calculated and output by the linear SNR calculation unit 29K, and the following calculation formula (9). The GSNR is an example of a third signal quality.

⟨Calculation Formula (9)⟩

$$\frac{1}{GSNR} = \frac{1}{\mathrm{SNR\_L}} + \frac{1}{\mathrm{SNR\_NL}} \tag{9}$$

After calculating the GSNR, the GSNR calculation unit 19M notifies the power control unit 19N of the GSNR. The GSNR calculated using the calculation formulas (5) to (9) can be obtained with reference to, for example, the following documents 1 and 2. In particular, P_NLI is calculated using the GN (Gaussian noise)/EGN (Enhanced GN) model described in Document 2.

Document 1: P. Poggiolini, Analytical Modeling of Non-Linear Propagation in Coherent Systems, in Proc. OFC 2013, Anaheim, Calif, USA, Mar. 2013.

Document 2: Pierluigi Poggiolini et al. "Closed Form Expressions of the Nonlinear Interference for UWB Systems," ECOC 2022, paper Tu1D.

Based on the GSNR notified from the GSNR calculation unit 19M, the power control unit 19N performs slope control on the optical amplifier 104, temperature control on the wavelength conversion unit 11A, and power control on the WSS 132. The power control unit 19N performs slope control on the tilt compensation unit 14B of the optical amplifier 104 and performs temperature control on the heater 117 of the wavelength conversion unit 11A.

The slope control is, for example, control to give a slope to the wavelength characteristics while adjusting the wavelength characteristics of the wavelength-multiplexed light λ1S in the wavelength conversion device 100 in the previous stage so that the wavelength characteristics (spectrum) of the wavelength-multiplexed light λ1S input to the wavelength conversion device 200 in the subsequent stage is flat. The wavelength-multiplexed light λ1S with sloped wavelength characteristics is multiplexed and transmitted, and thereby, the first-order tilt of the wavelength-multiplexed light λ1S after passing through the optical transmission line 300 is compensated.

The temperature control is control to adjust the conversion characteristics of the wavelength conversion unit 11A using temperature. By adjusting the conversion characteristics of the wavelength conversion unit 11A, the second-order tilt of the wavelength-multiplexed light λ1S after passing through the optical transmission line 300 is compensated. The power control is control to increase the power of the wavelength-multiplexed light λ1C by inserting a dummy light into the wavelength-multiplexed light λ1C, for example. This compensates for the residual tilt of the wavelength-multiplexed light λ1S after passing through the optical transmission line 300.

Figure 31:
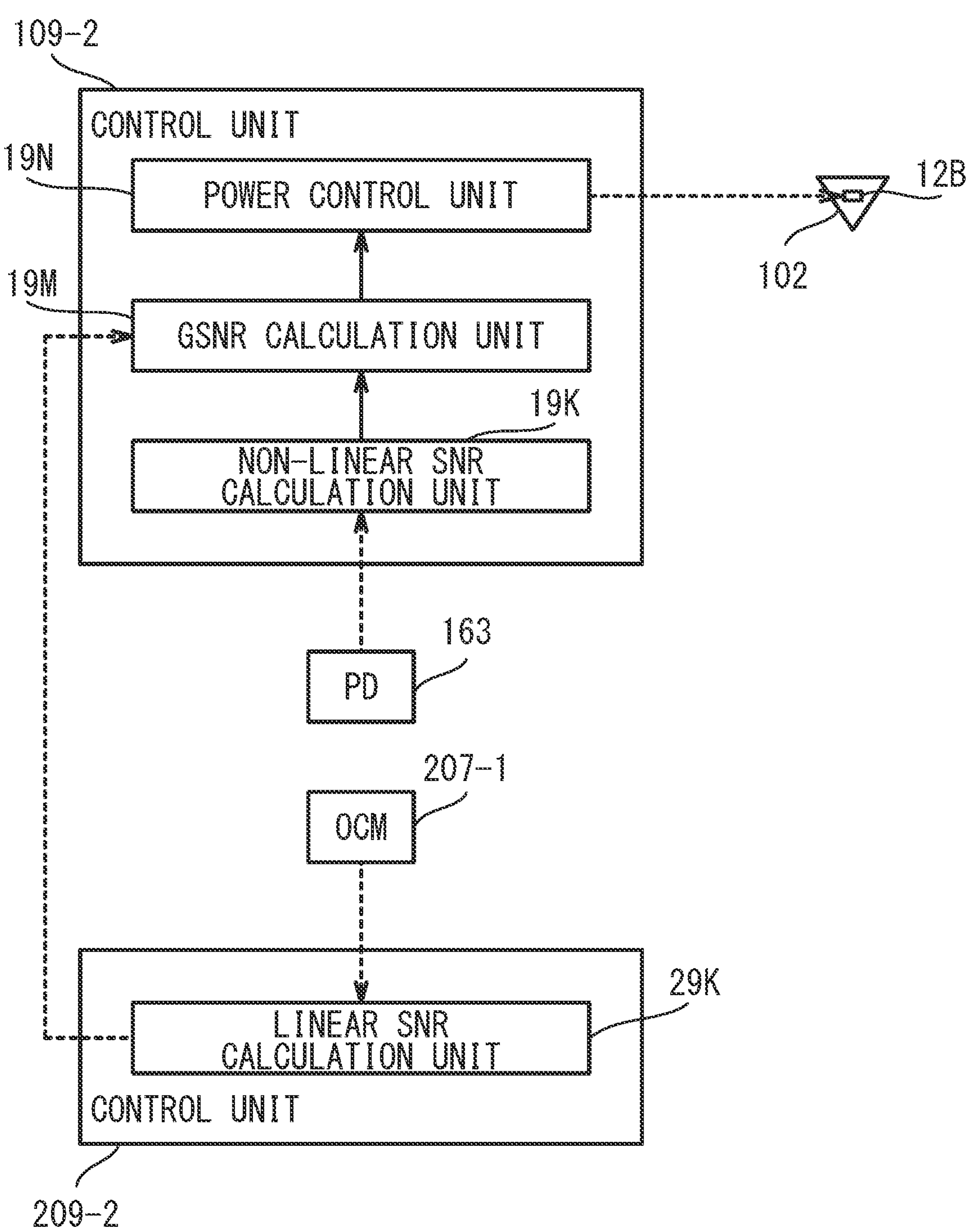
FIG. 31 illustrates another example of the control unit in accordance with the sixth embodiment.

As illustrated in FIG. 31, the control units 109-2 and 209-2 basically have the same configuration as the control units 109 and 209 described above. Therefore, the detailed description of the control units 109-2 and 209-2 is omitted. For example, the power control unit 19N included in the control unit 109-2 performs slope control on the optical amplifier 102 based on the GSNR notified from the GSNR calculation unit 19M. Specifically, the power control unit 19N performs slope control on the tilt compensation unit 12B of the optical amplifier 102. This compensates for the first-order tilt of the wavelength-multiplexed light λ2C after passing through the optical transmission line 300.

Next, tilt compensation of the optical transmission system ST having the wavelength conversion devices 100 and 200 in accordance with the sixth embodiment will be described with reference to FIG. 32. In the optical transmission system ST of the sixth embodiment, the wavelength conversion devices 100 and 200 cooperate to perform compensation for the first-order tilt, the second-order tilt, and the residual tilt.

First, the respective linear SNR calculation units 29K of the control units 209 and 209-2 acquire respective power of the wavelength-multiplexed lights λ1C and λ2C, respectively (step S61). The linear SNR calculation unit 29K of the control unit 209 can obtain the wavelength-multiplexed light λ1C from the OCM 207. The linear SNR calculation unit 29K of the control unit 209-2 can obtain the wavelength-multiplexed light λ2C from the OCM 207-1.

When the power of each of the wavelength-multiplexed lights λ1C andλ2C is obtained, each linear SNR calculation unit 29K calculates the linear SNR (step S62). That is, the linear SNR calculation unit 29K of the control unit 209 calculates the linear SNR of the wavelength-multiplexed light λ1C based on the power of the wavelength-multiplexed light λ1C. The linear SNR calculation unit 29K of the control unit 209-2 calculates the linear SNR of the wavelength-multiplexed light λ2C based on the power of the wavelength-multiplexed light λ2C.

Then, each linear SNR calculation unit 29K outputs the linear SNR information (step S63). More specifically, the linear SNR calculation unit 29K of the control unit 209 outputs the linear SNR information including the linear SNR of the wavelength-multiplexed light λ1C to the control unit 109. The linear SNR calculation unit 29K of the control unit 209-2 outputs the linear SNR information including the linear SNR of the wavelength-multiplexed light λ2C to the control unit 109-2.

Then, the respective non-linear SNR calculation units 19K of the control units 109 and 109-2 acquire respective power of the wavelength-multiplexed lights λ1S and λ2C, respectively (step S64). The non-linear SNR calculation unit 19K of the control unit 109 can obtain the power of the wavelength-multiplexed light λ1S from the PD 162. The non-linear SNR calculation unit 19K of the control unit 109 can obtain the power of the wavelength-multiplexed light λ2C from the PD 163.

When the respective power of the wavelength-multiplexed lights λ1S and λ2C is obtained, each non-linear SNR calculation unit 19K calculates the nonlinear SNR (step S65). That is, the non-linear SNR calculation unit 19K of the control unit 109 calculates the nonlinear SNR of the wavelength-multiplexed light λ1S based on the power of the wavelength-multiplexed light λ1S. The non-linear SNR calculation unit 19K of the control unit 109-2 calculates the nonlinear SNR of the wavelength-multiplexed light λ2C based on the power of the wavelength-multiplexed light λ2C.

Then, the respective GSNR calculation units 19M of the control units 109 and 109-2 calculate the GSNR (step S66). That is, the GSNR calculation unit 19M of the control unit 109 calculates the GSNR of the wavelength-multiplexed light λ1S based on the linear SNR and the nonlinear SNR of the wavelength-multiplexed light λ1S. The GSNR calculation unit 19M of the control unit 109-2 calculates the GSNR of the wavelength-multiplexed light λ2C based on the linear SNR and the nonlinear SNR of the wavelength-multiplexed light λ2C.

Then, the power control units 19N of the control units 109 and 109-2 control the slopes of the optical amplifiers 104 and 102, respectively (step S67). More specifically, the power control unit 19N of the control unit 109 performs control to adjust the slope of the tilt compensation unit 14B of the optical amplifier 104 based on the GSNR of the wavelength-multiplexed light λ1S. The power control unit 19N of the control unit 109-2 performs control to adjust the slope of the tilt compensation unit 12B of the optical amplifier 102 based on the GSNR of the wavelength-multiplexed light λ2C. As described above, the tilt compensation units 14B and 12B compensate for the first-order tilt under the control by the control units 109 and 109-2.

Then, the power control unit 19N of the control unit 109 controls the temperature of the wavelength conversion unit 11A (step S68). For example, the power control unit 19N controls the temperature of the heater 117 based on the GSNR of the wavelength-multiplexed light λ1S and the temperature of the wavelength conversion medium 113 detected by the temperature sensor 116 to adjust the conversion characteristics of the wavelength conversion medium 113. As described above, the control unit 109 compensates for the second-order tilt.

Then, the power control unit 19N of the control unit 109 determines whether the GSNR has decreased (step S69). When the GSNR has not decreased (step S69: NO), the power control unit 19N of the control unit 109 executes the process of step S68. That is, the power control unit 19N of the control unit 109 repeats the processes of steps S68 and S69 until the GSNR decreases.

When the GSNR has decreased (step S69: YES), the power control unit 19N of the control unit 109 controls the average power (step S70) and ends the process. More specifically, the power control unit 19N of the control unit 109 calculates the compensation amount for the residual tilt based on the GSNR, and performs control to adjust the average power of the WSS 132 based on the calculated compensation amount. As described above, the control unit 109 compensates for the residual tilt in the wavelength-multiplexed light 215 by performing the control to adjust the average power of the WSS 132. As described above, the optical transmission system ST of the sixth embodiment can compensate for not only the second-order tilt but also the first-order tilt and the residual tilt in consideration of the nonlinear SNR and the linear SNR.

Seventh Embodiment

Next, a seventh embodiment of the present disclosure will be described with reference to FIG. 33 and FIG. 34. The wavelength conversion device 100 in accordance with the seventh embodiment is basically the same as the wavelength conversion device 100 of the fifth embodiment described with reference to FIG. 25 except for the configuration of the control unit 109. Therefore, in FIG. 33, the same components as those illustrated in FIG. 26, FIG. 30, and FIG. 31 are denoted by the same or corresponding reference numerals in principle, and the description thereof is omitted. In FIG. 26, the configuration for the L-band is not illustrated. The configuration for the L-band is basically the same as the configuration for the S-band.

Figure 33:
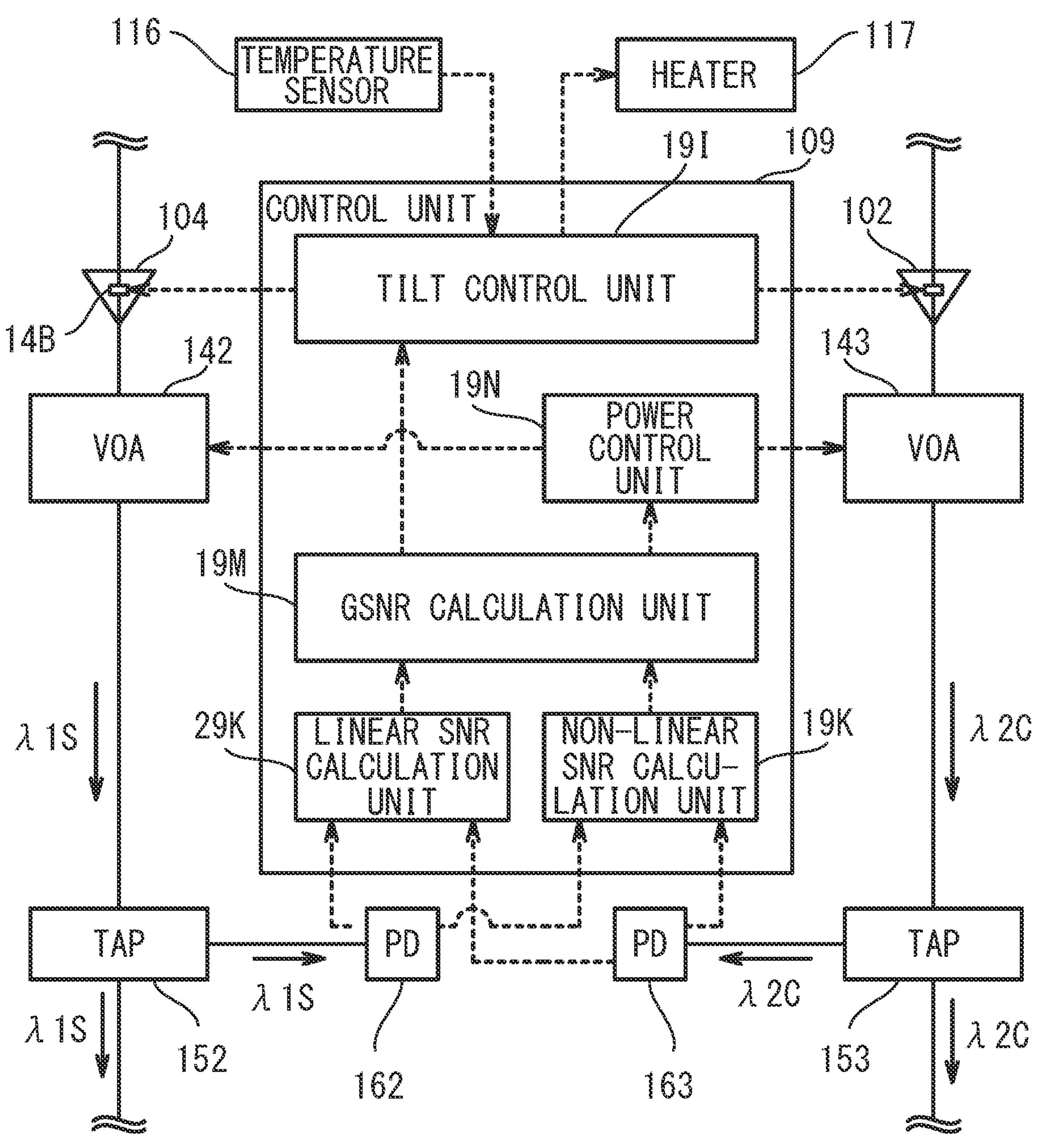
FIG. 33 illustrates an example of a control unit in accordance with a seventh embodiment.
Figure 34:
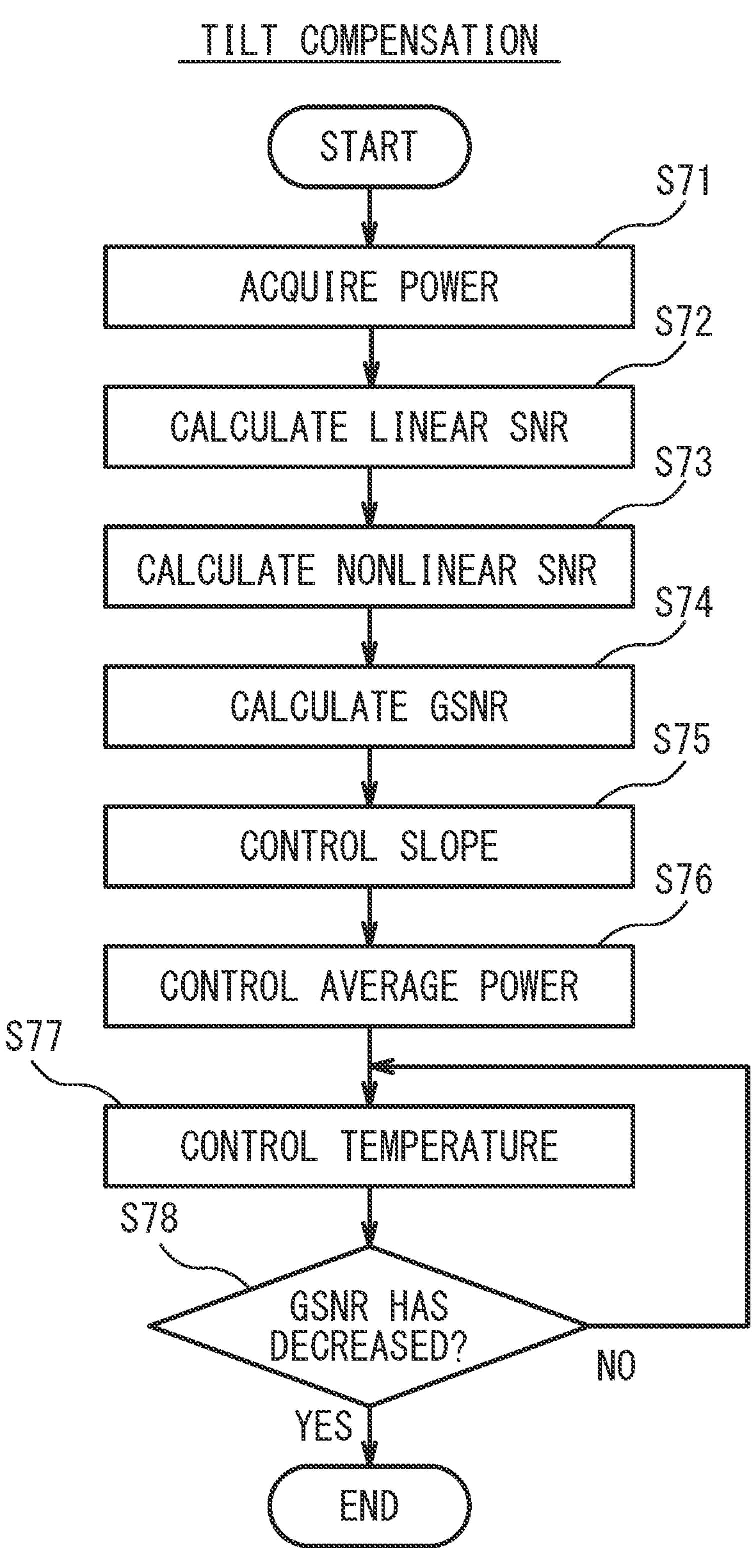
FIG. 34 is a flowchart illustrating an example of tilt compensation in accordance with the seventh embodiment.

As illustrated in FIG. 33, the control unit 109 in accordance with the seventh embodiment includes the linear SNR calculation unit 29K, the non-linear SNR calculation unit 19K, the GSNR calculation unit 19M, the tilt control unit 19I, and the power control unit 19N.

The linear SNR calculation unit 29K acquires the power of the wavelengths belonging to the S-band from the PD 162, and calculates the linear SNR of the wavelength-multiplexed light λ1S based on the acquired power. Similarly, the linear SNR calculation unit 29K acquires the power of the wavelengths belonging to the C-band from the PD 163, and calculates the linear SNR of the wavelength-multiplexed light λ2C based on the acquired power.

The non-linear SNR calculation unit 19K acquires the power of the wavelengths belonging to the S-band from the PD 162, and calculates the nonlinear SNR of the wavelength-multiplexed light λ1S based on the acquired power. Similarly, the non-linear SNR calculation unit 19K acquires the power of the wavelengths belonging to the C-band from the PD 163, and calculates the nonlinear SNR of the wavelength-multiplexed light λ2C based on the acquired power.

The GSNR calculation unit 19M calculates the GSNR of the wavelength-multiplexed light λ1S based on the linear SNR and the nonlinear SNR of the wavelength-multiplexed light λ1S. Similarly, the GSNR calculation unit 19M calculates the GSNR of the wavelength-multiplexed light λ2C based on the linear SNR and the nonlinear SNR of the wavelength-multiplexed light λ2C.

The tilt control unit 19I performs control to adjust the slope of the tilt compensation unit 14B of the optical amplifier 104 based on the GSNR of the wavelength-multiplexed light λ1S. The tilt control unit 19I performs control to adjust the slope of the tilt compensation unit 12B of the optical amplifier 102 based on the GSNR of the wavelength-multiplexed light λ2C. Further, the tilt control unit 19I controls the temperature of the heater 117 based on the GSNR of the wavelength-multiplexed light λ1S and the temperature of the wavelength conversion medium 113 detected by the temperature sensor 116, and performs control to adjust the conversion characteristics of the wavelength conversion medium 113.

The power control unit 19N calculates the power compensation amount corresponding to the average power of the wavelengths belonging to the S-band based on the GSNR of the wavelength-multiplexed light λ1S, and performs control to adjust the average power of the VOA 142 based on the calculated power compensation amount. Further, the power control unit 19N calculates the power compensation amount corresponding to the average power of the wavelengths belonging to the C-band based on the GSNR of the wavelength-multiplexed light λ2C, and performs control to adjust the average power of the VOA 143 based on the calculated power compensation amount.

As described above, in the seventh embodiment, compensation for the residual tilt is omitted. Therefore, the optical transmission system ST of the seventh embodiment can execute the first-order tilt compensation and the second-order tilt compensation in consideration of the linear SNR and the nonlinear SNR at higher speed than in the case where the compensation for the residual tilt is executed.

Next, tilt compensation of the optical transmission system ST having the wavelength conversion devices 100 and 200 in accordance with the seventh embodiment will be described with reference to FIG. 34. In the optical transmission system ST of the seventh embodiment, the wavelength conversion device 100 alone compensates for the first-order tilt and the second-order tilt.

First, each of the linear SNR calculation unit 29K and the non-linear SNR calculation unit 19K acquires the power of the wavelength-multiplexed light λ1S and the power of the wavelength-multiplexed light λ2C (step S71). The linear SNR calculation unit 29K can acquire the power of the wavelength-multiplexed light λ1S from the PD 162. Further, the linear SNR calculation unit 29K can acquire the power of the wavelength-multiplexed light λ2C from the PD 163. On the other hand, the non-linear SNR calculation unit 19K can acquire the power of the wavelength-multiplexed light λ1S from the PD 162. Further, the non-linear SNR calculation unit 19K can acquire the power of the wavelength-multiplexed light λ2C from the PD 163.

After acquiring the power of each of the wavelength-multiplexed lights λ1S and λ2C, the linear SNR calculation unit 29K calculates the linear SNR (step S72). That is, the linear SNR calculation unit 29K calculates the linear SNR of the wavelength-multiplexed light λ1S based on the power of the wavelength-multiplexed light λ1S. The linear SNR calculation unit 29K calculates the linear SNR of the wavelength-multiplexed light λ2C based on the power of the wavelength-multiplexed light λ2C.

Then, the non-linear SNR calculation unit 19K calculates the nonlinear SNR (step S73). That is, the non-linear SNR calculation unit 19K calculates the nonlinear SNR of the wavelength-multiplexed light λ1S based on the power of the wavelength-multiplexed light λ1S. The non-linear SNR calculation unit 19K calculates the nonlinear SNR of the wavelength-multiplexed light λ2C based on the power of the wavelength-multiplexed light λ2C.

Then, the GSNR calculation unit 19M calculates the GSNR (step S74). That is, the GSNR calculation unit 19M calculates the GSNR of the wavelength-multiplexed light λ1S based on the linear SNR and the nonlinear SNR of the wavelength-multiplexed light λ1S. The GSNR calculation unit 19M calculates the GSNR of the wavelength-multiplexed light λ2C based on the linear SNR and the nonlinear SNR of the wavelength-multiplexed light λ2C.

Then, the tilt control unit 19I controls the slopes of the optical amplifiers 104 and 102 (step S75). More specifically, the tilt control unit 19I performs control to adjust the slope of the tilt compensation unit 14B of the optical amplifier 104 based on the GSNR of the wavelength-multiplexed light λ1S. The tilt control unit 19I performs control to adjust the slope of the tilt compensation unit 12B of the optical amplifier 102 based on the GSNR of the wavelength-multiplexed light λ2C. As described above, the tilt compensation units 14B and 12B compensate for the first-order tilt under the control by the tilt control unit 19I.

Then, the power control unit 19N controls the average power of the VOAs 142 and 143 (step S76). More specifically, the power control unit 19N performs control to adjust the attenuation amount of the VOA 142 based on the GSNR of the wavelength-multiplexed light λ1S. Further, the power control unit 19N performs control to adjust the attenuation amount of the VOA 143 based on the GSNR of the wavelength-multiplexed light λ2C. Under the control by the power control unit 19N, the VOAs 142 and 143 compensate for the average power.

Then, the tilt control unit 19I controls the temperature of the wavelength conversion unit 11A (step S77). For example, the tilt control unit 19I controls the temperature of the heater 117 based on the GSNR of the wavelength-multiplexed light λ1S and the temperature of the wavelength conversion medium 113 detected by the temperature sensor 116 to adjust the conversion characteristics of the wavelength conversion medium 113. As described above, under the control by the tilt control unit 19I, the wavelength conversion unit 11A compensates for the second-order tilt.

Then, the tilt control unit 19I determines whether the GSNR has decreased (step S78). When the GSNR has not decreased (step S78: NO), the tilt control unit 19I executes the process of step S77. That is, the tilt control unit 19I repeats the processes of steps S77 and S78 until the GSNR decreases. When the GSNR has decreased (step S78: YES), the process is ended.

As described above, the optical transmission system ST of the seventh embodiment can execute the tilt compensation for the first-order tilt and the second-order tilt at high speed in consideration of the nonlinear SNR and the linear SNR.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A wavelength conversion device comprising:

an optical medium that converts a first wavelength-multiplexed light including a plurality of first wavelengths belonging to a first wavelength band to a second wavelength-multiplexed light including a plurality of second wavelengths belonging to a second wavelength band;

a first monitor that monitors power of the plurality of second wavelengths belonging to the second wavelength band;

a storage that holds control information for adjusting a temperature of the optical medium so as to adjust conversion characteristic of the optical medium; and a controller that performs control of adjusting the temperature of the optical medium based on the control information acquired from the storage according to a first monitoring result by the first monitor, wherein the controller resets the control when a decrease amount of a conversion efficiency based on adjustment of the temperature exceeds a deviation of the power of the plurality of second wavelengths belonging to the second wavelength band before the adjustment of the temperature.

2. The wavelength conversion device according to claim 1, wherein the controller performs first control of adjusting the temperature of the optical medium according to the control information so as to compensate for a second-order tilt generated in a transmission path through which broadband wavelength-multiplexed light including the plurality of first wavelengths, the plurality of second wavelengths, and a plurality of third wavelengths belonging to a third wavelength band is transmitted.

3. The wavelength conversion device according to claim 2, wherein the controller performs second control of adjusting the temperature of the optical medium so as to compensate for variation in zero-dispersion wavelength, and performs the first control after recording the control information in the storage based on a result of the second control.

4. The wavelength conversion device according to claim 3, wherein the controller resets the first control when the decrease amount exceeds the deviation.

5. The wavelength conversion device according to claim 2, wherein the first wavelength band is an S-band, wherein the second wavelength band is a C-band, and wherein the third wavelength band is an L-band.

6. The wavelength conversion device according to claim 1, wherein the controller performs the control of adjusting the temperature of the optical medium by a heater or a cooler.

7. The wavelength conversion device according to claim 1, further comprising:

a pumping light source that outputs a pumping light, wherein the controller performs the control of adjusting the temperature of the optical medium by adjusting a wavelength of the pumping light input from the pumping light source to the optical medium.

8. The wavelength conversion device according to claim 1, wherein the optical medium is a nonlinear optical medium containing PPLN (Periodically Poled Lithium Niobate).

9. A wavelength conversion device comprising:

an optical medium that converts a first wavelength-multiplexed light including a plurality of first wavelengths belonging to a first wavelength band to a second wavelength-multiplexed light including a plurality of second wavelengths belonging to a second wavelength band;

a first monitor that monitors power of the plurality of second wavelengths belonging to the second wavelength band;

a storage that holds control information for adjusting a conversion characteristic of the optical medium;

a controller that performs control of adjusting the conversion characteristic of the optical medium based on the control information acquired from the storage according to a first monitoring result by the first monitor; and a second monitor that monitors power of the plurality of first wavelengths belonging to the first wavelength band, wherein the controller performs the control of adjusting the conversion characteristic of the optical medium based on the control information acquired from the storage according to the first monitoring result and a second monitoring result by the second monitor.

10. An optical transmission system comprising a receiving-end wavelength conversion device and a transmitting-end wavelength conversion device, wherein the receiving-end wavelength conversion device includes:

a receiving-end optical amplifier that amplifies a first wavelength-multiplexed light including a plurality of first wavelengths belonging to a first wavelength band;

a first optical medium that converts the first wavelength-multiplexed light after amplification to a second wavelength-multiplexed light including a plurality of second wavelengths belonging to a second wavelength band;

a receiving-end first monitor that monitors power of the plurality of second wavelengths belonging to the second wavelength band;

a first storage that holds first control information for adjusting conversion characteristics of the first optical medium; and a receiving-end controller that performs control to adjust the conversion characteristics of the first optical medium based on the first control information acquired from the first storage according to a first monitoring result by the receiving-end first monitor, and wherein the transmitting-end wavelength conversion device includes:

a second optical medium that converts the second wavelength-multiplexed light output from a first transmitter to the first wavelength-multiplexed light;

a transmitting-end first optical amplifier that amplifies the first wavelength-multiplexed light after conversion;

a transmitting-end second optical amplifier that amplifies the second wavelength-multiplexed light output from a second transmitter; and an optical coupler that combines the second wavelength-multiplexed light output from the transmitting-end second optical amplifier and the first wavelength-multiplexed light output from the transmitting-end first optical amplifier and outputs a resulting light to a transmission line connecting the receiving-end wavelength conversion device and the transmitting-end wavelength conversion device.

11. The optical transmission system according to claim 10, wherein the transmitting-end wavelength conversion device includes:

a transmitting-end first monitor that monitors power of the plurality of first wavelengths belonging to the first wavelength band;

a second storage that holds second control information for adjusting conversion characteristics of the second optical medium; and a transmitting-end controller that performs control to adjust the conversion characteristics of the second optical medium based on the second control information acquired from the second storage according to the first monitoring result output from the receiving-end controller and a second monitoring result by the transmitting-end first monitor.

12. The optical transmission system according to claim 10, wherein the receiving-end wavelength conversion device includes an OSC transmitter that optically transmits the first monitoring result output from the receiving-end controller, and wherein the transmitting-end wavelength conversion device includes:

a second monitor that monitors power of the plurality of first wavelengths belonging to the first wavelength band;

a second storage that holds second control information for adjusting conversion characteristics of the second optical medium;

an OSC receiver that optically receives the first monitoring result transmitted from the OSC transmitter; and a transmitting-end controller that performs control to adjust the conversion characteristics of the second optical medium based on the second control information acquired from the second storage according to the first monitoring result received by the OSC receiver and a second monitoring result by the second monitor.

13. The optical transmission system according to claim 10, wherein the receiving-end wavelength conversion device includes a receiving-end second monitor that monitors power of the plurality of first wavelengths belonging to the first wavelength band, wherein the receiving-end controller acquires, from the receiving-end second monitor, a second monitoring result by the receiving-end second monitor and outputs the second monitoring result together with the first monitoring result to the transmitting-end wavelength conversion device, and wherein the transmitting-end wavelength conversion device includes:

a transmitting-end first monitor that monitors power of the plurality of first wavelengths belonging to the first wavelength band; and a transmitting-end controller that performs control to adjust a slope of the transmitting-end first optical amplifier and control to adjust conversion characteristics of the second optical medium with temperature according to the first monitoring result and the second monitoring result output from the receiving-end controller and a third monitoring result by the transmitting-end first monitor so that a deviation of power of each wavelength of the first wavelength-multiplexed light after passing through the transmission line is reduced.

14. The optical transmission system according to claim 10, wherein the transmitting-end wavelength conversion device includes:

a first variable optical attenuator that attenuates power of the first wavelength-multiplexed light output from the transmitting-end first optical amplifier;

a second variable optical attenuator that attenuates power of the second wavelength-multiplexed light output from the transmitting-end second optical amplifier;

a transmitting-end first monitor that monitors power of the plurality of first wavelengths belonging to the first wavelength band;

a transmitting-end second monitor that monitors power of the plurality of second wavelengths belonging to the second wavelength band; and a transmitting-end controller that performs control to adjust respective slopes of the transmitting-end first optical amplifier and the transmitting-end second optical amplifier, control to adjust respective attenuation amounts of the first variable optical attenuator and the second variable optical attenuator, and control to adjust conversion characteristics of the second optical medium with temperature according to a third monitoring result by the transmitting-end first monitor and a fourth monitoring result by the transmitting-end second monitor so that a deviation of power of each wavelength of the first wavelength-multiplexed light before passing through the transmission line is reduced.

15. The optical transmission system according to claim 10, wherein in the receiving-end wavelength conversion device, the receiving-end controller acquires the first monitoring result for each wavelength band, calculates a linear first signal quality for each wavelength band based on a predetermined first calculation method for calculating a linear signal quality and the first monitoring result, and outputs the linear first signal quality for each wavelength band, which has been calculated, to the transmitting-end wavelength conversion device, wherein the transmitting-end wavelength conversion device includes:

a transmitting-end first monitor that monitors power of the plurality of first wavelengths belonging to the first wavelength band;

a transmitting-end second monitor that monitors power of the plurality of second wavelengths belonging to the second wavelength band; and a transmitting-end controller that calculates a nonlinear second signal quality for each wavelength band based on a predetermined second calculation method for calculating a nonlinear signal quality, a third monitoring result by the transmitting-end first monitor, and a fourth monitoring result by the transmitting-end second monitor, calculates a third signal quality, which is different from the linear first signal quality and the nonlinear second signal quality, for each wavelength band based on a predetermined third calculation method for calculating a generalized signal quality, the linear first signal quality output from the receiving-end controller, and the nonlinear second signal quality, and performs control to adjust respective slopes of the transmitting-end first optical amplifier and the transmitting-end second optical amplifier and control to adjust conversion characteristics of the second optical medium with temperature so that the third signal quality is reduced.

16. The optical transmission system according to claim 10, wherein the transmitting-end wavelength conversion device includes:

a first variable optical attenuator that attenuates power of the first wavelength-multiplexed light output from the transmitting-end first optical amplifier;

a second variable optical attenuator that attenuates power of the second wavelength-multiplexed light output from the transmitting-end second optical amplifier;

a transmitting-end first monitor that monitors power of the plurality of first wavelengths belonging to the first wavelength band;

a transmitting-end second monitor that monitors power of the plurality of second wavelengths belonging to the second wavelength band; and a transmitting-end controller that calculates a linear first signal quality and a nonlinear second signal quality for each wavelength band based on a predetermined first calculation method for calculating a linear signal quality, a second calculation method for calculating a nonlinear signal quality, a third monitoring result by the transmitting-end first monitor, and a fourth monitoring result by the transmitting-end second monitor, calculates a third signal quality, which is different from the linear first signal quality and the nonlinear second signal quality, based on a third calculation method for calculating a generalized signal quality, the linear first signal quality, and the nonlinear second signal quality, and performs control to adjust respective slopes of the transmitting-end first optical amplifier and the transmitting-end second optical amplifier, control to adjust respective attenuation amounts of the first variable optical attenuator and the second variable optical attenuator, and control to adjust conversion characteristics of the second optical medium with temperature so that the third signal quality is reduced.

* * * * *